US008803954B2

(12) United States Patent  
Banavara

(10) Patent No.: US 8,803,954 B2  
(45) Date of Patent: Aug. 12, 2014

(54) IMAGE DISPLAY DEVICE, VIEWING DEVICE AND METHODS FOR OPERATING THE SAME

(75) Inventor: Prasanna Ramarao Banavara, Karnataka (IN)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/099,011

(22) Filed: May 2, 2011

(65) Prior Publication Data

US 2012/0026396 A1    Feb. 2, 2012

Related U.S. Application Data

(60) Provisional application No. 61/330,404, filed on May 3, 2010.

(51) Int. Cl.
*H04N 13/04*    (2006.01)
*H04N 9/47*    (2006.01)

(52) U.S. Cl.
USPC ............................. 348/56; 348/57; 348/564

(58) Field of Classification Search
USPC ..................... 348/563, 564, 588, 500, 54–56
See application file for complete search history.

(56) References Cited

U.S. PATENT DOCUMENTS

| 6,188,442 B1* | 2/2001 | Narayanaswami | 348/564 |
| 2007/0153122 A1 | 7/2007 | Ayite et al. | |
| 2007/0174863 A1 | 7/2007 | Chen | |
| 2007/0263003 A1* | 11/2007 | Ko et al. | 345/502 |
| 2008/0158095 A1 | 7/2008 | Neidrich et al. | |

FOREIGN PATENT DOCUMENTS

| EP | 1 895 769 A1 | 3/2008 |
| EP | 2169967 A2 | 3/2010 |
| WO | WO 2008/021857 A2 | 2/2008 |

\* cited by examiner

*Primary Examiner* — Michael Lee

(74) *Attorney, Agent, or Firm* — Birch, Stewart, Kolasch & Birch, LLP

(57) ABSTRACT

An image display device, a viewing device, and a method for operating the same are provided. The method includes pairing a first viewing device with the image display device; displaying a first image corresponding to a first channel during a first period in synchronization with the first viewing device so that the first image can be viewed with the use of the first viewing device; and displaying a second image during a second period subsequent to the first period in synchronization with the first viewing device so that the second image cannot be viewed with the use of the first viewing device. This allow users to concurrently view different images using different viewing devices on a single image display device.

25 Claims, 46 Drawing Sheets

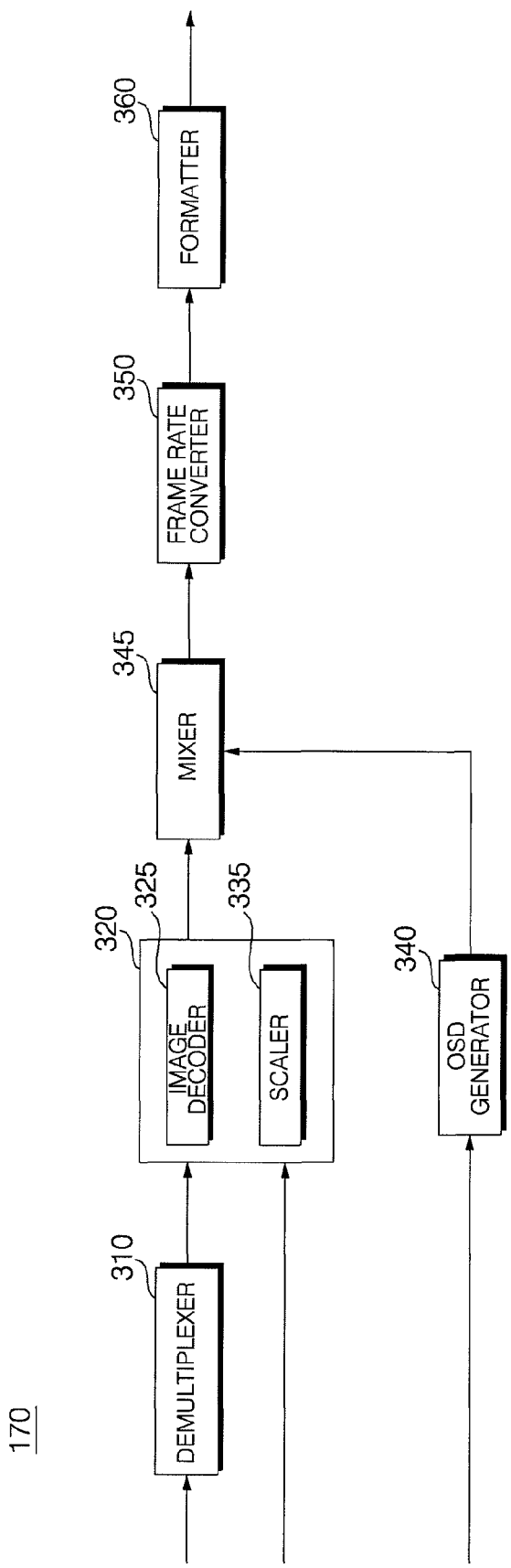

FIG. 4
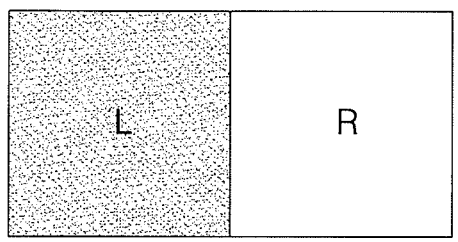
(a)
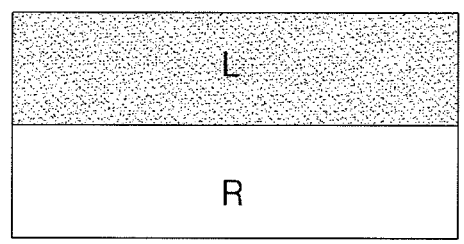
(b)
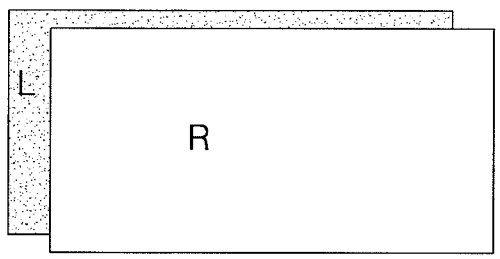
(c)
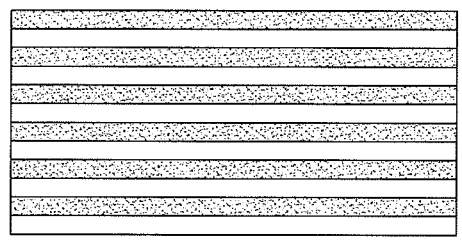
(d)
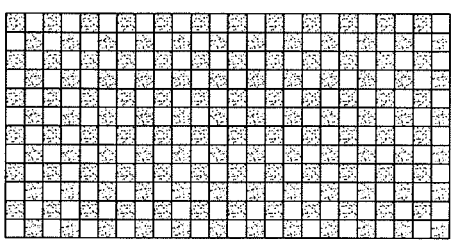
(e)

(a)                                      (b)

FIG. 6
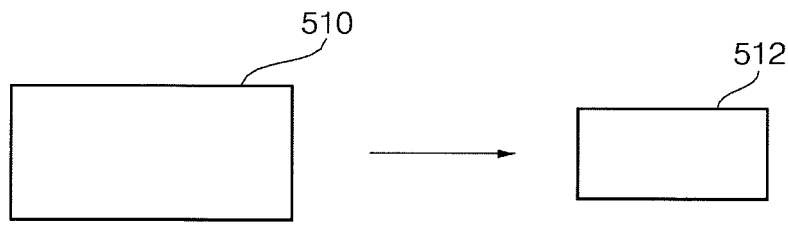
(a)
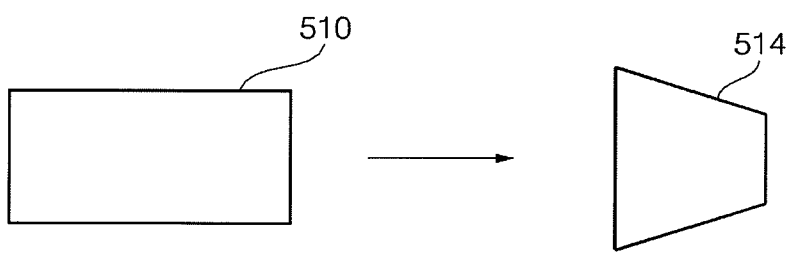
(b)
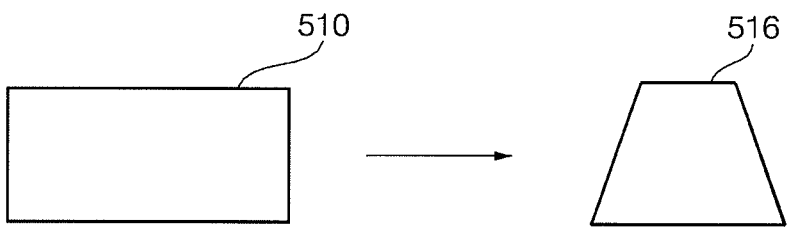
(c)
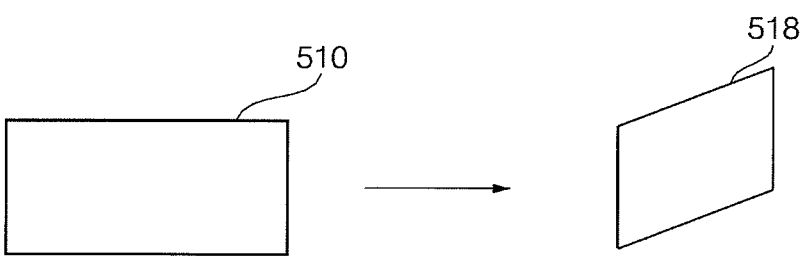
(d)

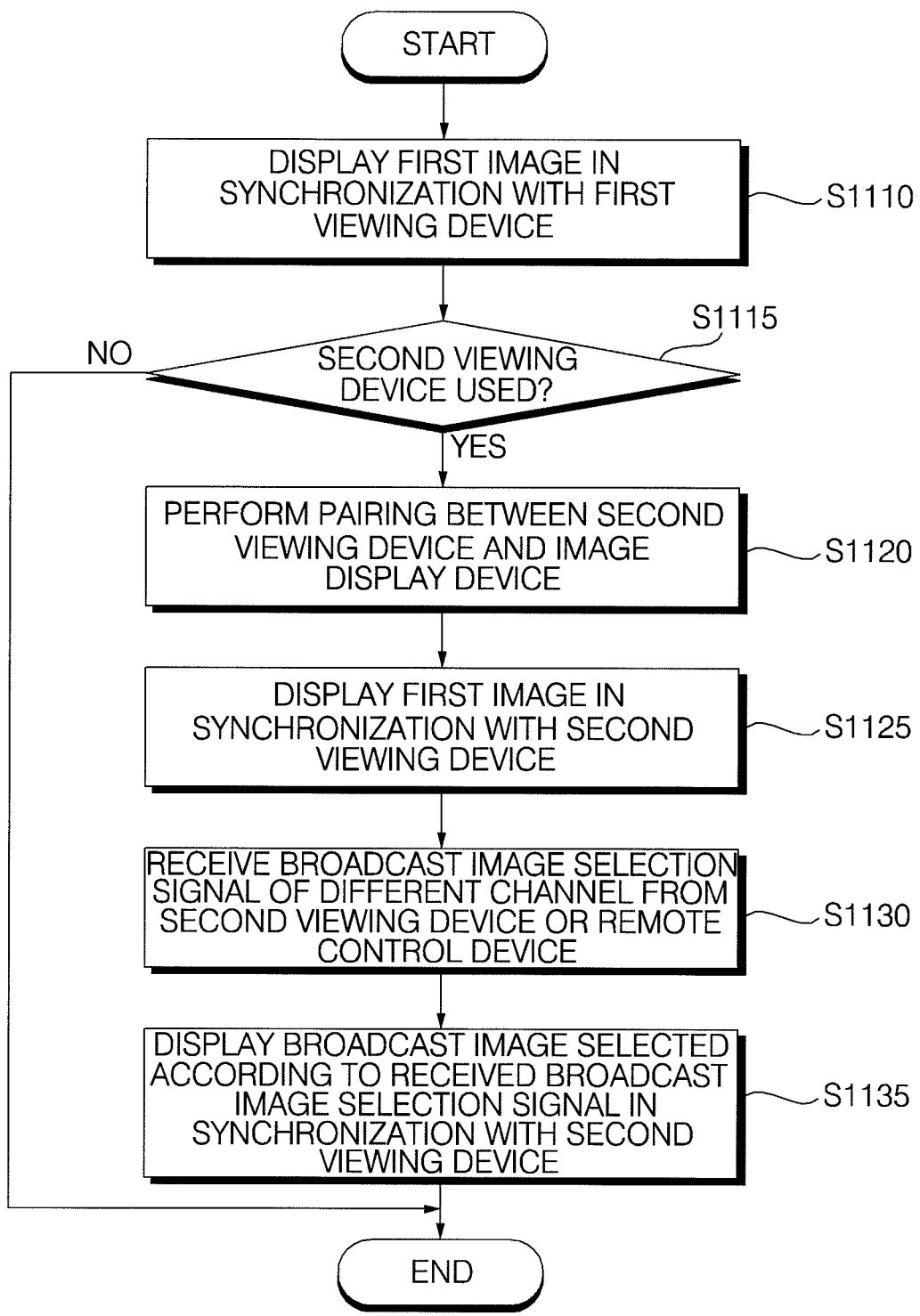

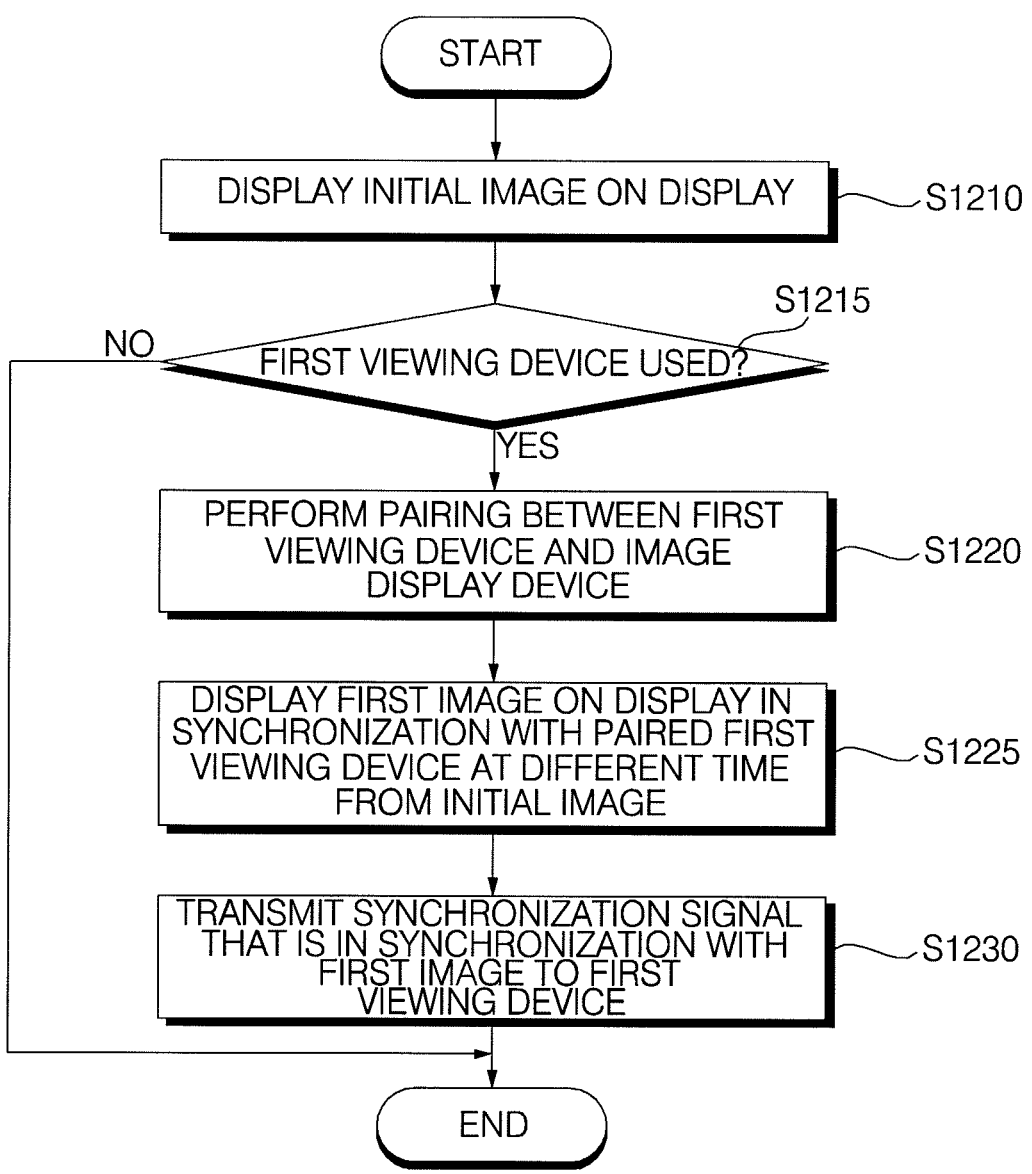

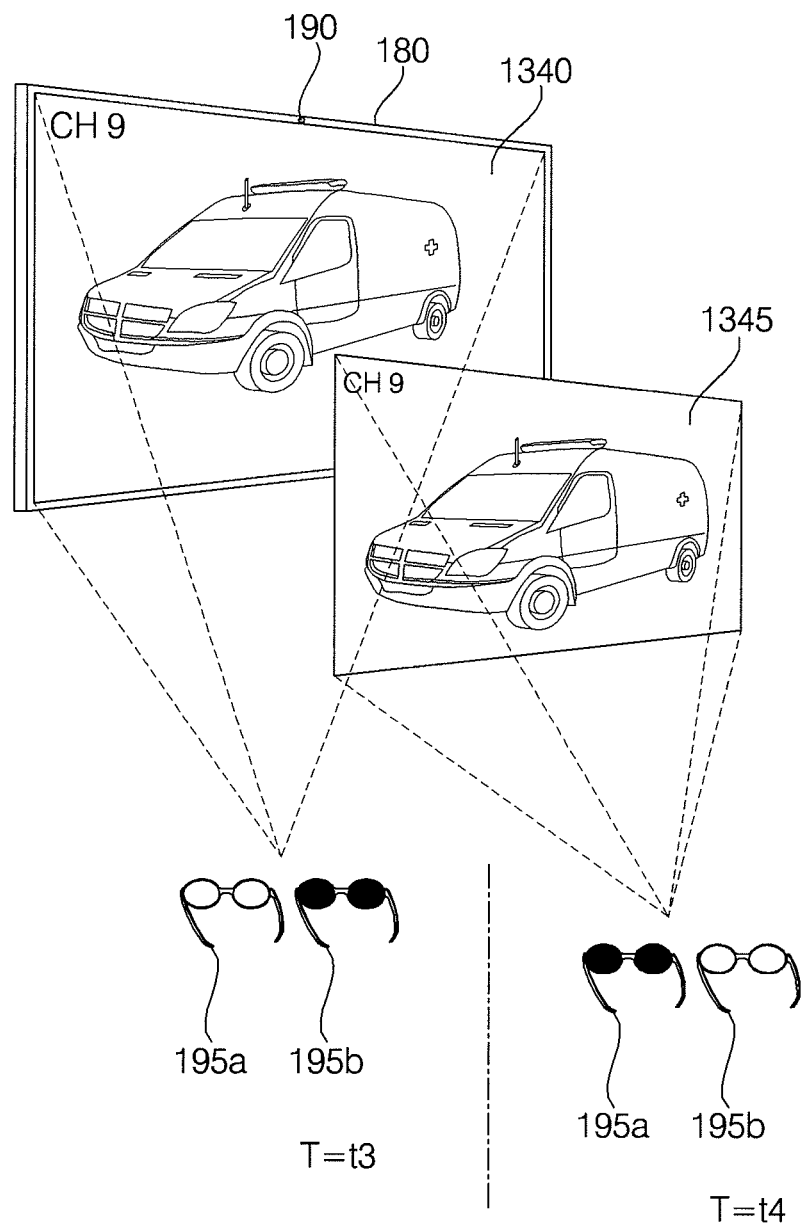

T=t5

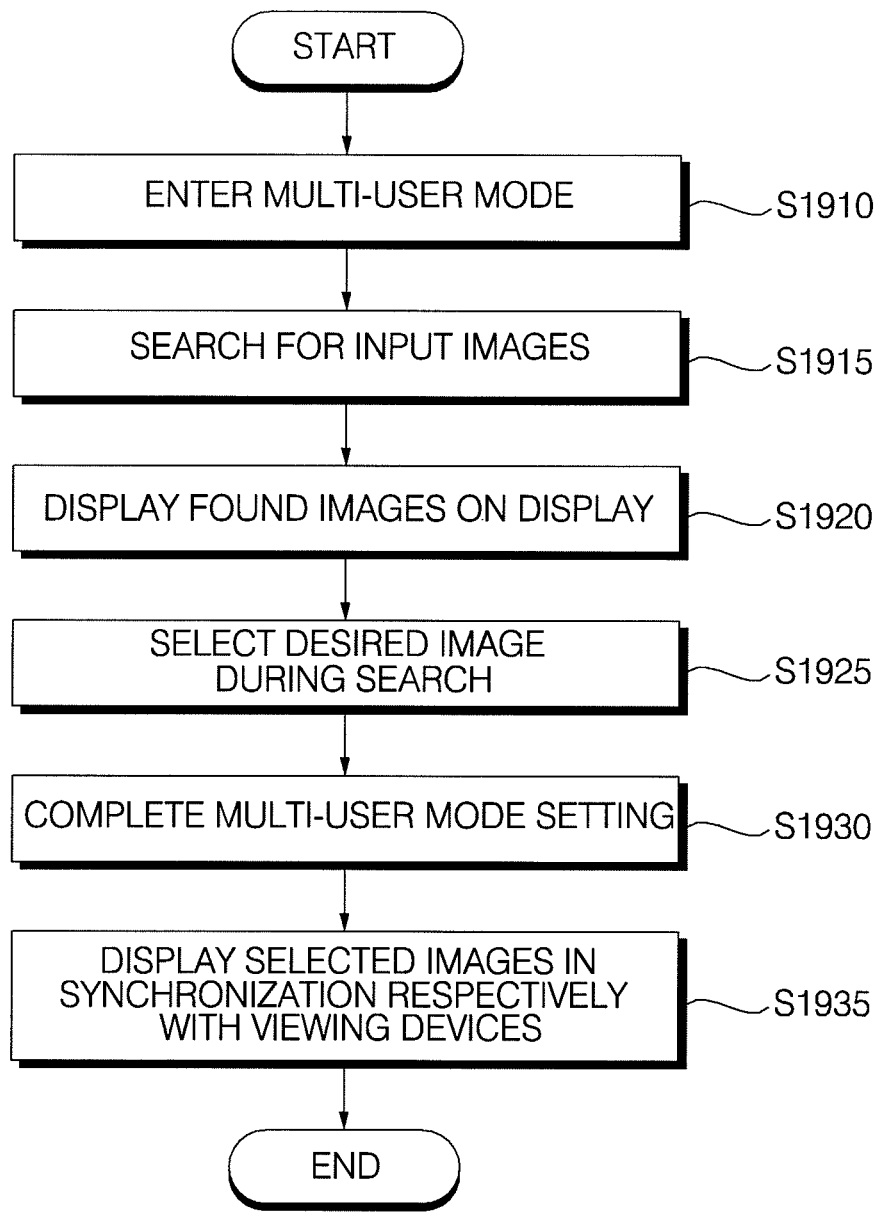

FIG. 20A
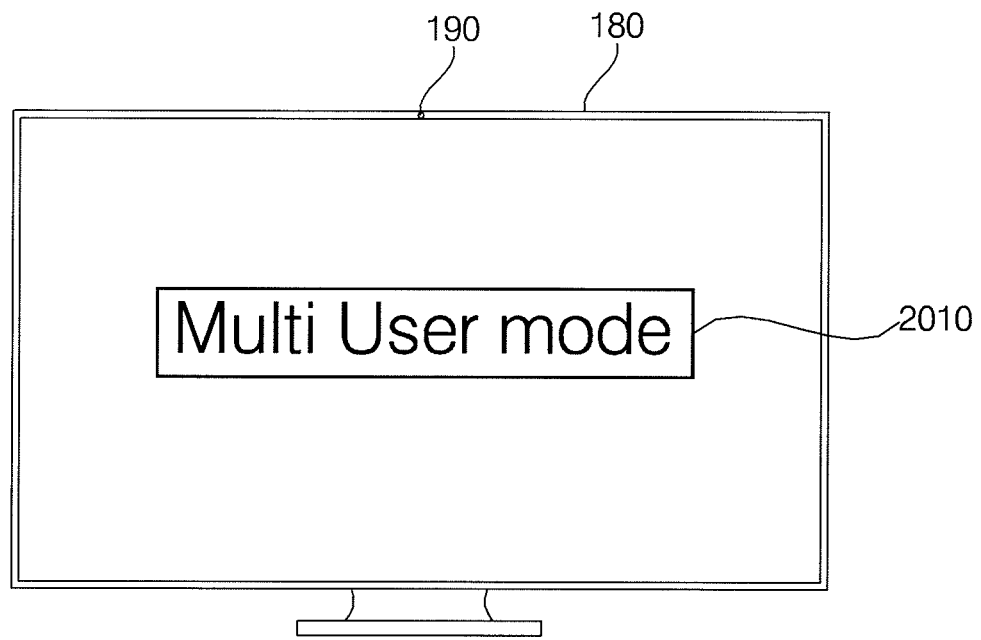
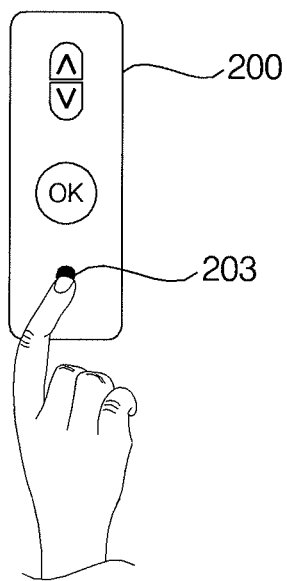

FIG. 20B
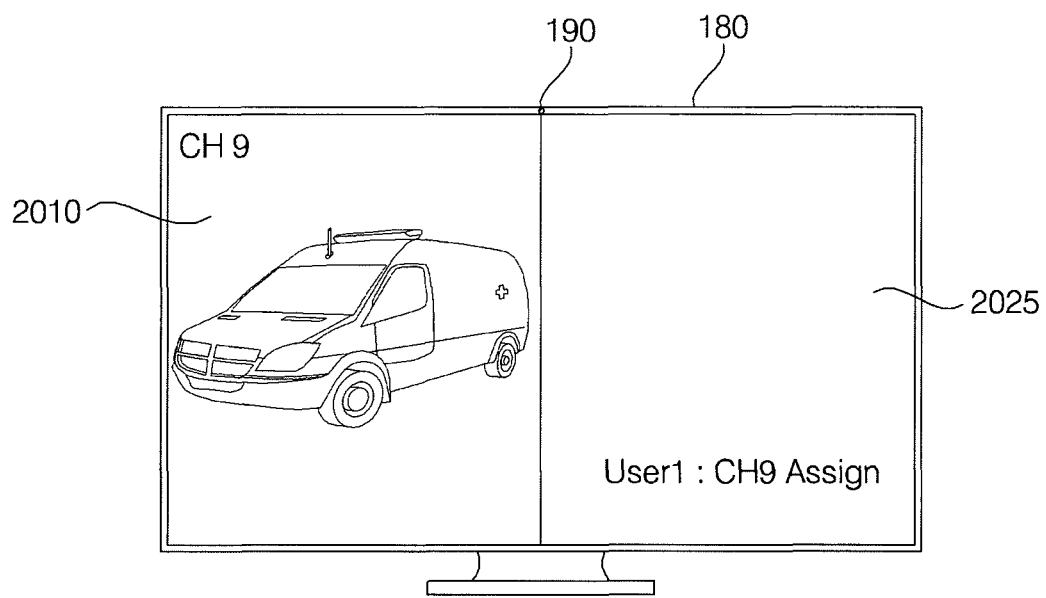
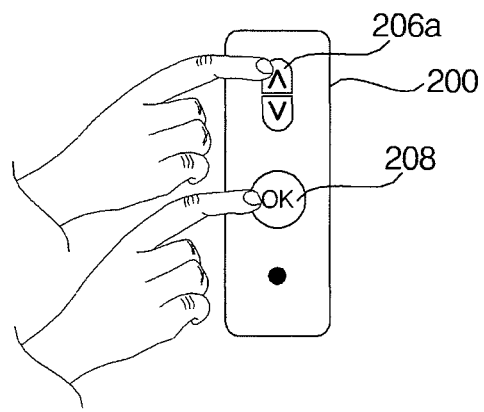

FIG. 20C
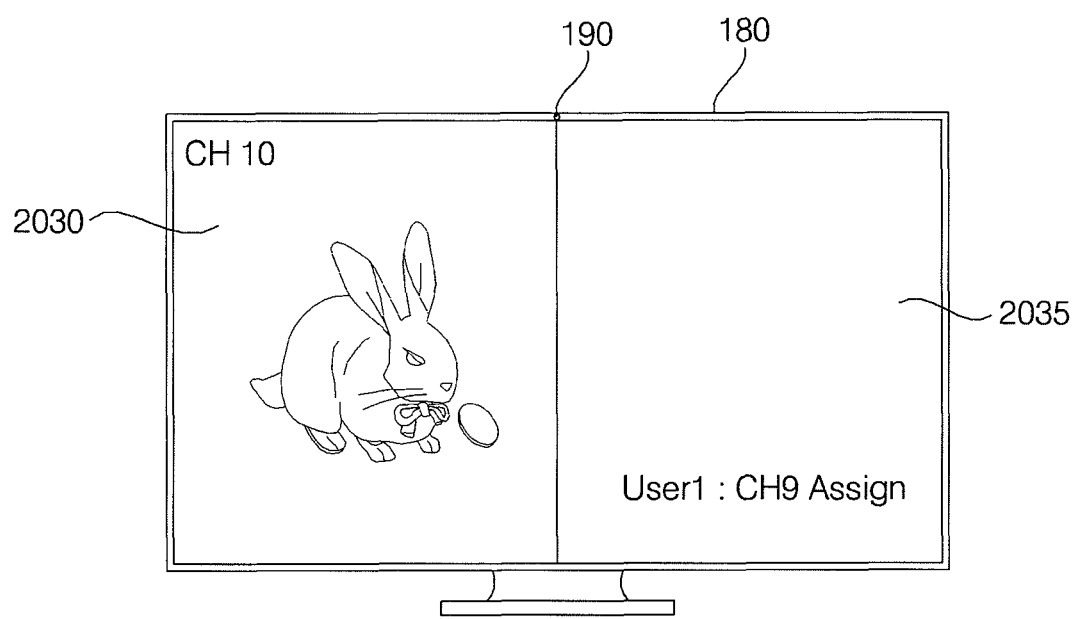
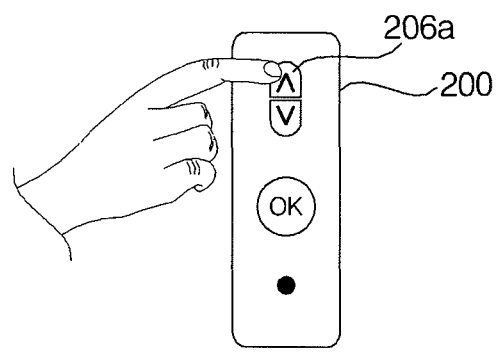

FIG. 20D
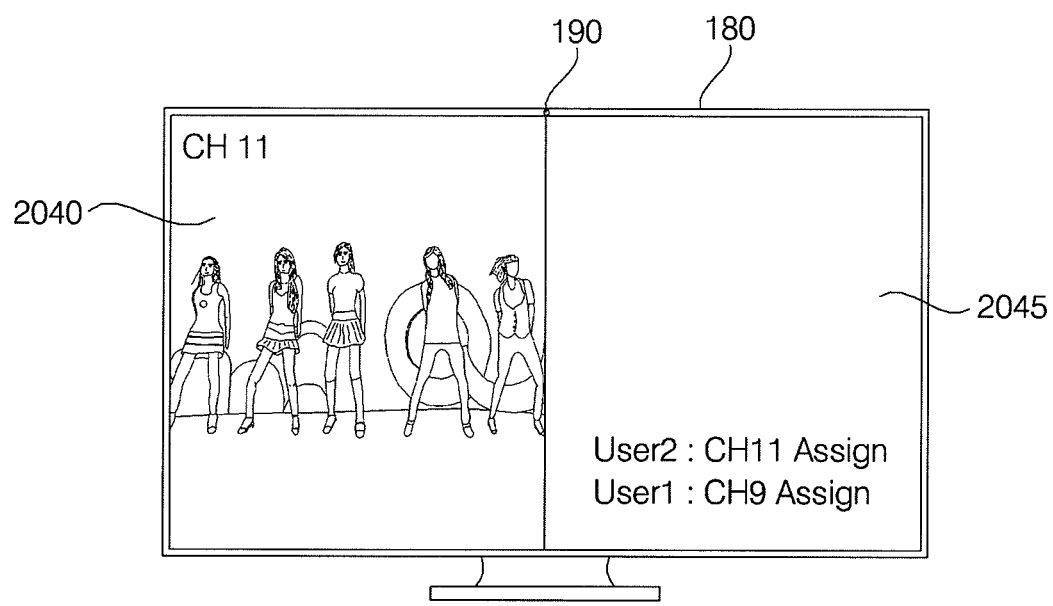
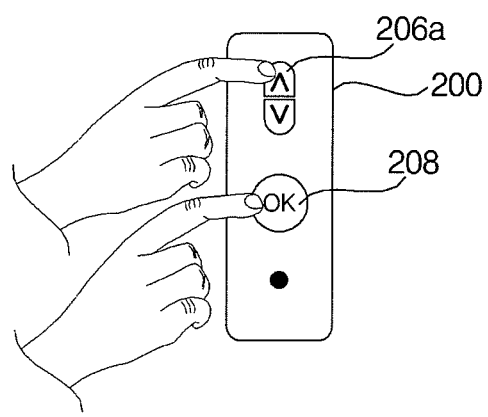

FIG. 20E
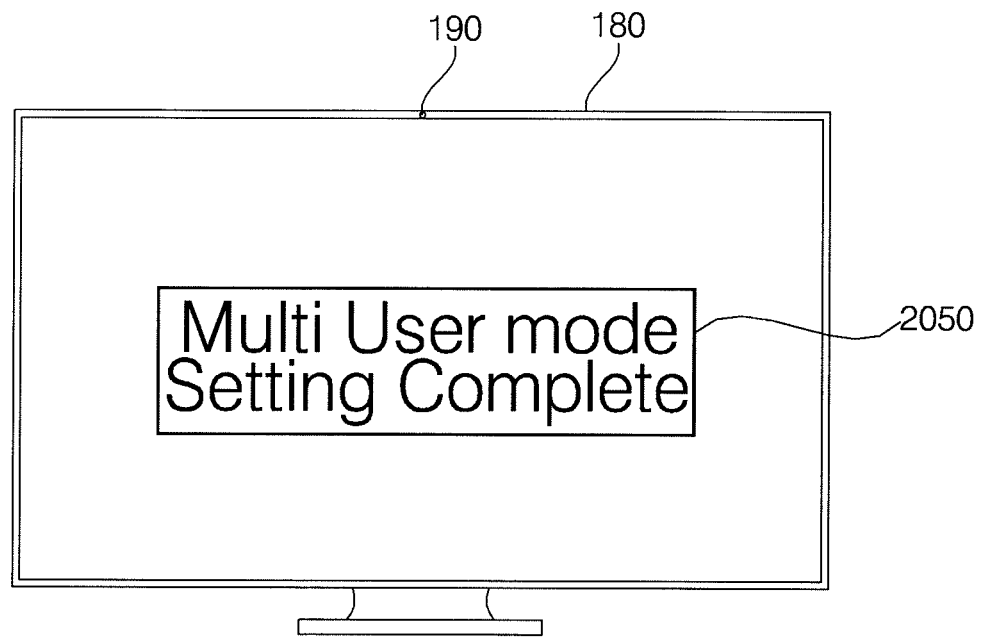
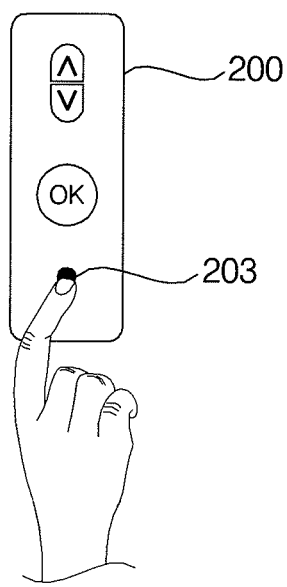

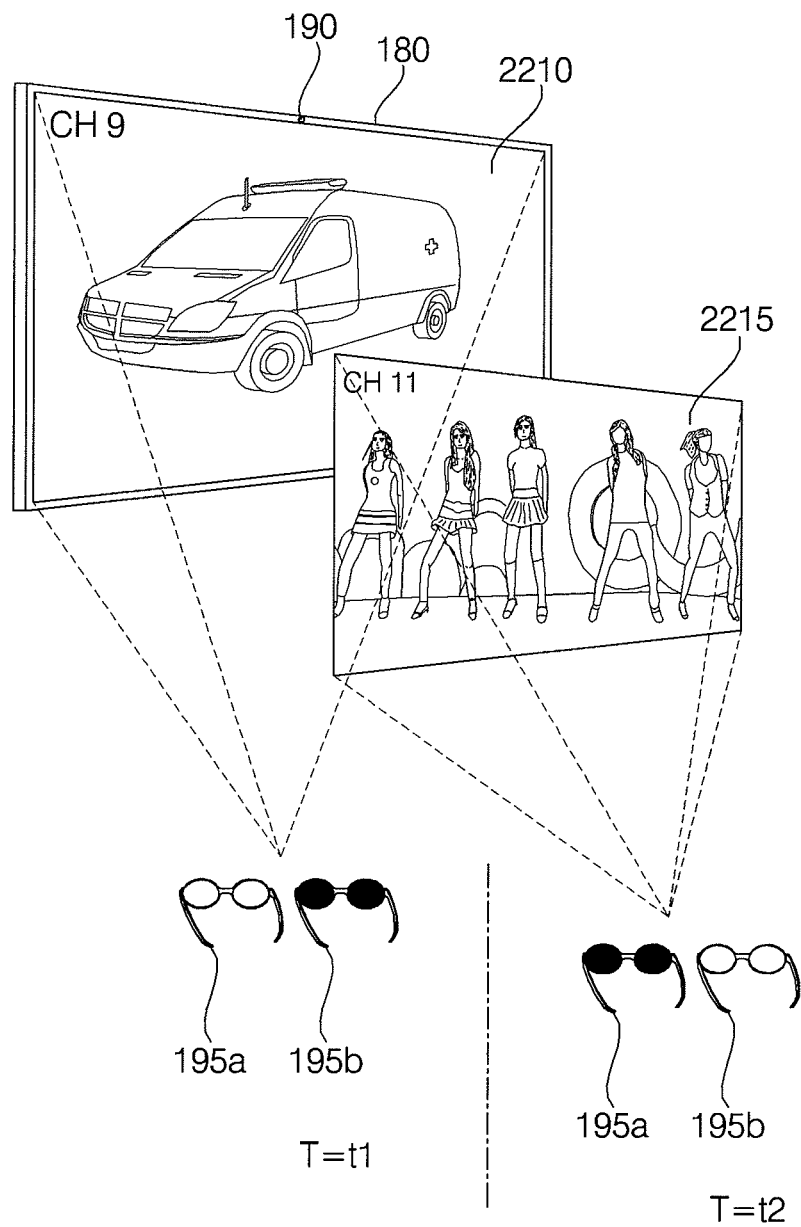

IMAGE DISPLAY DEVICE, VIEWING DEVICE AND METHODS FOR OPERATING THE SAME

CROSS-REFERENCE TO RELATED APPLICATION

This application claims the benefit of U.S. Provisional Application No. 61/330,404 filed on May 3, 2010 in the USPTO, the disclosure of which is incorporated herein by reference.

BACKGROUND OF THE INVENTION

1. Field of the Invention

Embodiments of the present invention relate to an image display device, a viewing device and methods for operating the same, and more particularly to an image display device, a viewing device and methods for operating the same which enable a user to view a different image using a viewing device.

2. Description of the Related Art

An image display device is an apparatus having a function to display an image that can be viewed by the user. The user can view broadcasts through the image display device. The image display device displays a broadcast that the user has selected from among broadcasts transmitted by a broadcast station. Currently, broadcasting is transitioning from analog broadcasting to digital broadcasting throughout the world.

Digital broadcasting transmits digital video and audio signals. Compared to analog broadcasting, digital broadcasting is more robust to external noise, resulting in less data loss, and is also advantageous in terms of error correction and provides clear high-resolution images or screens. Digital broadcasting can also provide bi-directional services, unlike analog broadcasting.

SUMMARY OF THE INVENTION

Therefore, embodiments and aspects of the present invention have been made in view of the above circumstances, and it is an object of the present invention to provide an image display device, a viewing device, and a method for operating the same, which enable a user to view a different image using a viewing device.

It is another object of the present invention to provide an image display device, a viewing device, and a method for operating the same, which enable users to view different images using a plurality of viewing devices.

It is another object of the present invention to provide an image display device, a viewing device, and a method for operating the same, wherein different channel search ranges are applied to a plurality of viewing devices.

It is another object of the present invention to provide an image display device, a viewing device, and a method for operating the same, wherein a notification message indicating overlapping image viewing is provided when the same image is viewed using a plurality of viewing devices.

In accordance with an aspect of the present invention, the above and other objects can be accomplished by the provision of a method for operating an image display device, the method including pairing a first viewing device with the image display device; displaying a first image corresponding to a first channel during a first period in synchronization with the first viewing device so that the first image can be viewed with the use of the first viewing device; and displaying a second image during a second period subsequent to the first period in synchronization with the first viewing device so that the second image cannot be viewed with the use of the first viewing device.

In accordance with another aspect of the present invention, there is provided a method for operating an image display device, the method including entering a multi-user mode; searching for input images; displaying the input images on the display; selecting first and second images of the input images during the search; and completing a setting of the multi-user mode.

In accordance with another aspect of the present invention, there is provided an image display device including a display arranged to display a first image and a second image; a wireless communication unit arranged to transmit or receive data to or from a first viewing device; and a controller arranged to perform a control operation to pair the first viewing device with the image display device, to display the first image corresponding to a first channel during a first period in synchronization with the first viewing device so that the first image can be viewed with the use of the first viewing device, and display the second image during a second period subsequent to the first period in synchronization with the first viewing device so that the second image cannot be viewed with the use of the first viewing device.

In accordance with another aspect of the present invention, there is provided a viewing device including a left-eye glass and a right-eye glass; a selection unit arranged to perform channel search or channel selection; a wireless communication unit arranged to transmit or receive data to or from an image display device; and a controller arranged to perform a control operation to pair the viewing device with the image display device, to enable viewing a first image corresponding to a first channel during a first period in synchronization with the viewing device so that the first image can be viewed with the use of the viewing device, and not enable viewing a second image during a second period subsequent to the first period in synchronization with the viewing device so that the second image cannot be viewed with the use of the viewing device

BRIEF DESCRIPTION OF THE DRAWINGS

The above and other objects, features and other advantages of the present invention will be more clearly understood from the following detailed description taken in conjunction with the accompanying drawings, in which:

FIG. 3 is a block diagram showing a controller shown in FIG. 1;

FIG. 4 illustrates various formats of a 3D image;

FIG. 6 illustrates various scaling schemes of a 3D image signal according to an embodiment of the present invention;

FIGS. 11 and 12 are flow charts illustrating a method for operating an image display device according to an embodiment of the present invention;

FIG. 19 is a flow chart illustrating a method for operating an image display device according to an embodiment of the present invention;

FIGS. 20A to 20F are drawings referenced to explain various examples of the method for operating an image display device shown in FIG. 19;

FIGS. 22A to 22C are drawings referenced to explain various examples of the method for operating an image display device shown in FIG. 21;

DETAILED DESCRIPTION OF THE EMBODIMENTS

Example embodiments of the present invention will be described with reference to the attached drawings.

The word "module" or "unit", which is added to the end of terms describing components, is merely used for ease of explanation of the present invention and has no specific meaning or function with respect to the components. Thus, the words "module" and "unit" may be used interchangeably.

Figure 1:
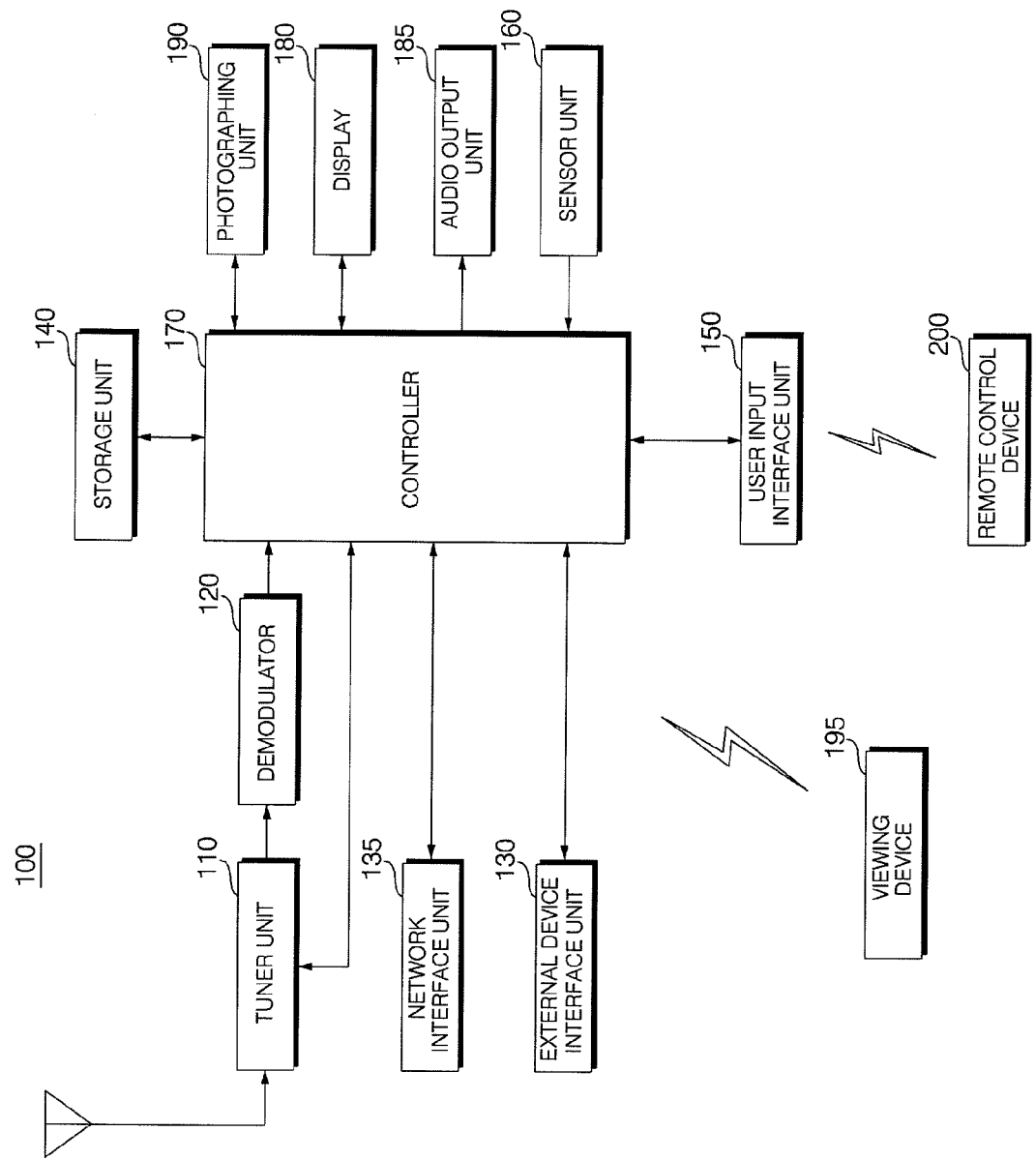
FIG. 1 a block diagram showing an image display device according to an embodiment of the present invention.

FIG. 1 a block diagram showing an image display device according to an embodiment of the present invention. Referring to FIG. 1, the image display device 100 according to the embodiment of the present invention includes a tuner unit 110, a demodulator 120, an external device interface unit 130, a network interface unit 135, a storage unit 140, a user input interface unit 150, a sensor unit 160, a controller 170, a display 180, an audio output unit 185, an photographing unit 190, and a viewing device 195.

The tuner unit 110 tunes to a Radio Frequency (RF) broadcast signal corresponding to a channel selected by a user from RF broadcast signals received through an antenna or corresponding to each of all stored channels. The tuned RF broadcast signal is converted into an Intermediate Frequency (IF) signal or a baseband video or audio signal.

For example, if the tuned RF broadcast signal is a digital broadcast signal, the tuned RF broadcast signal is converted into a digital IF (DIF) signal and, if the tuned RF broadcast signal is an analog broadcast signal, the tuned RF broadcast signal is converted into an analog baseband video/audio signal (Composite Video Baseband Signal (CVBS)/Sound IF (SIF)). That is, the tuner unit 110 may process a digital broadcast signal or an analog broadcast signal. The analog baseband video/audio signal (CVBS/SIF) output from the tuner unit 110 may be directly input to the controller 170.

In addition, the tuner unit 110 may receive a single-carrier RF broadcast signal according to an Advanced Television System Committee (ATSC) scheme or a multiple-carrier RF broadcast signal according to a Digital Video Broadcasting (DVB) scheme. In the present invention, the tuner unit 110 may sequentially tune to the RF broadcast signals of all the broadcast channels stored through a channel storage function among the RF broadcast signals received through the antenna, and convert the signals into IF signals or baseband video or audio signals. The tuner unit 110 may include a plurality of tuners in order to receive broadcast signals of a plurality of channels. The tuner unit 110 may also be a single tuner capable of simultaneously receiving broadcast signals of a plurality of channels.

The demodulator 120 receives the converted DIF signal from the tuner unit 110 and performs a demodulation operation. For example, if the DIF signal output from the tuner unit 110 is based on the ATSC system, the demodulator 120 performs 8-Vestigial Side Band (VSB) modulation. In addition, the demodulator 120 may perform channel decoding. The demodulator 120 may include a trellis decoder, a deinterleaver, a Reed-Solomon decoder and the like and perform trellis decoding, deinterleaving and Reed-Solomon decoding.

For example, if the DIF signal output from the tuner unit 110 is based on the DVB system, the demodulator 120 performs Coded Orthogonal Frequency Division Multiple Access (COFDMA) modulation. In addition, the demodulator 120 may perform channel decoding. The demodulator 120 may include a convolutional decoder, a deinterleaver, a Reed-Solomon decoder and the like to perform convolutional decoding, deinterleaving and Reed-Solomon decoding.

The demodulator 120 may perform demodulation and channel decoding and then output a Transport Stream (TS) signal. The TS signal may be a signal in which an image signal, an audio signal and a data signal are multiplexed. For example, the TS signal may be an MPEG-2 TS in which an MPEG-2 image signal, a Dolby AC-3 audio signal and the like are multiplexed. Specifically, the MPEG-2 TS may include a 4-byte header and a 184-byte payload. The demodulator 120 may separately include demodulators according to the ATSC scheme and the DVB scheme. That is, the demodulator 120 may include an ATSC modulator and a DVB demodulator.

The TS signal output from the demodulator 120 may be input to the controller 170. The controller 170 performs demultiplexing, image/audio signal processing and the like, and then outputs an image through the display 180 and audio through the audio output unit 185.

The external device interface unit 130 may transmit or receive data to or from an external device connected to the interface unit 130. To accomplish this, the external device interface unit 130 may include an NV input/output unit or a wireless communication unit. The external device interface unit 130 may be connected to the external device such as a Digital Versatile Disk (DVD) player, a Blu-ray player, a game console, a camcorder or a (notebook) computer in a wired/wireless manner. The external device interface unit 130 sends an image signal, an audio signal or a data signal received from the connected external device to the controller 170 of the image display device 100. The image signal, the audio signal or the data signal processed by the controller 170 may be output to the connected external device. To accomplish this, the external device interface unit 130 may include an A/V input/output unit or a wireless communication unit.

The NV input/output unit may include a Universal Serial Bus (USB) port, a CVBS terminal, a component terminal, an S-video terminal (analog), a Digital Visual Interface (DVI)

terminal, a High Definition Multimedia Interface (HDMI) terminal, an RGB terminal, and a D-SUB terminal for inputting the image signal and the audio signal from the external device to the image display device 100.

The wireless communication unit may perform wireless Local Area Network (LAN) communication with another electronic device. The image display device 100 may be connected to another electronic device over a network according to the communication standard such as Bluetooth, Radio Frequency Identification (RFID), Infrared Data Association (IrDA), Ultra Wideband (UWB), ZigBee, or Digital Living Network Alliance (DLNA).

In addition, the external device interface unit 130 may be connected to various set-top boxes through at least one of the above-described various terminals so as to perform an input/output operation with the set-top boxes. The external device interface unit 130 may transmit or receive data to or from the viewing device 195.

The network interface unit 135 provides an interface for connecting the image display device 100 to a wired/wireless network including an Internet network. The network interface unit 135 may include an Ethernet port for connection with a wired network. The network interface unit 135 may also use the communication standard such as Wireless LAN (WLAN) (Wi-Fi), Wireless broadband (Wibro), World Interoperability for Microwave Access (WiMax), or High Speed Downlink Packet Access (HSDPA) for connection with a wireless network.

The network interface unit 135 may receive content or data provided by an Internet or content provider or a network manager over a network. That is, the network interface unit 135 may receive content such as movies, advertisements, games, VOD, or broadcast signals and information associated with the content provided by the Internet or content provider over a network. In addition, the network interface unit 135 may receive update information and update files of firmware provided by the network manager. In addition, the network interface unit 135 may transmit data to the Internet or content provider or to the network manager.

In addition, the network interface unit 135 is connected to, for example, an Internet Protocol TV (IPTV) to receive and transmit an image, audio or data signal processed by a set-top box for IPTV to the controller 170 and to transmit signals processed by the controller 170 to the set-top box for IPTV in order to enable bidirectional communication.

The IPTV may include an ADSL-TV, a VDSL-TV, an FTTH-TV or the like according to the type of the transmission network or may include a TV over DSL, a Video over DSL, a TV over IP (TVIP), a Broadband TV (BTV), or the like. In addition, the IPTV may include an Internet TV capable of Internet access or a full-browsing TV.

The storage unit 140 may store a program for performing signal processing and control in the controller 170 and store a processed image, audio or data signal. In addition, the storage unit 140 may perform a function to temporarily store an image, audio or data signal input through the external device interface unit 130. In addition, the storage unit 140 may store information about predetermined broadcast channels through a channel storage function such as a channel map.

The storage unit 140 may include at least one of a flash memory storage medium, a hard disk storage medium, a multimedia card micro medium, a card memory (e.g., SD memory, XD memory, or the like), a RAM, or a ROM (EEPROM or the like). The image display device 100 may reproduce and provide a file, such as a moving image file, a still image file, a music file, a document file, or the like, stored in the storage unit 140 to the user.

Although FIG. 1 shows an example in which the storage unit 140 is provided separately from the controller 170, embodiments of the present invention are not limited to this example. The storage unit 140 may be included in the controller 170.

The user input interface unit 150 sends a signal input by the user to the controller 170 or sends a signal from the controller 170 to the user. For example, the user input interface unit 150 may receive a user input signal, such as power on/off, channel selection or screen setup, from a remote control device 200 or may transmit a signal from the controller 170 to the remote control device 200 according to various communication schemes such as a Radio Frequency (RF) communication scheme or an Infrared (IR) communication scheme. In addition, for example, the user input interface unit 150 may send a user input signal input through a local key such as a power key, a channel key, a volume key, or a setup value to the controller 170.

The sensor unit 160 may sense the position, gesture, or touch of the user or the position of the viewing device 195. To accomplish this, the sensor unit 160 may include a touch sensor, a voice sensor, a position sensor, a motion sensor, a gyro sensor, or the like. A signal indicating the sensed position, gesture, or touch of the user or the sensed position of the viewing device 195 may be input to the controller 170. This signal may also be input to the controller 170 through the user input interface unit 150, unlike the illustration of FIG. 1.

The controller 170 may demultiplex the TS signal input through the tuner unit 110, the demodulator 120 or the external device interface unit 130 or may process demultiplexed signals to generate and output signals for an image or audio output. The image signal processed by the controller 170 may be input to the display 180 such that an image corresponding to the image signal is displayed on the display 180. The image signal processed by the controller 170 may also be input to an external output device through the external device interface unit 130.

The audio signal processed by the controller 170 may be audibly output through the audio output unit 185. In addition, the audio signal processed by the controller 170 may be input to an external output device through the external device interface unit 130. In FIG. 1, the controller 170 may include a demultiplexer, an image processing unit, and the like as described later in detail with reference to FIG. 3. The controller 170 may control the overall operation of the image display device 100. For example, the controller 170 may control the tuner unit 110 to tune to an RF broadcast corresponding to a channel selected by the user or a stored channel.

In addition, the controller 170 may control the image display device 100 according to a user command input through the user input interface unit 150 or an internal program. For example, the controller 170 controls the tuner unit 110 to receive the signal of a channel selected according to a predetermined channel selection command received through the user input interface unit 150. The controller 170 then processes the image, audio or data signal of the selected channel. The controller 170 may allow information of the channel selected by the user to be output through the display 180 or the audio output unit 185 together with the image or audio signal.

In another example, the controller 170 may allow an image or audio signal received from the external device, for example, a camera or a camcorder, through the external device interface unit 130 to be output through the display 180 or the audio output unit 185 according to an external device image reproduction command received through the user input interface unit 150.

The controller 170 may control the display 180 to display an image. For example, the controller may allow a broadcast image input through the tuner unit 110, an external input image input through the external device interface unit 130, an image input through a network interface unit 135, or an image stored in the storage unit 140 to be displayed on the display 180. In this instance, the image displayed on the display 180 may be a still image, a moving image, a 2D image or a 3D image.

The controller 170 generates and displays a predetermined object in the image displayed on the display 180 as a 3D object. For example, the object may be at least one of a web page (newspaper, magazine, or the like), an Electronic Program Guide (EPG), various menus, a widget, an icon, a still image, a moving image, or text.

Such a 3D object may provide a sense of depth different from that of the image displayed on the display 180. Preferably, the 3D object may be processed such that the 3D object appears to be located in front of the image displayed on the display 180.

The controller 170 determines a user's position based on an image captured using the photographing unit 190. The controller 170 can obtain, for example, a distance (z-axis coordinate) between the user and the image display device 100. In addition, the controller can obtain an X-axis coordinate and a y-axis coordinate on the display 180 corresponding to the user's position.

The controller 170 may perform signal processing upon an image to allow the user to view the image according to the viewing device. For example, when the sensor unit 160 or the photographing unit 190 has sensed the presence of the viewing device 195, whether or not the viewing device 195 is in operation, or the number of viewing devices, the controller 170 may perform signal processing for pairing with the viewing device 195. That is, the controller 170 may perform a control operation to output a pairing signal to the viewing device 195 and to receive a response signal from the viewing device 195.

On the other hand, the controller 170 may control the tuner unit 110 to receive broadcast images corresponding respectively to the sensed viewing devices 195. For example, when the number of sensed viewing devices is 3, the controller 170 controls the tuner unit 110 including a plurality of tuners to receive broadcast images of different channels. The controller 170 may then perform a control operation to display the broadcast images at different times in synchronization respectively with the viewing devices.

The controller 170 may also perform a control operation to receive a number of external input images corresponding to the number of sensed viewing devices. For example, when the number of sensed viewing devices is 3, the controller 170 may perform a control operation to receive a broadcast image, an external input image from an optical device such as a DVD player, and an external input image from a PC. The controller 170 may then perform a control operation to display the broadcast images (i.e., the broadcast image, the DVD image, and the PC image) at different times in synchronization respectively with the viewing devices.

Each time the number of sensed viewing devices increases by one while images are being displayed, the controller 170 may perform a control operation to increase the vertical synchronization frequency Vsync of the images and to display the images at the increased vertical synchronization frequency. For example, when use of a third viewing device is sensed while a first image and a second image are being displayed in synchronization respectively with a first viewing device and a second viewing device for $1/60$th of a second, the controller 170 may perform a control operation to display the first to third images in synchronization with the first to third viewing devices for $1/60$th of a second. That is, when a third viewing device is sensed while a first image and a second image are being displayed at a vertical synchronization frequency of 120 Hz, the controller 170 may perform a control operation to display the first to third images at a vertical synchronization frequency of 180 Hz.

On the other hand, the controller 170 may set a different viewable image search range, for example, a different channel search range of broadcast images, for each viewing device. For example, the controller 170 may set a different channel search range for each age group such as adults and children so that channels are searched for within different search ranges for different age groups. The controller 170 may also set channel search ranges according to preference, sex (or gender), recently viewed channels, or program rating.

On the other hand, when the same image is selected at the first and second viewing devices, the controller 170 may perform a control operation to provide a notification message indicating the overlapping image selection. This message may be displayed in the form of an object on the display 180 or may be transmitted as a wireless signal to each viewing device.

On the other hand, the image display device 100 may further include a channel browsing processing unit for generating a thumbnail image corresponding to a channel signal or an external input signal. The channel browsing processing unit may receive a Transport Stream (TS) signal output from the demodulator 120 or a TS signal output from the external device interface unit 130, extract an image from the received TS signal, and generate a thumbnail image. The generated thumbnail image may be input to the controller 170 without conversion or after being encoded. In addition, the generated thumbnail image may be input to the controller 170 after being encoded into a stream format. The controller 170 may display a thumbnail list including a plurality of thumbnail images on the display 180 using the received thumbnail images. The thumbnail list may be displayed in a brief viewing manner in which the thumbnail list is displayed in a portion of the display 180 on which an image is being displayed, or in a full viewing manner in which the thumbnail list is displayed over most of the display 180. Thumbnail images in the thumbnail list may be sequentially updated.

The display 180 converts an image signal, a data signal, an OSD signal or a control signal processed by the controller 170 or an image signal, data signal or a control signal received through the external device interface unit 130 and generates a drive signal.

The display 180 may include a Plasma Display Panel (PDP), a Liquid Crystal Display (LCD), an Organic Light Emitting Diode (OLED) display, and a flexible display. The display 180 may also include a 3D display. The display 180 for 3D image viewing may be divided into a supplementary display type and a single display type.

In the single display type, a 3D image is implemented on the display 180 without a separate subsidiary device, e.g., glasses. Examples of the single display type may include various types such as a lenticular type and a parallax barrier type. In the supplementary display type, a 3D image is implemented using a subsidiary device as a viewing device 195, in addition to the display 180. Examples of the supplementary display type include various types such as a Head-Mounted Display (HMD) type and a glasses type. The glasses type may be divided into a passive type such as a polarized glasses type and an active type such as a shutter glasses type. The HMD type may be divided into a passive type and an active type.

The viewing device 195 may also be 3D glasses that enable 3D image viewing. The 3D glasses 195 may include passive-type polarized glasses or active-type shutter glasses. The 3D glasses 195 will also be described as conceptually including the HMD type. The display 180 may include a touch screen and function as an input device as well as an output device.

The audio output unit 185 receives the audio signal processed by the controller 170, for example, a stereo signal, a 3.1 channel signal or a 5.1 channel signal, and outputs corresponding audio. The audio output unit 185 may be implemented using various types of speakers.

The photographing unit 190 captures an image of the user. Although the photographing unit 190 may be implemented using one camera, embodiments of the present invention are not limited to one camera and the photographing unit 190 may be implemented using a plurality of cameras. The photographing unit 190 may be provided at an upper portion of the display 180. Information of the image captured by the photographing unit 190 is input to the controller 170. The controller 170 may sense the gesture of the user by the image captured using the photographing unit 190, the signal sensed using the sensing unit 160 or a combination thereof.

The remote control device 200 transmits a user input signal to the user input interface unit 150. To accomplish this, the remote control device 200 may use Bluetooth, Radio Frequency Identification (RFID) communication, IR communication, Ultra Wideband (UWB), or ZigBee. The remote control device 200 may receive the image, audio, or data signal output from the user input interface unit 150 and may then display or audibly output the received signal.

The image display device 100 may be a fixed digital broadcast receiver capable of receiving at least one of an ATSC (8-VSB) digital broadcast, a DVB-T (COFDM) digital broadcast or an ISDB-T (BST-OFDM) digital broadcast, or a mobile digital broadcast receiver capable of receiving at least one of a terrestrial DMB digital broadcast, a satellite DMB digital broadcast, an ATSC-M/H digital broadcast, a DVB-H (COFDM) digital broadcast or a media forward link only digital broadcast. In addition, the image display device 100 may be a cable, satellite or IPTV digital broadcast receiver.

The image display device described in the present specification may include a TV receiver, a projector, a mobile phone, a smart phone, a notebook computer, a digital broadcast terminal, a Personal Digital Assistant (PDA), a Portable Multimedia Player (PMP), or the like.

FIG. 1 is a block diagram of the image display device 100 according to one embodiment of the present invention. Some of the components of the image display device 100 shown in the block diagram may be combined or omitted or other components may be added thereto according to the specifications of the image display device 100 that is actually implemented. That is, two or more components of the image display device 100 may be combined into one component or one component thereof may be divided into two or more components as necessary. The functions of the components described below are only examples to describe the embodiments of the present invention and specific operations and units thereof do not limit the scope of the present invention.

The image display device 100 may not include the tuner unit 110 and the demodulation unit 120 shown in FIG. 1 and instead may receive and reproduce image content through the network interface unit 130 or the external device interface unit 135. The image display device 100 is an example of an image signal processing device that performs signal processing upon an image stored in the device or an image input to the device. Other examples of the image signal processing device may include a set-top box, which does not include the display 180 and the audio output unit 185 shown in FIG. 1, a DVD player, a Blu-ray player, a game console, a camcorder, a computer, or the like. Details of the set-top box are described below with reference to FIGS. 2A to 2B.

Figure 2A:
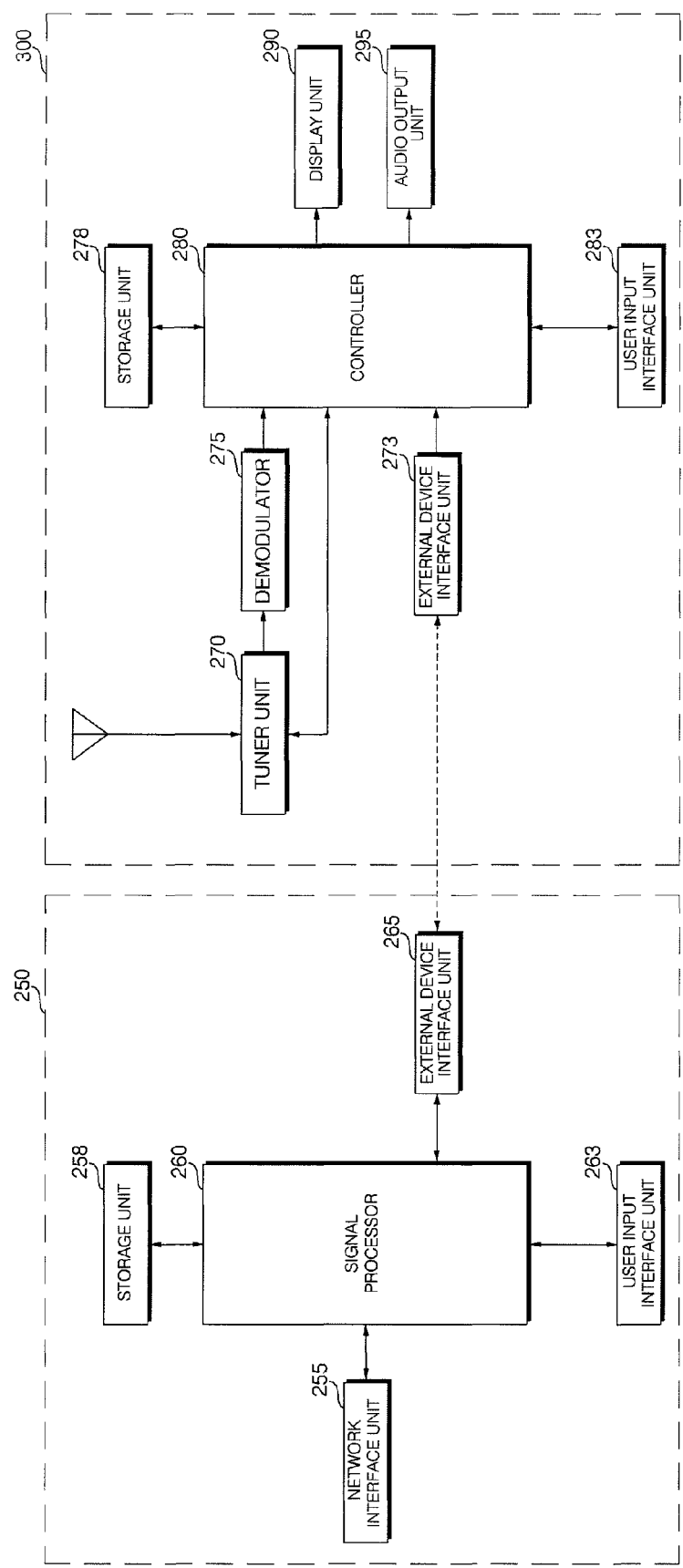
FIGS. 2A and 2B illustrate block diagrams of a set-top box and a display device according to an embodiment of the present invention.
Figure 2B:
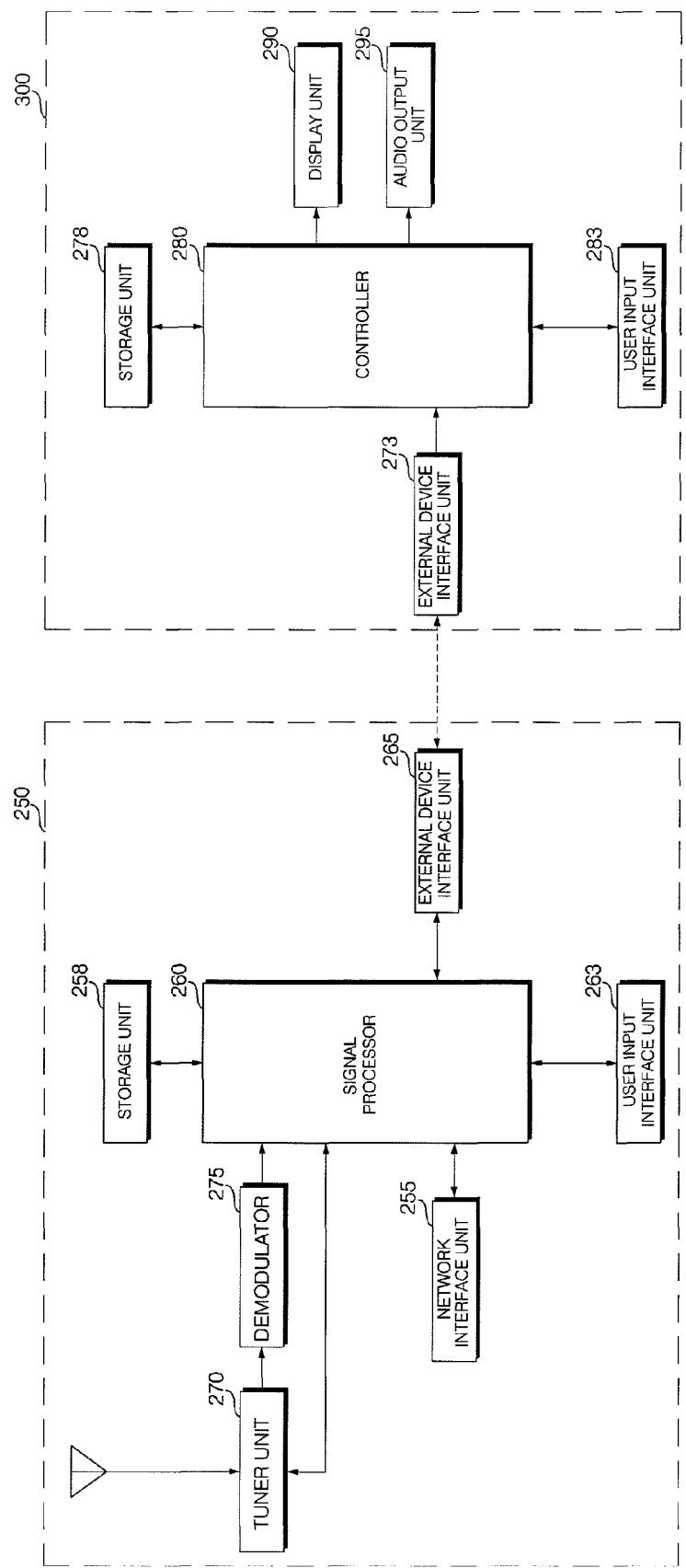

FIGS. 2A and 2B illustrate block diagrams of a set-top box and a display device according to an embodiment of the present invention. First, as shown in FIG. 2A, the set-top box 250 and the display device 30 may transmit or receive data wirelessly or by wire. The following description is given, focusing on differences from FIG. 1.

The set-top box 250 may include a network interface unit 255, a storage unit 258, a user input interface unit 263, and an external device interface unit 265. The network interface unit 255 provides an interface for connection to a wired/wireless network including the Internet. The network interface unit 255 may also transmit or receive data to or from another user or another electronic device through a connected network or another network linked to the connected network.

The storage unit 258 may store a program for implementing various signal processing and control in the signal processor 260 and may also perform a function to temporarily store video, audio, and data signals received from the external device interface unit 265 or from the network interface unit 255.

The signal processor 260 performs signal processing upon an input signal. For example, the signal processor 260 may perform demultiplexing or demodulation on an input image signal or may perform demultiplexing or demodulation on an input audio signal. To accomplish this, the signal processor 260 may include a video decoder or an audio decoder. The processed video or audio signal may be transmitted to the display device 300 through the external device interface unit 265.

The user input interface unit 263 may transfer a signal input by the user to the signal processor 260 or may transfer a signal from the signal processor 260 to the user. For example, the user input interface unit 263 may receive various control signals such as a power on/off signal, an operation-related input signal, a setting-related input signal that the user inputs through a local key or through the remote control device 200 and may then transfer the received control signals to the signal processor 260.

The external device interface unit 265 provides an interface for transmitting or receiving data to or from an external device connected to the external device interface unit 265 wirelessly or by wire. Particularly, the display device 300 provides an interface for transmitting or receiving data to or from the display device 300. The external device interface unit 265 may also provide an interface for transmitting or receiving data to or from an external device such as a game console, a camera, a camcorder, or a (notebook) computer.

The set-top box 250 may further include a media input unit for additional media playback. Examples of the media input unit include a Blu-ray input unit. That is, the set-top box 250 may include a Blu-ray player or the like. An input signal of media such as a Blu-ray disc may be subjected to signal processing such as demultiplexing or demodulation by the signal processor 260 and may then be transmitted to the display device 300 through the external device interface unit 265 in order to display the signal.

The display device 300 may include a tuner unit 270, an external device interface unit 273, a demodulation unit 275, a storage unit 278, a controller 280, a user input interface unit 283, a display unit 290, and an audio output unit 295.

The tuner unit 270, the demodulation unit 275, the storage unit 278, the controller 280, the user input interface unit 283, the display unit 290, and the audio output unit 295 correspond to the tuner unit 110, the demodulator 120, the storage unit 140, the controller 170, the user input interface unit 150, the display 180, and the audio output unit 185 and thus descriptions thereof are omitted herein.

The external device interface unit 273 provides an interface for transmitting or receiving data to or from an external device connected to the external device interface unit 273 by wire or wirelessly. Particularly, the external device interface unit 273 provides an interface for transmitting or receiving data to or from the set-top box 250. Accordingly, a video signal or an audio signal input through the set-top box 250 is then output through the display unit 290 or the audio output unit 295 via the controller 280.

A set-top box 250 and a display device 300 shown in FIG. 2B are similar to the set-top box 250 and the display device 300 shown in FIG. 2A with the difference being that a tuner unit 270 and a demodulation unit 275 are provided in the set-top box 250 rather than in the display device 300. Only differences from FIG. 2A are described below.

A signal processor 260 may perform signal processing upon a broadcast signal received through the tuner unit 270 and the demodulation unit 275. A user input interface unit 263 may receive an input signal such as a channel selection signal or a channel storage signal input by the user. With respect to the audio output unit 185 of FIG. 1 of the set-top boxes 250 in FIGS. 2A and 2B, each set-top box 250 may also include a separate audio output unit.

Figure 5:
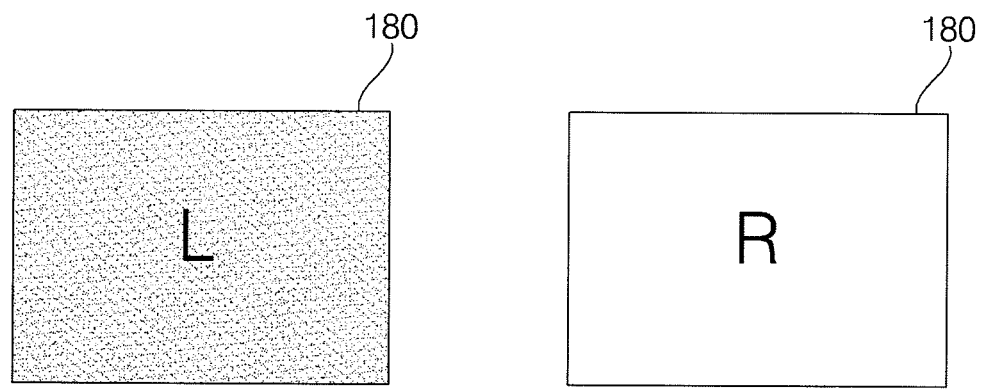
FIG. 5 illustrates an operation of a viewing device according to a frame sequential format shown in FIG. 4.

FIG. 3 is a block diagram showing the controller shown in FIG. 1, FIG. 4 illustrates various formats of a 3D image, and FIG. 5 illustrates an operation of a viewing device according to a frame sequential format shown in FIG. 4. As shown in FIG. 3, the controller 170 according to one embodiment of the present invention may include a demultiplexer 310, an image processing unit 320, an OSD generator 340, a mixer 345, a Frame Rate Converter (FRC) 350, and a formatter 360. The controller 170 may further include an audio processing unit and a data processing unit.

The demultiplexer 310 demultiplexes an input TS signal. For example, if an MPEG-2 TS signal is input, the demultiplexer may demultiplex the MPEG-2 TS signal into image, audio and data signals. The TS signal input to the demultiplexer 310 may be a TS signal output from the tuner unit 110, the demodulator 120 or the external device interface unit 130. The image processing unit 320 may perform image processing upon the demultiplexed image signal. The image processing unit 320 may include an image decoder 325 and a scaler 335.

The image decoder 325 decodes the demultiplexed image signal and the scaler 335 adjusts the resolution of the decoded image signal such that the image signal can be output through the display 180. The image decoder 325 may include various types of decoders. For example, the image decoder 325 may include at least one of an MPEG-2 decoder, an H.264 decoder, an MPEG-C decoder (MPEG-C part 3), an MVC decoder, and an FTV decoder.

The image signal decoded by the image processing unit 320 may include a 2D image signal alone, a mixture of a 2D image signal and a 3D image signal, or a 3D image signal alone. For example, an external image signal received from the photographing unit 190 or a broadcast image signal of a broadcast signal received through the tuner unit 110 may include a 2D image signal alone, a mixture of a 2D image signal and a 3D image signal, or a 3D image signal alone. Accordingly, thereafter, the controller 170, specifically, the image processing unit 320 in the controller 170, may perform signal processing upon the external image signal or the broadcast image signal to output a 2D image signal alone, a mixture of a 2D image signal and a 3D image signal, or a 3D image signal alone.

The image signal decoded by the image processing unit 320 may include a 3D image signal in various formats. For example, the decoded image signal may be a 3D image signal including a color difference image and a depth image, or a 3D image signal including multi-view image signals. The multi-view image signals may include, for example, a left-eye image signal and a right-eye image signal.

As shown in FIG. 4, the format of the 3D image signal may include a side-by-side format ((a) of FIG. 4) in which the left-eye image L and the right-eye image R are arranged in a horizontal direction, a top/down format ((b) of FIG. 4) in which the left-eye image and the right-eye image are arranged in a vertical direction, a frame sequential format ((c) of FIG. 4) in which the left-eye image and the right-eye image are arranged in a time division manner, an interlaced format ((d) of FIG. 4) in which the left-eye image and the right-eye image are mixed in lines, and a checker box format ((e) of FIG. 4) in which the left-eye image and the right-eye image are mixed in boxes.

The OSD generator 340 generates an OSD signal according to a user input signal or automatically. For example, the OSD generator 340 may generate a signal for displaying a variety of information as graphics or text on the screen of the display 180 based on a user input signal. The generated OSD signal may include a variety of data such as a user interface screen, various menu screens, a widget or an icon of the image display device 100. The generated OSD signal may include a 2D object or a 3D object.

The mixer 345 may mix the OSD signal generated by the OSD generator 340 with the image signal decoded by the image processing unit 320. In this instance, each of the OSD signal and the decoded image signal may include at least one of a 2D signal and a 3D signal. The mixed image signal is provided to the frame rate converter 350.

The frame rate converter 350 converts the frame rate of the input image. For example, a frame rate of 60 Hz is converted into 120 Hz or 240 Hz. In the case where the frame rate of 60 Hz is converted into 120 Hz, the frame rate converter 350 may insert a first frame between the first frame and a second frame or may insert a third frame estimated from the first frame and the second frame between the first frame and the second frame. In the case where the frame rate of 60 Hz is converted into 240 Hz, the frame rate converter 350 may insert the same three frames or three estimated frames between the frames.

The frame rate converter 350 may also directly output an input image signal without frame rate conversion. Preferably, when a 2D image signal is input to the frame rate converter 350, the frame rate converter 350 may directly output the 2D image signal without frame rate conversion. On the other hand, when a 3D image signal is input, the frame rate converter 350 may convert the frame rate of the 3D image signal as described above. The formatter 360 may receive the mixed signal (i.e., the mixture of the OSD signal and the decoded image signal) from the mixer 345 and separate it into a 2D image signal and a 3D image signal.

In the present specification, the 3D image signal includes a 3D object. Examples of such an object may include a Picture In Picture (PIP) image (still image or moving image), an EPG indicating broadcast program information, various menus, a widget, an icon, text, or an object, a person or a background present in an image, a web page (newspaper, magazine, or the like), etc. The formatter 360 may change the format of the 3D image signal to, for example, any of the various formats shown in FIG. 4.

FIG. 5 shows the operation of the 3D glasses 195 (specifically, shutter glasses) when the formatter 360 arranges and outputs the 3D image signal in the frame sequential format from among the formats shown in FIG. 4. Specifically, (a) of FIG. 5 shows the case where the left-eye glass of the shutter glasses 195 is opened and the right-eye glass of the shutter glasses is closed when the left-eye image L is displayed on the display 180 and (b) of FIG. 5 shows the case where the left-eye glass of the shutter glasses 195 is closed and the right-eye glass of the shutter glasses is opened when the right-eye image R is displayed on the display 180.

Shutter glasses may also be used as the viewing device 195 when the format of the 3D image signal is a side-by-side format ((a) of FIG. 4) or a top/down format ((b) of FIG. 4). In this case, the left and right-eye glasses of the shutter glasses may be kept opened and instead the polarization directions of the left and right-eye glasses may be different. That is, the shutter glasses may operate as passive-type polarized glasses.

The formatter 360 may switch a 2D image signal to a 3D image signal. For example, according to a 3D image generation algorithm, the formatter 360 may detect an edge or a selectable object from a 2D image signal and may then separate an object according to the detected edge or selectable object to generate a 3D image signal. The formatter 360 may then separate and arrange the generated 3D image signal into a left-eye image signal L and a right-eye image signal R as described above.

The controller 170 may further include a 3D processor for 3-dimensional (3D) effects signal processing, downstream of the formatter 360. The 3D processor may perform signal processing for brightness, tint, and color adjustment of an image signal in order to increase 3D effects. For example, the 3D processor may perform signal processing for making a near image portion clear and making a distant image portion unclear. The functions of the 3D processor may be incorporated into the formatter 360 or the image processing unit 320 as described later with reference to FIG. 6.

The audio processing unit in the controller 170 may perform audio processing upon the demultiplexed audio signal. To accomplish this, the audio processing unit may include various decoders. For example, when the demultiplexed audio signal is a coded audio signal, the audio processing unit may decode the coded audio signal. Specifically, when the demultiplexed audio signal is an audio signal coded based on the MPEG-2 standard, the audio processing unit may decode the audio signal using an MPEG-2 decoder. When the demultiplexed audio signal is an audio signal coded based on the MPEG 4 Bit Sliced Arithmetic Coding (BSAC) standard according to a terrestrial DMB scheme, the audio processing unit may decode the audio signal using an MPEG 4 decoder. When the demultiplexed audio signal is an audio signal coded based on the MPEG-2 Advanced Audio Codec (AAC) standard according to the satellite DMB or DVB-H scheme, the audio processing unit may decode the audio signal using an AAC decoder. When the demultiplexed audio signal is an audio signal coded based on the Dolby AC-3 standard, the audio processing unit may decode the audio signal using an AC-3 decoder.

The audio processing unit in the controller 170 may perform base and treble adjustment (equalization), volume adjustment, or the like. The data processing unit in the controller 170 may perform data processing upon the demultiplexed data signal. For example, if the demultiplexed data signal is a coded data signal, the data processing unit may decode the coded data signal. The coded data signal may be EPG information including broadcast information such as a start time and an end time of a broadcast program broadcast through each channel. For example, the EPG information may include ATSC-Program and System Information Protocol (ATSC-PSIP) information in the ATSC system and include DVB-Service Information (DVB-SI) in the DVB system. The ATSC-PSIP information and the DVB-SI may be included in a (4-byte) header of the above-described TS, that is, the MPEG-2 TS.

Although, in the example of FIG. 3, the signals from the OSD generator 340 and the image processing unit 320 are mixed by the mixer 345 and are then subjected to 3D processing by the formatter 360, embodiments of the present invention are not limited to the example of FIG. 3 and the mixer 345 may be located downstream of the formatter 360. That is, the formatter 360 may perform 3D processing upon the output of the image processing unit 320 to generate a 3D signal and the OSD generator 340 may generate an OSD signal and perform 3D processing upon the OSD signal to generate a 3D signal, and the mixer 345 may then mix the 3D signals.

The controller 170 shown in the block diagram of FIG. 3 is an embodiment of the present invention. Some of the components of the controller 170 may be combined or omitted or other components may be added thereto according to the type of the controller 170 that is actually implemented. In particular, the frame rate converter 350 and the formatter 360 may be individually provided outside the controller 170.

FIG. 6 illustrates various scaling schemes of a 3D image signal according to an embodiment of the present invention. As shown in FIG. 6, the controller 170 may perform 3D effects signal processing for increasing 3D effects on the 3D image signal. Specifically, the controller 170 may perform signal processing for adjusting the size or slope of a 3D object in the 3D image.

The controller 170 may wholly enlarge or reduce a 3D image signal or a 3D object 510 in the 3D image signal at a specific ratio as shown in (a) of FIG. 6, where the reduced 3D object is denoted by "512". In addition, the controller 170 may partially enlarge or reduce the 3D object 510 into trapezoidal forms 514 and 516 as shown in (b) and (c) of FIG. 6. The controller 170 may also rotate at least part of the 3D object 510 into a parallelogram form 518 as shown in (d) of FIG. 6. The stereoscopic effect (i.e., 3D effect) of the 3D image or the 3D object in the 3D image can be more emphasized through such scaling (i.e., size adjustment) or slope adjustment.

The difference between both parallel sides of the parallelogram form 514 or 516 increases as shown in (b) and (c) of FIG. 6 or the rotation angle increases as shown in (d) of FIG. 6 as the slope increases. The size adjustment or slope adjustment may be performed after the formatter 360 arranges the 3D image signal in a specific format. The size adjustment or slope adjustment may be performed by the scaler 335 in the image processing unit 320. The OSD generator 340 may generate an OSD object in any of the forms illustrated in FIG. 6 to emphasize 3D effects.

Signal processing such as brightness, tint, or color adjustment, in addition to size or slope adjustment illustrated in FIG. 6, may be performed on an image signal or object to increase 3D effects. For example, signal processing may be performed for making a near portion clear and making a distant portion unclear. Such 3D effects signal processing may be performed in the controller 170 or in a separate 3D processor. When the 3D effects signal processing is performed in the controller 170, the 3D effects signal processing may be performed, together with size or slope adjustment, in the formatter 360 or may be performed in the image processing unit 320.

Figure 7:
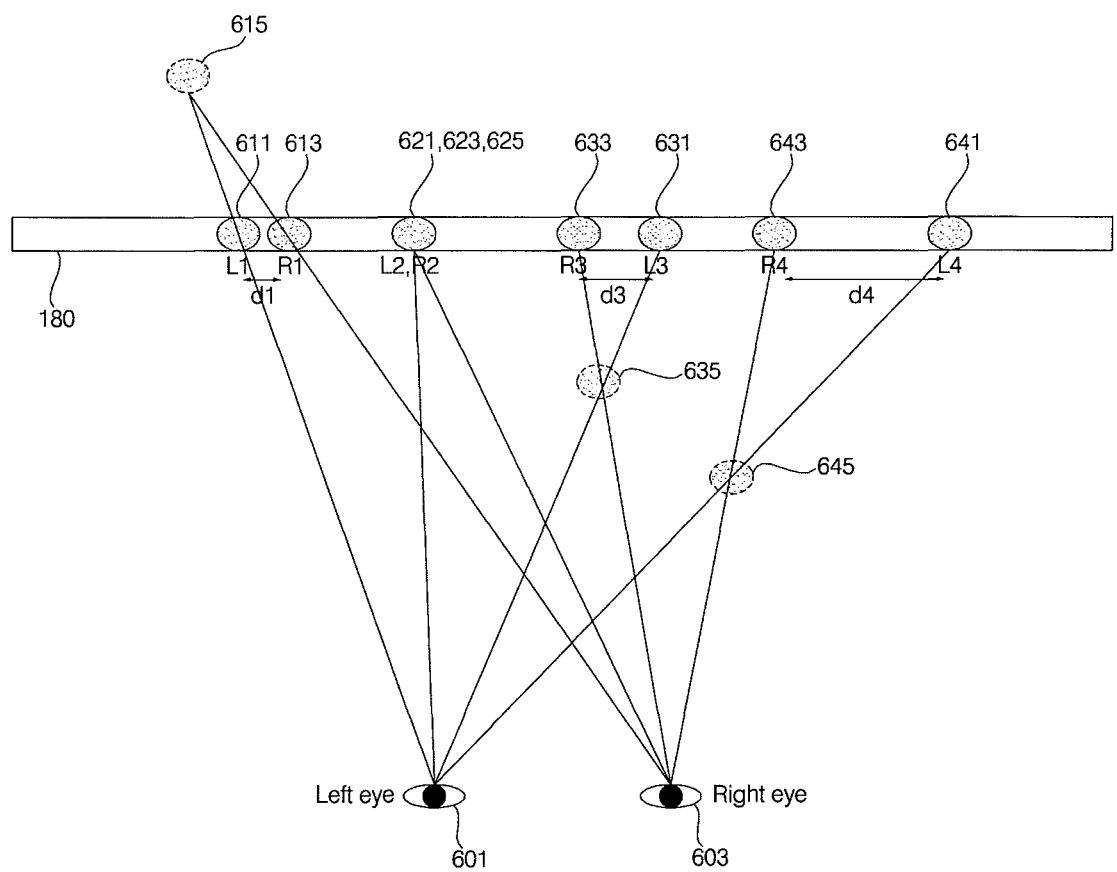
FIG. 7 illustrates image formation by a left-eye image and a right-eye image.
Figure 8:
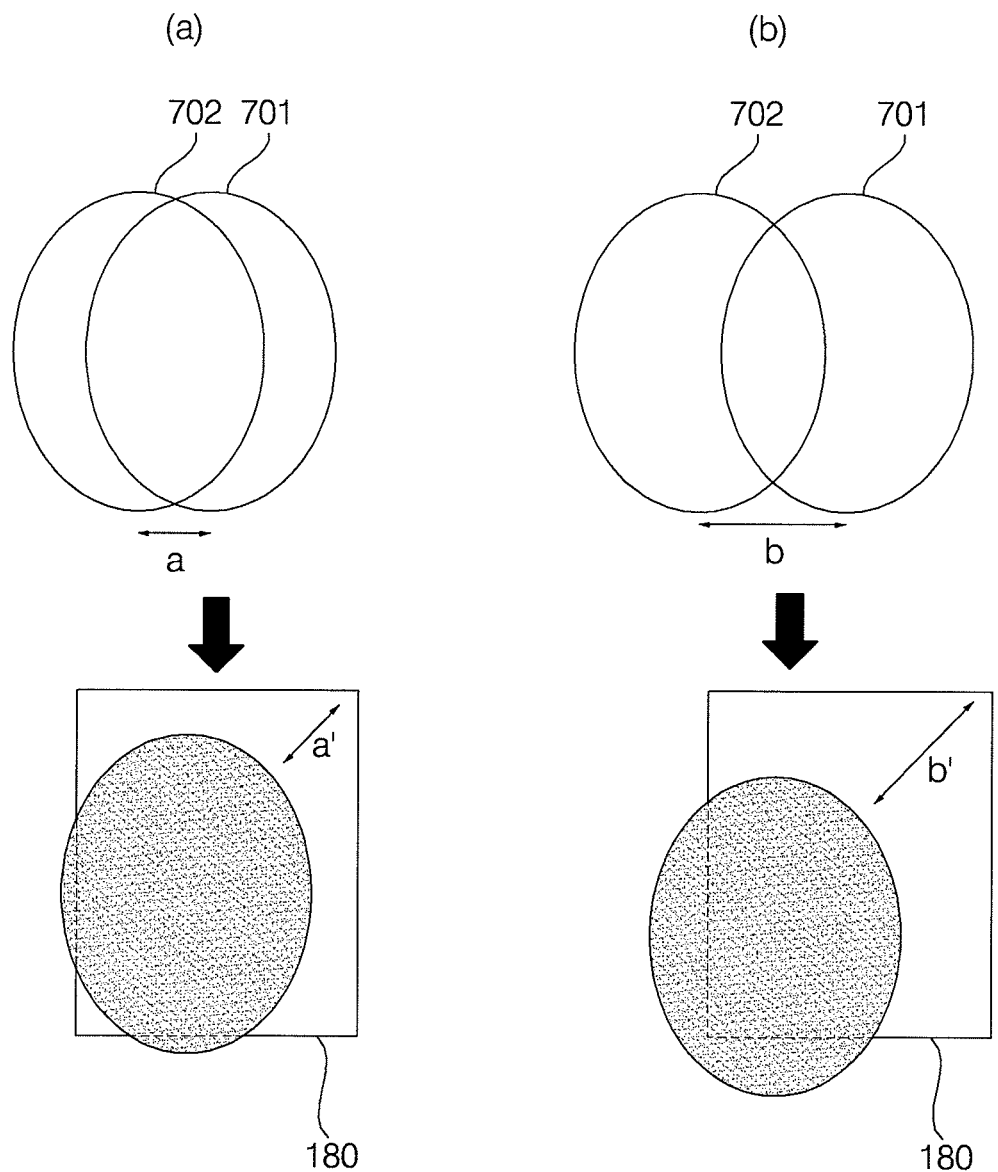
FIG. 8 illustrates the depth of a 3D image according to the distance between a left-eye image and a right-eye image.

FIG. 7 illustrates image formation by a left-eye image and a right-eye image, and FIG. 8 illustrates the depth of a 3D image according to the distance between a left-eye image and a right-eye image. A plurality of images or a plurality of objects 615, 625, 635 and 645 are illustrated in FIG. 7.

First, the first object 615 includes a first left-eye image 611 (L) based on a first left-eye image signal and a first right-eye image 613 (R) based on a first right-eye image signal. A distance between the first right-eye image 613 and the first left-eye image 611 on the display 180 is dl as illustrated. In this instance, the user perceives that an image is formed at an intersection of a line connecting the left eye 601 and the first left-eye image 611 and a line connecting the right eye 603 and the first right-eye image 613. Accordingly, the user perceives that the first object 615 is located behind the display unit 180.

Next, the second object 625 includes a second left-eye image 621 (L) and a second right-eye image 623 (R). Since the second left-eye image 621 and the second right-eye image 623 are displayed so as to overlap each other on the display unit 180, a distance between the second left-eye image 621 and the second right-eye image 623 is 0 as illustrated. Accordingly, the user perceives that the second object 625 is located on the display 180.

Next, the third object 635 includes a third left-eye image 631 (L) and a third right-eye image 633 (R), and the fourth object 645 includes a fourth left-eye image 641 (L) and a fourth right-eye image 643 (R). The distance between the third left-eye image 631 and the third right-eye image 633 is d3 and the distance between the fourth left-eye image 641 and the fourth right-eye image 643 is d4 as illustrated.

According to the above-described method, the user perceives that the third object 635 and the fourth object 645 are located at image formation locations and thus are located in front of the display 180 as shown in FIG. 7. In this instance, the user perceives that the fourth object 645 is located in front of the third object 635, i.e., protrudes from the third object 635, since the distance d4 between the fourth left-eye image 641 (L) and the fourth right-eye image 643 (R) is greater than the distance d3 between the third left-eye image 631 (L) and the third right-eye image 633 (R).

In the embodiment of the present invention, the distance between the display 180 and each of the objects 615, 625, 635 and 645, which is perceived by the user, is expressed by a "depth". The depth of the object that appears to the user to be located behind the display 180 has a negative value (−) and the depth of the object that appears to the user to be located in front of the display 180 has a positive value (+). That is, the depth increases as the degree of protrusion of the object from the display toward the user increases.

From FIG. 8, it can be seen that, when the distance a between a left-eye image 701 and a right-eye image 702 shown in (a) of FIG. 8 is less than the distance b between a left-eye image 701 and a right-eye image 702 shown in (b) of FIG. 8, the depth a' of the 3D object of (a) of FIG. 8 is less than the depth b' of the 3D object of (b) of FIG. 8.

When the 3D image includes a left-eye image and a right-eye image, a position at which the image is formed as perceived by the user changes according to the distance between the left-eye image and the right-eye image. Accordingly, by adjusting the displayed distance between the left-eye image and the right-eye image, it is possible to adjust the depth of the 3D image or the 3D object including the left-eye image and the right-eye image.

Figure 9:
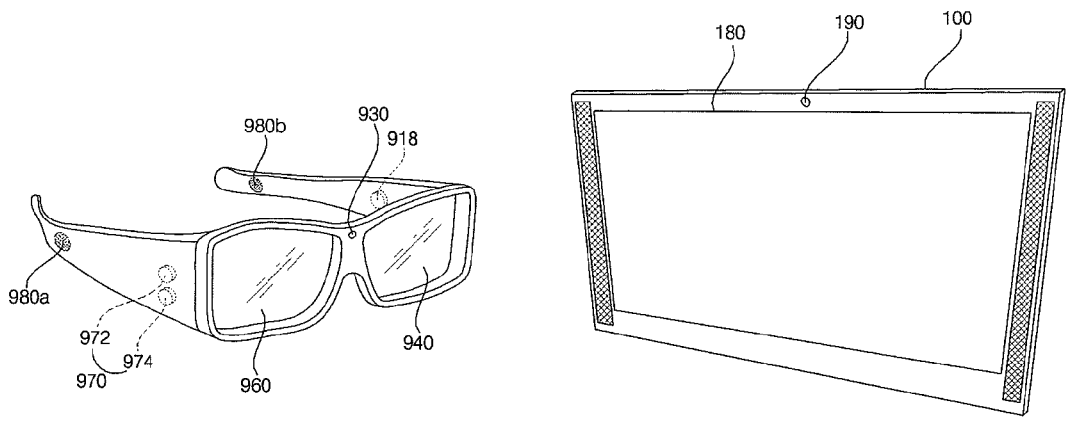
FIG. 9 illustrates a viewing device and an image display device according to an embodiment of the present invention.
Figure 10:
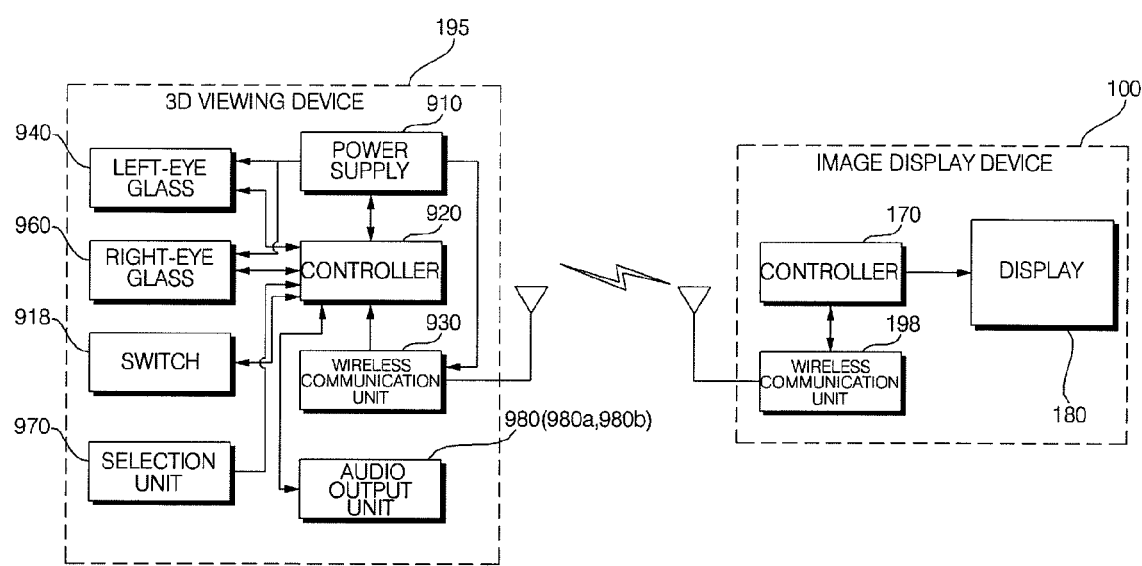
FIG. 10 is a block diagram of the viewing device and the image display device of FIG. 9.

FIG. 9 illustrates a viewing device and an image display device according to an embodiment of the present invention and FIG. 10 is a block diagram of the viewing device and the image display device of FIG. 9. As shown in FIGS. 9 and 10, the viewing device 195 according to the embodiment of the present invention may include a power supply unit 910, a switch 918, a controller 920, a wireless communication unit 930, a left-eye glass 940, a right-eye glass 960, a selection unit 970, and an audio output unit 980.

The power supply unit 910 supplies power to a left-eye glass 940 and a right-eye glass 950. As described above with reference to FIGS. 4 to 6, a drive voltage VthL is applied to the left-eye glass 940 and a drive voltage VthR is applied to the right-eye glass 960. Liquid crystal alignment in the left-eye glass 940 and the right-eye glass 960 may be changed according to the applied drive voltages VthL and VthR and light transmittance of the left-eye glass 940 and the right-eye glass 960 may be changed accordingly. Thus, each of the left-eye glass 940 and the right-eye glass 960 may be opened according to the applied drive voltage.

The levels of the drive voltages VthL and VthR may be different. Particularly, when the viewing device 195 is of a type which changes the polarization directions of the left-eye glass 940 and the right-eye glass 950, the polarization directions of the left-eye and right-eye glasses 940 and 950 may be changed according to the drive voltages VthL and VthR. The power supply unit 910 may supply operation power to the controller 920 and the wireless communication unit 930 in the viewing device 195.

The switch 918 is used to turn on or off the viewing device 195. Specifically, the switch 918 is used to turn on or off the operation power of the viewing device 195. That is, when the switch 918 is turned on, the power supply unit 910 is activated to supply the operation power to the controller 920, the wireless communication unit 930, the left-eye glass 940, and the right-eye glass 960.

The controller 920 may control the left-eye glass 940 and the right-eye glass 960 in the viewing device 195 to be opened or closed in synchronization with a left-eye image frame and a right-eye image frame displayed on the display 180 of the image display device 100. In this instance, the controller 920 may open or close the left-eye glass 940 and the right-eye glass 960 in synchronization with a synchronization signal Sync received from the wireless communication unit 198 in the image display device 100.

In the case where a 2D image is displayed on the image display device 100, the controller 920 may control the left-eye glass 940 and the right-eye glass 960 to be simultaneously opened or closed in synchronization with the synchronization signal Sync. In the case where a 3D image is displayed on the image display device 100, the controller 920 may control the left-eye glass 940 and the right-eye glass 960 to be alternately opened or closed in synchronization with the synchronization signal Sync.

The controller 920 may control the operation of the power supply unit 910 and the wireless communication unit 930. When the switch 918 is turned on, the controller 920 may control the power supply unit 910 to be activated to supply power to each component. The controller 920 may control the wireless communication unit 930 to transmit a pairing signal to the image display device 100 to perform pairing with the image display device 100. The controller 920 may also receive a pairing signal from the image display device 100.

The wireless communication unit 930 may transmit or receive data to or from the wireless communication unit 198 of the image display device 100 using an Infrared (IR) scheme or a Radio Frequency (RF) scheme. Specifically, the wireless communication unit 930 may receive a synchronization signal Sync for opening or closing the left-eye glass 940 and the right-eye glass 960 from the wireless communication unit 198 of the image display device 100. Opening and closing operations of the left-eye glass 940 and the right-eye glass 960 are controlled according to the synchronization signal Sync.

The wireless communication unit 930 may transmit or receive a pairing signal to or from the image display device 100. The wireless communication unit 930 may also receive a synchronization signal from the image display device 100. The wireless communication unit 930 may also transmit a signal indicating whether or not the viewing device 195 is being used to the image display device 100.

The left-eye glass 940 and the right-eye glass 960 may be active-type left-eye and right-eye glasses that are opened according to an applied electrical signal (voltage or current). For example, the left-eye glass 940 and the right-eye glass 960 may be opened according to a synchronization signal Sync from the image display device 100. The viewing device 195 may be shutter glasses as described above. The polarization directions of the left-eye glass 940 and the right-eye glass 960 may also be changed according to an applied voltage.

The selection unit 970 is used to select an image that can be viewed on the viewing device 195. Although search buttons 972 and a selection button 974 (OK button) are illustrated as components of the selection unit 970, the selection unit 970 may include only the search buttons or may further include a menu button. The search buttons 972 may include an up button and a down button as described later. For example, the up button may be operated to change a broadcast image of channel 9 (CH 9), which is displayed in synchronization with the viewing device 195, to search for a broadcast image of channel 10 (CH 10). Then, the selection button 974 may be operated to select the broadcast image of channel 10 (CH 10). This allows the broadcast image of channel 10 (CH 10) to be displayed on the display 180 in synchronization with the viewing device 195. In embodiments of the present invention, instead of using the search buttons 972 including an up button and a down button to change the image and/or the broadcast channels, gestures, motions or movements made by a user, sounds (such as speech) or noise made by the user, or other means may be used to change the image and/or the broadcast channels.

A channel search signal or a channel selection signal from the selection unit 970 may be transmitted to the image display device 100 through the wireless communication unit 930 described above.

The audio output unit 980 may output audio associated with the image, which is displayed in synchronization with the corresponding viewing device 195. To accomplish this, the audio output unit 980 may include left and right audio output portions 980a and 980b. For example, when a broadcast image of channel 9 (CH 9) is displayed in synchronization with a first viewing device 195a (shown in FIG. 13A, for example), an audio signal of channel 9 (CH 9) may be output through an audio output unit of the first viewing device 195a. In addition, when a broadcast image of channel 10 (CH 10) is displayed in synchronization with a second viewing device 195b (shown in FIG. 13E, for example), an audio signal of channel 10 (CH 10) may be output through an audio output unit of the second viewing device 195b.

The audio signals of the image may be received by the wireless communication unit 930. The image display device 100 may include the wireless communication unit 198, the controller 170, and the display 180 as described above. The following description will be given focusing on the operation of the viewing device 195.

When a viewing device 195 is detected, the wireless communication unit 198 in the image display device 100 may transmit a pairing signal to the viewing device 195 for pairing with the viewing device 195. The wireless communication unit 198 may also receive a response signal from the viewing device 195. In the wireless communication unit 198 in the image display device 100 may transmit a synchronization signal Sync to the viewing device 195. The wireless communication unit 198 may also transmit a signal indicating whether a 2D or 3D image is displayed. This allows the left-eye glass 940 and the right-eye glass 960 of the viewing device 195 to be simultaneously opened or closed or to be alternately opened or closed. When a plurality of viewing devices are present, the wireless communication unit 198 in the image display device 100 may transmit corresponding synchronization signals respectively to the viewing devices. The wireless communication unit 198 may also transmit audio signals for audio output to the viewing devices.

The controller 170 in the image display device 100 performs a control operation to output pairing signals, synchronization signals, and audio signals. When a new viewing device is detected, the controller 170 performs a control operation to increase the vertical synchronization frequency of a displayed image, to output a synchronization signal corresponding to the new viewing device, and to display the image. Wireless communication between the image display device 100 and the viewing device 195 may be performed using various communication schemes such as IR, RF, and Bluetooth schemes.

FIGS. 11 and 12 are flow charts illustrating a method for operating an image display device according to an embodiment of the present invention and FIGS. 13A to 16C are drawings used to explain various examples of the method for operating an image display device shown in FIGS. 11 and 12. Referring to FIG. 11, first, a first image is displayed in synchronization with a first viewing device (S1110).

Specifically, when use of the first viewing device is detected, the controller 170 performs a control operation to transmit a synchronization signal to the first viewing device after performing pairing with the first viewing device. The controller 170 then performs a control operation to display the first image in synchronization with the first viewing device. In this instance, use of the first viewing device may be detected through the sensor unit 160 or the photographing unit 190. The position of the first viewing device may also be detected.

The displayed first image may be a broadcast image, an external input image such as a DVD image or a PC image, which is input from an external device, or an image stored in the storage unit 140. The first image may also be a still or moving image and may also be a 2D or 3D image. Left-eye and right-eye glasses of the first viewing device may be simultaneously opened when the displayed first image is a 2D image and may be alternately opened when the displayed first image is a 3D image (particularly, a 3D image in a frame sequential format).

In the following description, it is assumed that the image displayed on the image display device is a 2D image.

Figure 13A:
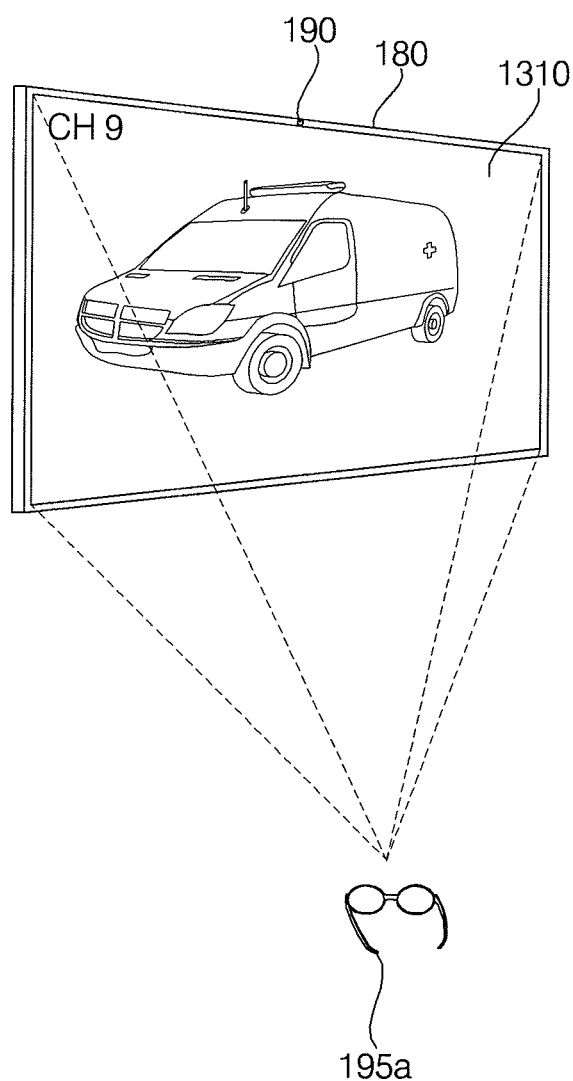
FIGS. 13A to 16C are drawings used to explain various examples of the method for operating an image display device shown in FIGS. 11 and 12.

FIG. 13A illustrates that a broadcast image 1310 of a specific channel (CH 9) is displayed on the display 180 on which the photographing unit 190 is provided at an upper portion thereof. In this instance, left-eye and right-eye glasses of the first viewing device 195a are simultaneously opened in synchronization with a synchronization signal Sync received by the first viewing device 195a. This allows a user wearing the first viewing device 195a to view the broadcast image 1310.

The controller 170 then determines whether or not a second viewing device is being used (S1115). When the second viewing device is being used, the controller 170 performs pairing between the second viewing device and the image display device (S1120). The controller 170 then displays the first image on the display 180 in synchronization with the second viewing device at a different time than when the first image is displayed in synchronization with the first viewing device (S1125).

The controller 170 determines whether or not the second viewing device is being used through the sensor unit 160 or the photographing unit 190. For example, the controller 170 determines that the second viewing device is being used when a second user wears the second viewing device or has turned on a switch attached to the second viewing device. Additionally, the controller 170 may determine that the second viewing device is being used when the second viewing device comes into a certain range or is within a certain range of the display 180.

The controller 170 performs pairing with the second viewing device by transmitting a pairing signal to the second viewing device and receiving a response signal from the second viewing device. In this instance, the controller 170 may allocate a wireless band different from that allocated to the first viewing device to the second viewing device.

Figure 13B:
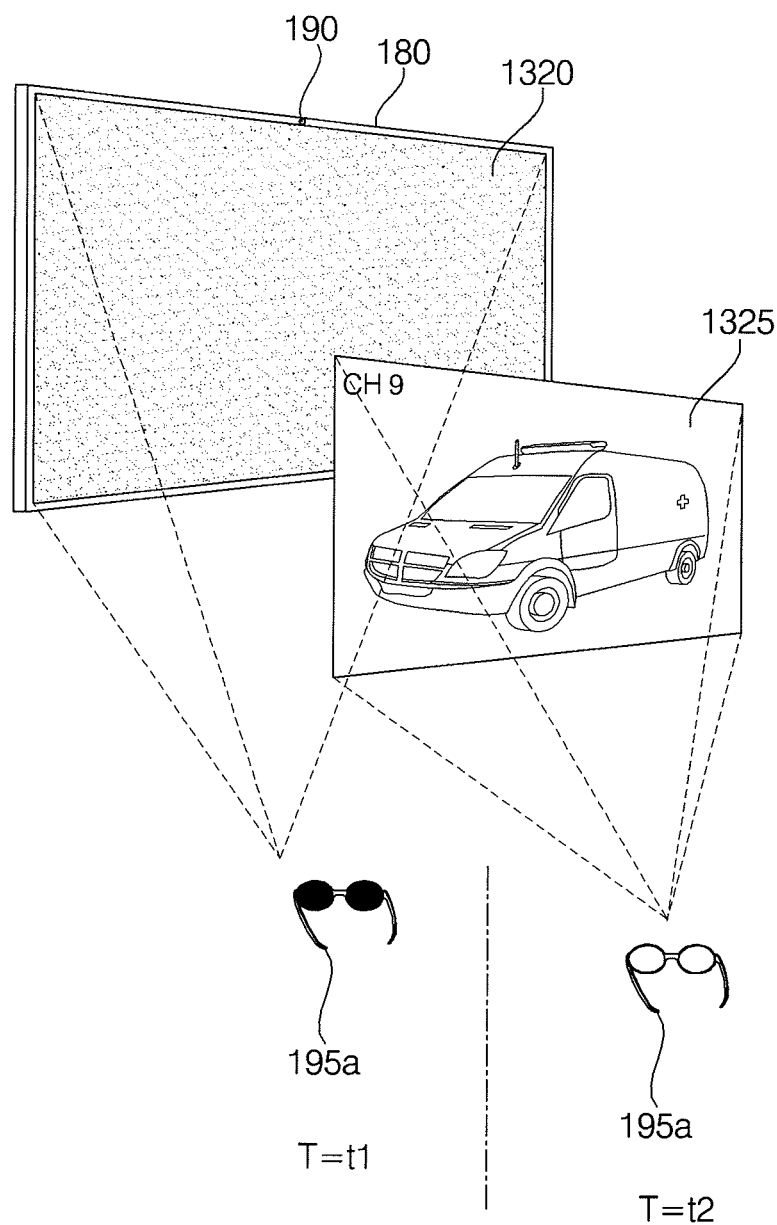
Figure 13C:
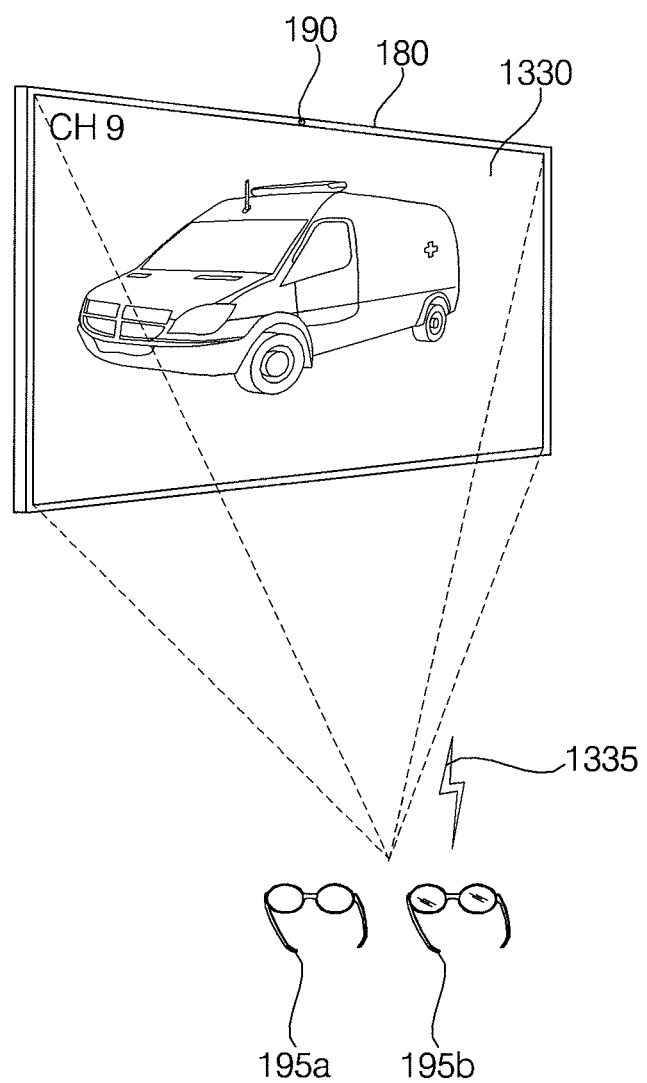

FIG. 13C illustrates an operation for performing pairing between the second viewing device 195b and the image display device 100 while an image 1330 of a specific channel (CH 9) is being displayed on the display 180 in synchronization with the first viewing device 195a. In one example, a pairing signal 1335 may be transmitted from the image display device 100 to the second viewing device 195b. In another example, a pairing signal 1335 may be transmitted from second viewing device 195b to the image display device 100.

The controller 170 performs a control operation to display the same image as the first image, which is displayed in synchronization with the first viewing device, also in synchronization with the second viewing device. To accomplish this, the controller 170 performs a control operation to transmit a synchronization signal Sync2, which is different from a synchronization signal Sync1 transmitted to the first viewing device, to the second viewing device. The controller 170 then performs a control operation to display the first image in synchronization with the second viewing device. A first image that is initially displayed in synchronization with the second viewing device, which is newly used, is the same as an image that is displayed in synchronization with the first viewing device unless the second viewing device is set in a different manner.

FIG. 13D illustrates an example in which a first broadcast image 1340 of a specific channel (CH 9) is displayed on the display 180 in synchronization with the first viewing device 195a and a first broadcast image 1345 of the same channel (CH 9) is displayed on the display 180 in synchronization with the second viewing device 195b. In this instance, the first broadcast images 1340 and 1345 are displayed at different times (T=t3 and t4) and thus the left-eye and right-eye glasses of the first viewing device 195a are opened at the time t3 and the left-eye and right-eye glasses of the second viewing device 195b are opened at the time t4. Accordingly, a first user and a second user wearing the first viewing device 195a and the second viewing device 195b, respectively, can view the same broadcast image.

A broadcast image selection signal of a different channel is then received (S1130). A broadcast image selected according to the received broadcast image selection signal is then displayed in synchronization with the second viewing device (S1135). A broadcast image selection signal may be transmitted from a remote control device or a viewing device. For example, a different channel may be selected using the selection unit 970 of the viewing device 195. Of course, it is also possible to select an external input image other than a broadcast image.

In another example, a different channel may be selected using the remote control device 200. In this instance, each user or each viewing device may be discriminated through the sensor unit 160 or the photographing unit 190 in order to discriminate channel selection by each user.

Figure 13E:
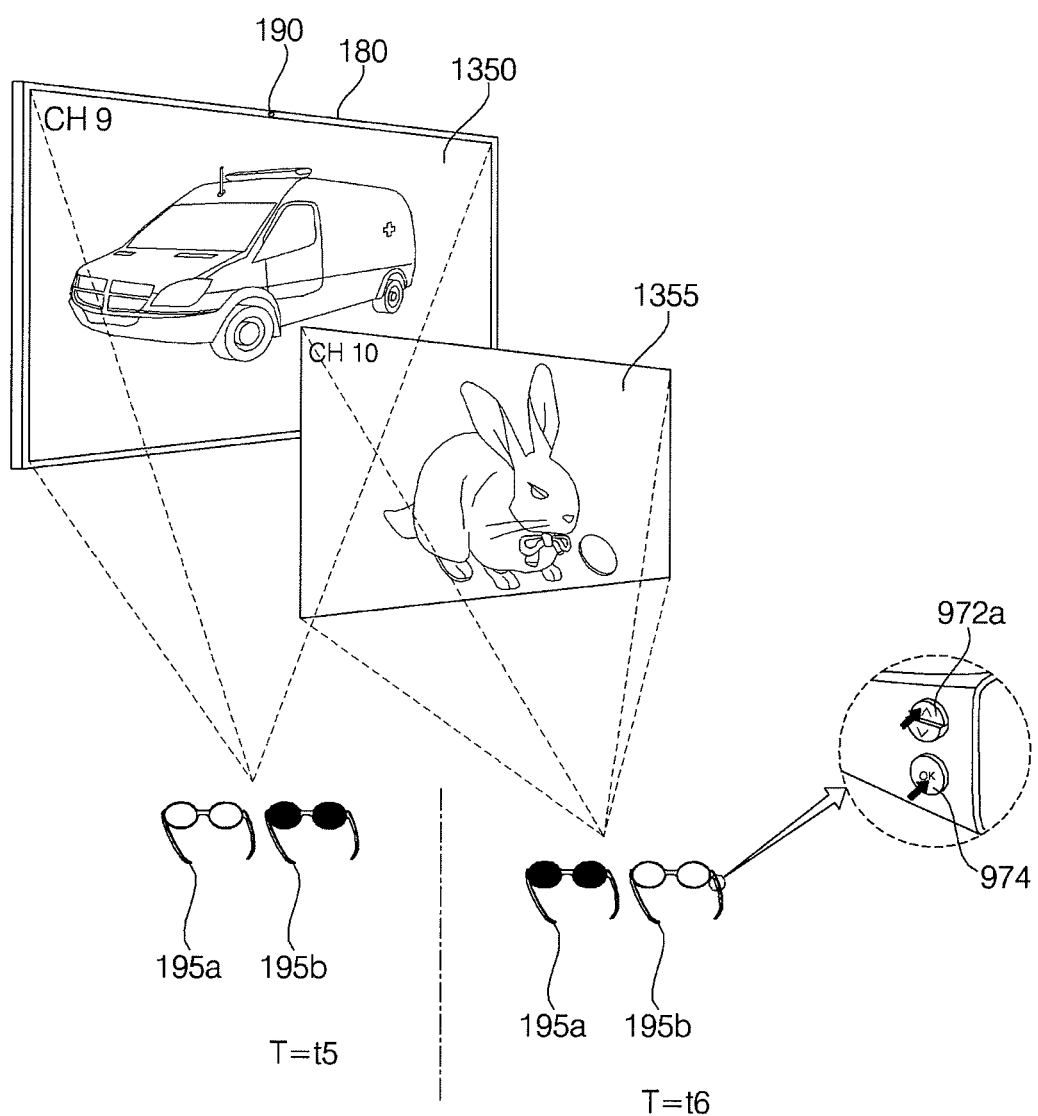

FIG. 13E illustrates how a different channel is selected using the selection unit 970 of the second viewing device 195b. The selection unit 970 of the second viewing device 195b may include search buttons 972 and a selection button 974 (OK button) as described above. When a user wearing the second viewing device 195b has pressed an up button 972a included in the search buttons 972, a channel number that is searched for may be increased. Then, when the user has pressed the selection button 974 (OK button), the increased channel number (CH 10) may be selected. A corresponding channel search signal or channel selection signal may be transmitted from the second viewing device 195b to the image display device 100.

Accordingly, a first broadcast image 1350 of the specific channel (CH9) is displayed in synchronization with the first viewing device 195a and a second broadcast image 1355 of the changed or increased channel number (CH 10) is displayed in synchronization with the second viewing device 195b. In this instance, the first broadcast image 1350 and the second broadcast image 1355 are displayed at different times (T=t5 and t6) and thus the left-eye and right-eye glasses of the first viewing device 195a are opened at the time t5 and the left-eye and right-eye glasses of the second viewing device 195b are opened at the time t6. For example, at T=t5, the first viewer using the first viewing device 195a is able to view an image, such as the first broadcast image 1350 of the specific channel (CH9) but the second viewer using the second viewing device 195b is unable to view the image, such as the first broadcast image 1350 of the specific channel (CH9). Similarly, at T=t6, the second the first viewer using the second viewing device 195b is able to view an image, such as the second broadcast image 1355 of the channel number (CH10) but the first viewer using the first viewing device 195a is unable to view the image, such as the second broadcast image 1355 of the channel number (CH10). Accordingly, a first user and a second user wearing the first viewing device 195a and the second viewing device 195b, respectively, can view different broadcast images.

Next, reference is made to FIG. 12. As shown in FIG. 12, an initial image is displayed on the display 180 (S1210). When no viewing devices are being used, the controller 170 displays the initial image on the display 180. Then, the controller 170 determines whether or not a first viewing device is being used (S1215). When the first viewing device is being used, the controller 170 performs pairing between the first viewing device and the image display device 100 (S1220).

As described above, use of the first viewing device may be detected through the sensor unit 160 or the photographing unit 190 and the controller 170 may determine whether or not the first viewing device is being used through such detection. Upon determining that the first viewing device is being used, the controller 170 performs a control operation to transmit a pairing signal. For example, the pairing signal may be transmitted from the wireless communication unit 198 of the image display device 100 to the first viewing device. Then, the first viewing device may transmit a response signal in response to the pairing signal. The controller 170 may receive the response signal through the wireless communication unit 198. Accordingly, pairing between the image display device 100 and the first viewing device may be completed.

A second image is then displayed in synchronization with the paired first viewing device at a different time than when the first image is displayed (S1225). Then, a synchronization signal which is in synchronization with a second image is transmitted to the first viewing device (S1230).

The controller 170 performs a control operation to display the second image on the display 180 at a different time than when the first image is displayed on the display 180. A synchronization signal Sync is transmitted to the first viewing device to enable viewing of the second image on the first viewing device.

The method for operating the image display device of FIG. 11 and the method for operating the image display device of FIG. 12 are similar with only a slight difference. The difference is that the same number of images as the number of viewing devices are displayed at different times in the method of FIG. 11, whereas a greater number of images than the number of viewing devices by one are displayed at different times in the method of FIG. 12. In this instance, the image that is not in synchronization with the viewing devices may be a scrambled image. Thus, a user who does not wear the viewing device is not allowed to view a correct image. This example may be applied to a secret conference or the like or may be applied according to the age group or the program rating.

This mode is referred to as a "secret mode" and may be implemented in a separate menu. For example, a greater number of images than the number of viewing devices may be displayed when a secret mode has been entered according to the operation method of FIG. 12 while the same number of images as the number of viewing devices are being displayed in a normal mode according to the operation method of FIG. 11.

FIG. 13B illustrates an example in which a scrambled image 1320 is displayed on the display 180 and a broadcast image 1325 of a specific channel (CH 9) is displayed at a different time in synchronization with the first viewing device 195a. In this instance, the scrambled image 1320 and the broadcast image 1325 are displayed at different times t1 and t2 and the left-eye and right-eye glasses of the first viewing device 195a are opened only at the time t2. Accordingly, only a user wearing the first viewing device 195a can view the broadcast image 1325.

Figure 14:
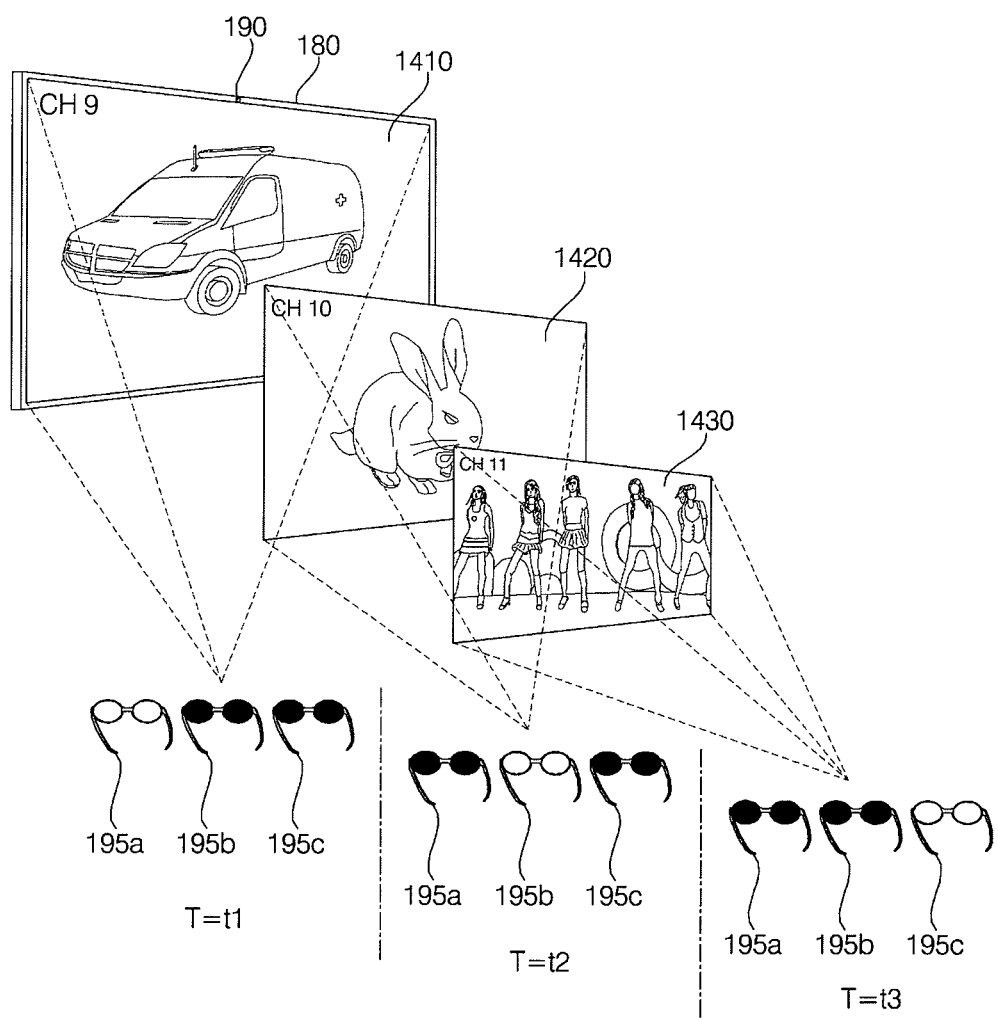

FIG. 14 illustrates an example in which broadcast images are displayed in synchronization with three viewing devices, respectively. Similar to FIG. 13E, in this example, a first broadcast image 1410 of a specific channel (CH 9) is displayed on the display 180 in synchronization with a first viewing device 195a, a second broadcast image 1420 of another channel (CH 10) is displayed in synchronization with a second viewing device 195b, and a third broadcast image 1430 of another channel (CH 11) is displayed in synchronization with a third viewing device 195c. That is, the same number of corresponding images as the number of viewing devices are displayed at different times.

In this instance, the first to third broadcast images 1410, 1420, and 1430 are displayed at different times t1, t2, and t3, and thus left-eye and right-eye glasses of the first viewing device 195a are opened at the time t1, left-eye and right-eye glasses of the second viewing device 195b are opened at the time t2, and left-eye and right-eye glasses of the third viewing device 195c are opened at the time t3.

The vertical synchronization frequency Vsync of the displayed images may increase as the number of viewing devices increases. For example, when the number of viewing devices is 2 as shown in FIG. 13E, the vertical synchronization frequency Vsync of the first broadcast image 1350 and the second broadcast image 1355 may be 120 Hz since the first broadcast image 1350 and the second broadcast image 1355 are displayed in synchronization with the first viewing device 195a and the second viewing device 195b, respectively, for ⅟₆₀th of a second.

On the other hand, when the number of viewing devices is 3 as shown in FIG. 14, the vertical synchronization frequency Vsync of the first to third broadcast images 1410, 1420, and 1430 may be 180 Hz since the first to third broadcast images 1410, 1420, and 1430 are displayed in synchronization with the first to third viewing devices 195a, 195b, and 195c, respectively, for ⅟₆₀th of a second.

In the case where a scrambled image is displayed in addition to images that are in synchronization with the three viewing devices as shown in FIG. 13B, the vertical synchronization frequency Vsync of the images may be 240 Hz.

The controller 170 may perform a control operation to receive the same number of images as the number of detected viewing devices. That is, when viewing devices have been detected through the sensor unit 160 or the photographing unit 190, broadcast images of the same number of channels as the number of detected viewing devices may be received or the same number of external input images as the number of detected viewing devices may be received so as to display the same number images as the number of detected viewing devices. Accordingly, the same number of corresponding images as the number of viewing devices can be displayed immediately upon detection of the viewing devices.

Figure 15A:
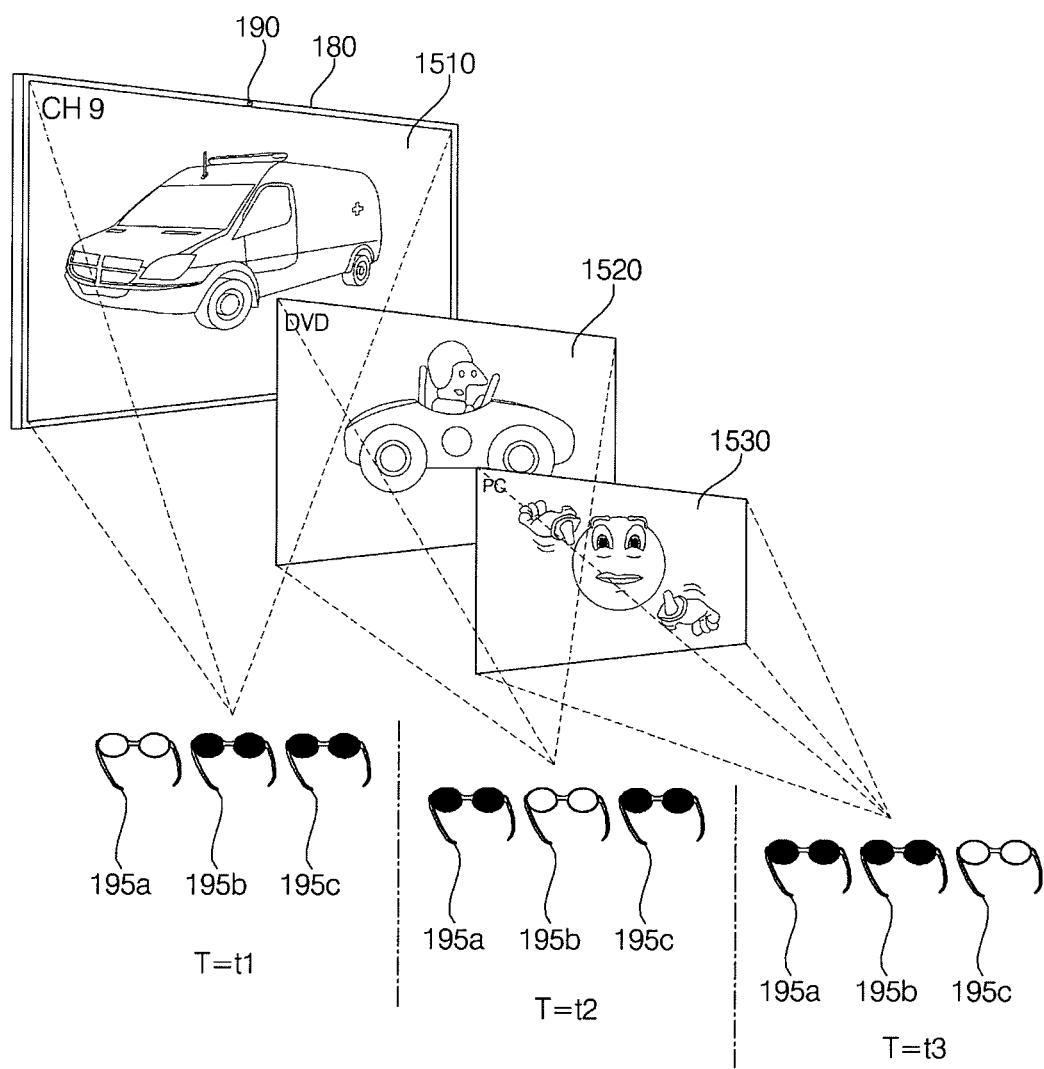
Figure 15B:
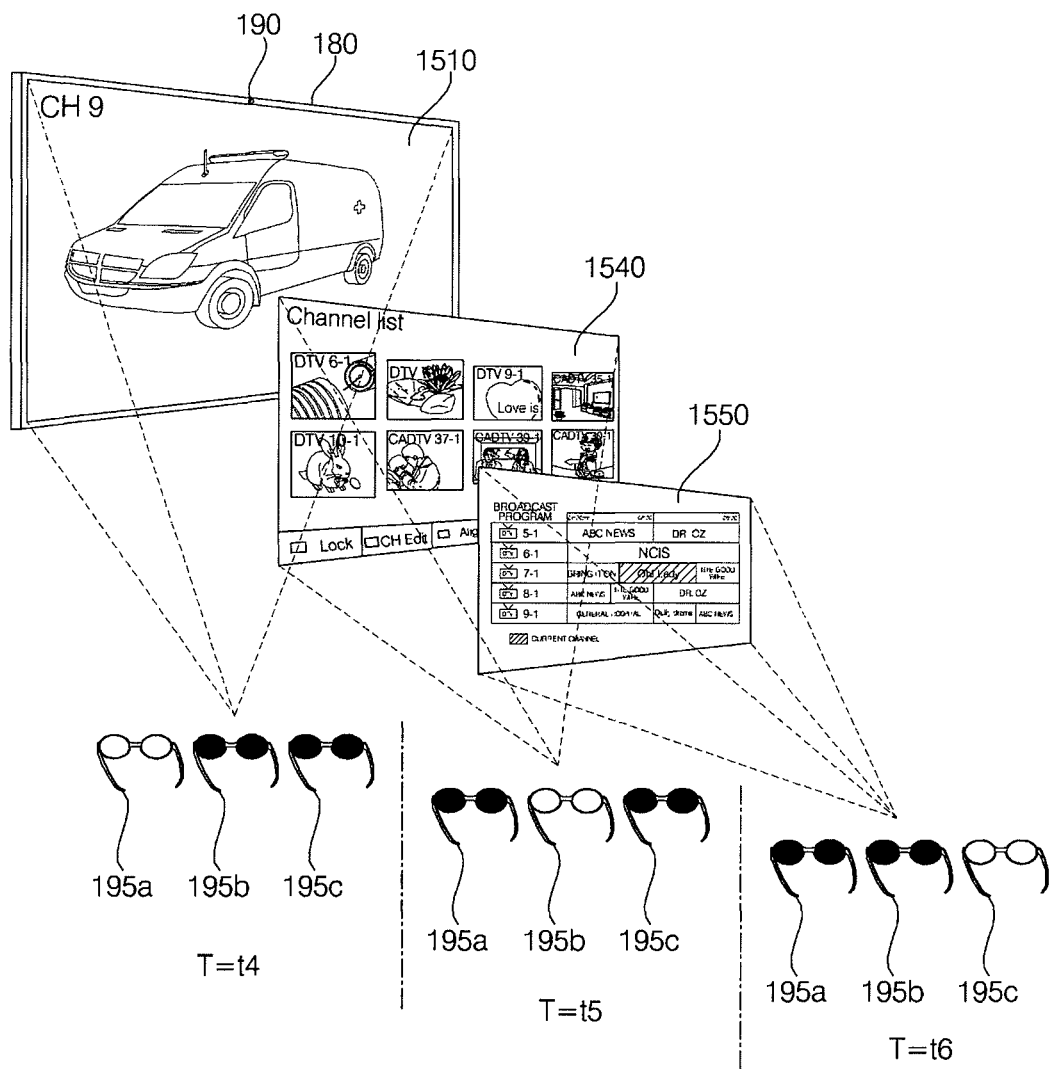

FIGS. 15A and 15B illustrate examples in which different types of images from broadcast images are displayed in synchronization with different viewing devices. First, in the example of FIG. 15A, a broadcast image 1510 of a specific channel (CH9) is displayed on the display 180 in synchronization with the first viewing device 195a, a DVD image 1520 is displayed in synchronization with the second viewing device 195b, and a PC image 1530 is displayed in synchronization with the third viewing device 195c. That is, images from different sources are displayed at different times in synchronization respectively with different viewing devices. This allows each user to view a desired image.

In this instance, the broadcast image 1510, the DVD image 1520, and the PC image 1530 are displayed at different times t1, t2, and t3 and thus left-eye and right-eye glasses of the first viewing device 195a are opened at the time t1, left-eye and right-eye glasses of the second viewing device 195b are opened at the time t2, and left-eye and right-eye glasses of the third viewing device 195c are opened at the time t3. Thus, at T=t1, only a user of the first viewing device 195a can view the broadcast image 1510; at T=t2, only a user of the second viewing device 195b can view the DVD image 1520; and at T=t3, only a user of the third viewing device 195c can view the PC image 1530.

Next, in the example of FIG. 15B, a broadcast image 1510 of a specific channel (CH 9) is displayed in synchronization with the first viewing device 195a, a thumbnail list 1540 is displayed as an All view image in synchronization with the second viewing device 195b, and an EPG screen 1550 is displayed in synchronization with the third viewing device 195c. That is, images from different sources are displayed at different times in synchronization respectively with viewing devices. This allows each user to view a desired image using the same display concurrently.

In this instance, the broadcast image 1510, the thumbnail list 1540, and the EPG screen 1550 are displayed at different times t4, t5, and t6, and thus left-eye and right-eye glasses of the first viewing device 195a are opened at the time t4, left-eye and right-eye glasses of the second viewing device 195*b* are opened at the time t5, and left-eye and right-eye glasses of the third viewing device 195*c* are opened at the time t6.

Figure 16A:
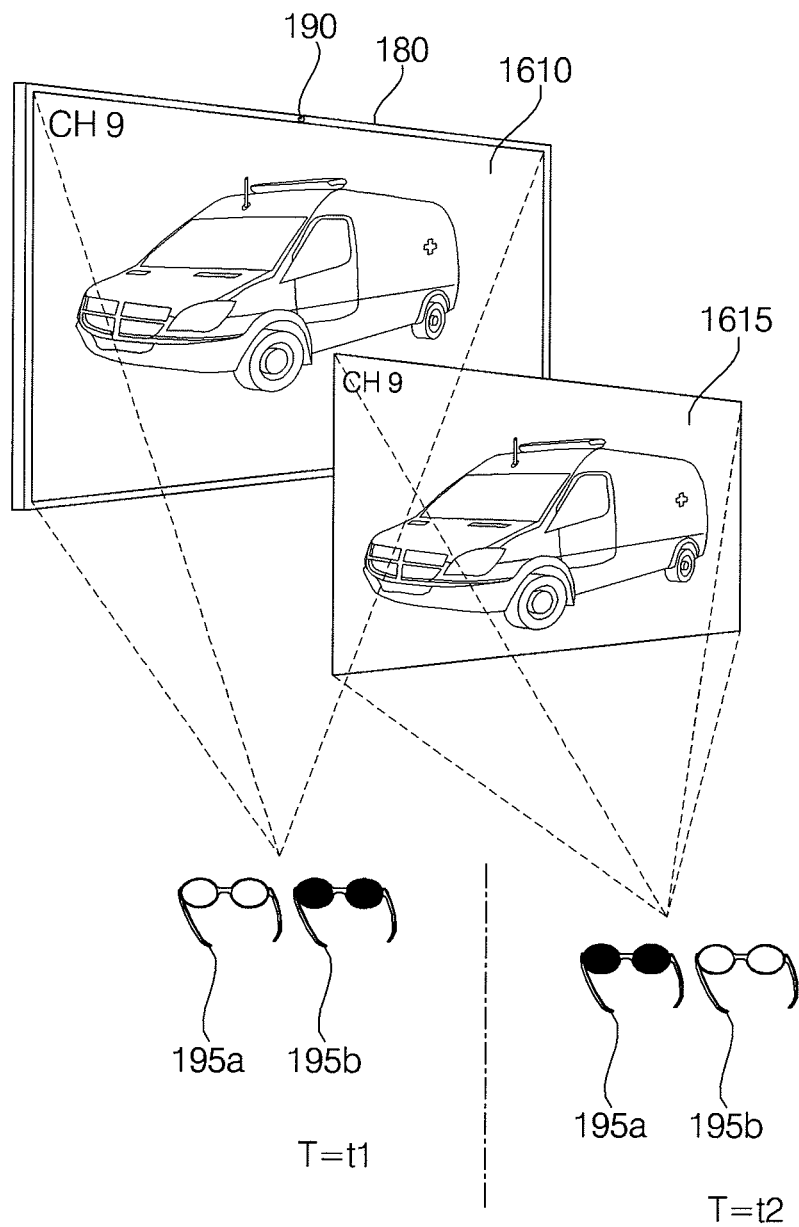
Figure 16B:
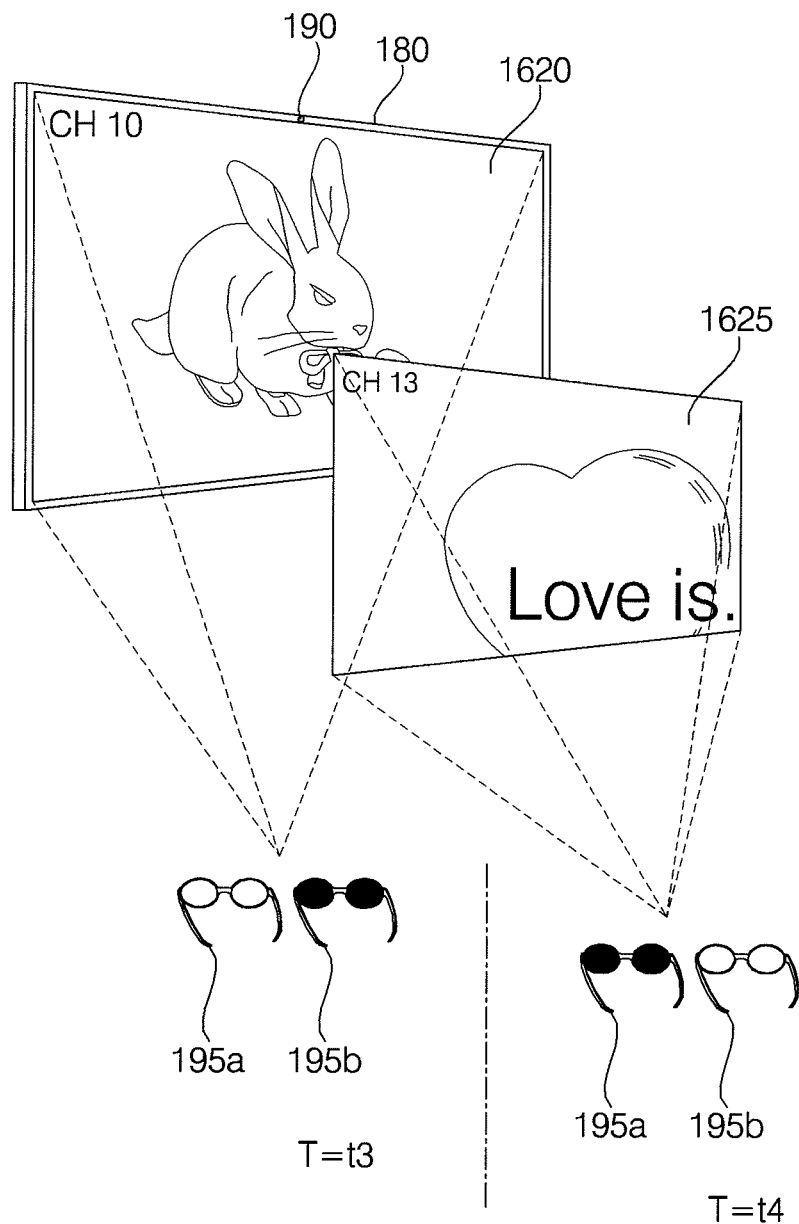
Figure 16C:
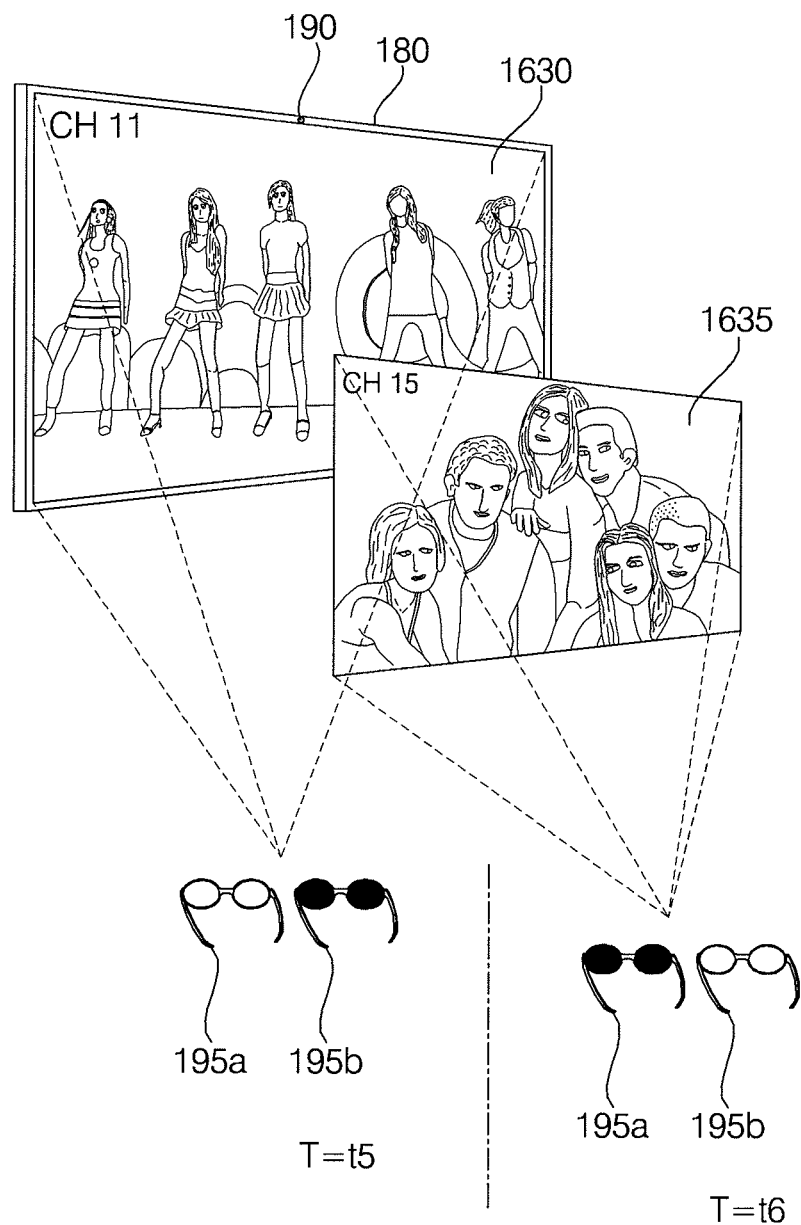

FIGS. 16A to 16C illustrate examples in which channel search ranges for viewing devices are different. First, in the example of FIG. 16A, first broadcast images 1610 and 1615 of a specific channel (CH 9) are displayed on the display 180 at a first time t1 in synchronization with the first viewing device 195*a* and are displayed on the display 180 at a second time t2 in synchronization with the second viewing device 195*b*.

Next, in the example of FIG. 16B, channel numbers of broadcast images are increased from the channel number (CH9) of FIG. 16A according to a first broadcast image selection signal and a second broadcast image selection signal, each being a signal for selecting a different channel. Specifically, a third broadcast image 1620 of a different channel (CH 10) which is 1 channel higher than the channel (CH 9) is displayed on the display 180 in synchronization with the first viewing device 195*a* at a third time t3 according to the first broadcast image selection signal and a fourth broadcast image 1625 of a different channel (CH 13) which is 4 channels higher than the channel (CH 9) is displayed on the display 180 in synchronization with the second viewing device 195*b* at a fourth time t4 according to the second broadcast image selection signal.

Next, in the example of FIG. 16C, channel numbers of broadcast images are increased from the channel numbers (CH10 and CH13) of FIG. 16B according to a first broadcast image selection signal and a second broadcast image selection signal, each being a signal for selecting a different channel. Specifically, a fifth broadcast image 1630 of a different channel (CH 11) which is 1 channel higher than the channel (CH 10) is displayed on the display 180 in synchronization with the first viewing device 195*a* at a fifth time t5 according to the first broadcast image selection signal and a sixth broadcast image 1635 of a different channel (CH 15) which is 2 channels higher than the channel (CH 13) is displayed on the display 180 in synchronization with the second viewing device 195*b* at a sixth time t6 according to the second broadcast image selection signal.

From FIGS. 16B and 16C, it can be seen that, each time the channel number of each of the first viewing device 195*a* and the second viewing device 195*b* is increased by pressing the channel up button, the increased channel number of the first viewing device 195*a* and the increased channel number of the second viewing device 195*b* are searched for in different channel search ranges. That is, the first viewing device 195*a* is set such that a desired channel number thereof is searched for in all channels and the second viewing device 195*b* is set such that a desired channel number thereof is searched for in specific channels.

The channel search range of each viewing device may be set according to at least one of the age, preference, sex (or gender), recently viewed channels, or program rating of the user wearing the viewing device. Accordingly, it is possible to provide broadcast images of customized channels. It is also possible to provide customized external input images such as DVD images or PC images other than broadcast images.

Additionally, spread of channels for the first viewing device 195*a* and the second viewing device 195*b* may be limited to a certain range or number. For example, when the first viewing device 195*a* is used to view one channel, another channel that is viewed using the second viewing device 195*b* may not be greater than 5 channels away. Thus, in FIG. 16C, since the first viewing device 195*a* is used to view channel 11, the channels that may be viewed with the second viewing device 195*b* may be from channels 6 through 16 only. Of course, the certain range need not be 5 channels, and may be a number that is greater or lesser than 5.

Figure 17:
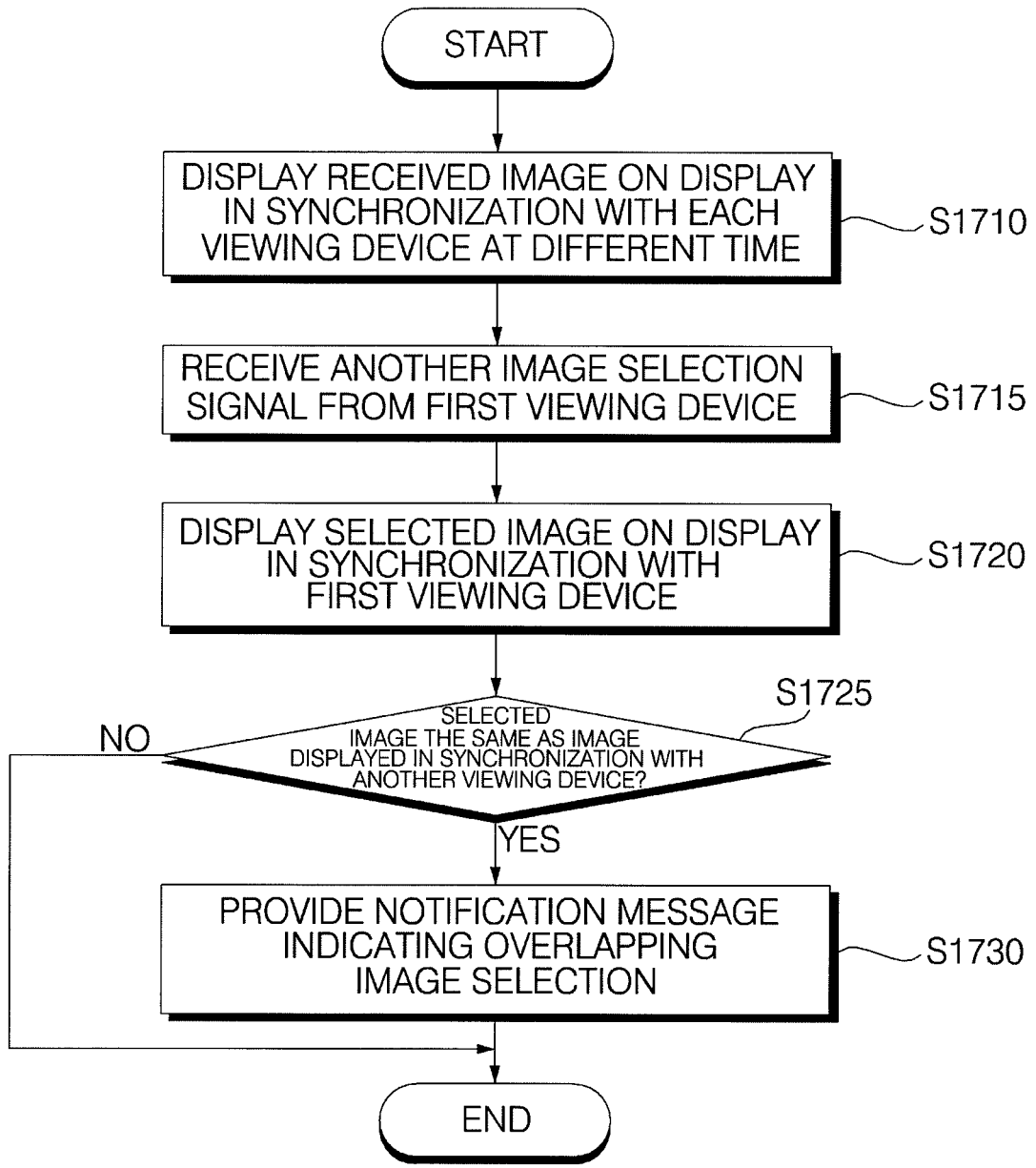
FIG. 17 is a flow chart illustrating a method for operating an image display device according to an embodiment of the present invention.

FIG. 17 is a flow chart illustrating a method for operating an image display device according to an embodiment of the present invention and FIGS. 18A to 18E are drawings used to explain various examples of the method for operating an image display device shown in FIG. 17. As shown in FIG. 17, first, a received image is displayed on the display 180 in synchronization with each viewing device at a different time (S1710).

The controller 170 performs a control operation to display received images in synchronization respectively with viewing devices that are being used. The displayed images may include a broadcast image, an external input image, or an image stored in the storage unit 140. The controller 170 may transmit different synchronization signals Sync to the viewing devices so that images are displayed on the viewing devices at different times. Then, a different image selection signal is received from the first viewing device (S1715). Then, a selected image is displayed in synchronization with the first viewing device (S1720).

The image selection signal may be transmitted from the first viewing device. The image selection signal may also be transmitted from a remote control device that has been paired with the first viewing device. The wireless communication unit 198 in the image display device 100 may receive the image selection signal from the first viewing device. The image selection signal may be a broadcast image selection signal for selecting a desired channel. The controller 170 performs a control operation to display the corresponding image according to the input image selection signal.

Figure 18A:
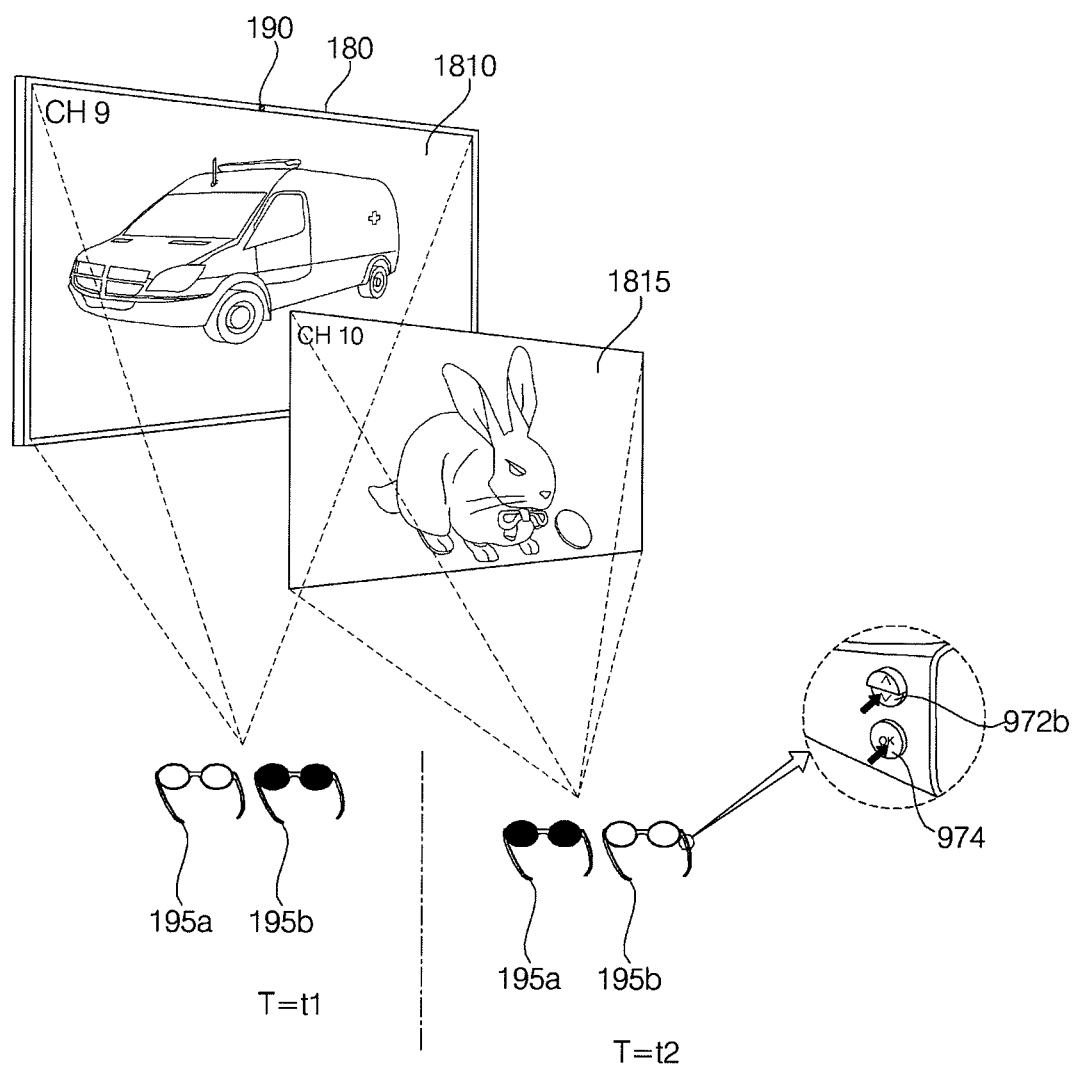
FIGS. 18A to 18E are drawings used to explain various examples of the method for operating an image display device shown in FIG. 17.

FIG. 18A illustrates an example in which a first broadcast image 1810 of a specific channel (CH 9) is displayed on the display 180 in synchronization with the first viewing device 195*a* and a second broadcast image 1815 of a different channel (CH 10) is displayed in synchronization with the second viewing device 195*b*. In this example, a channel selection signal is generated from the second viewing device 195*b*. That is, the different channel is selected using the selection unit 970 of the second viewing device 195*b*.

For example, when a user wearing the second viewing device 195*b* has pressed the down button included in the search buttons 972 of the second viewing device 195*b*, a channel number that is searched for may be decreased. Then, when the user has pressed the selection button 974 (OK button), the decreased channel number (CH 9) may be selected. A corresponding channel search signal or channel selection signal may be transmitted from the second viewing device 195*b* to the image display device 100. Accordingly, a first broadcast image 1820 of the specific channel (CH9) is displayed in synchronization with the first viewing device 195*a* and a first broadcast image 1825 of the changed or decreased channel number (CH 9) is displayed in synchronization with the second viewing device 195*b*.

In the mean time, the controller 170 determines whether or not the selected image is the same as an image that is displayed in synchronization with another viewing device (S1725). When the selected image is the same as an image that is displayed in synchronization with another viewing device, the controller 170 provides a notification message indicating the overlapping image selection (S1730). That is, the controller 170 determines whether or not an image selected by channel change or the like overlaps an image displayed in synchronization with another viewing device and provides a notification message indicating the overlapping image selection. In one notification message provision method, the message may be transmitted to each viewing device or an object indicating the overlapping selection may be displayed on the display.

Figure 18B:
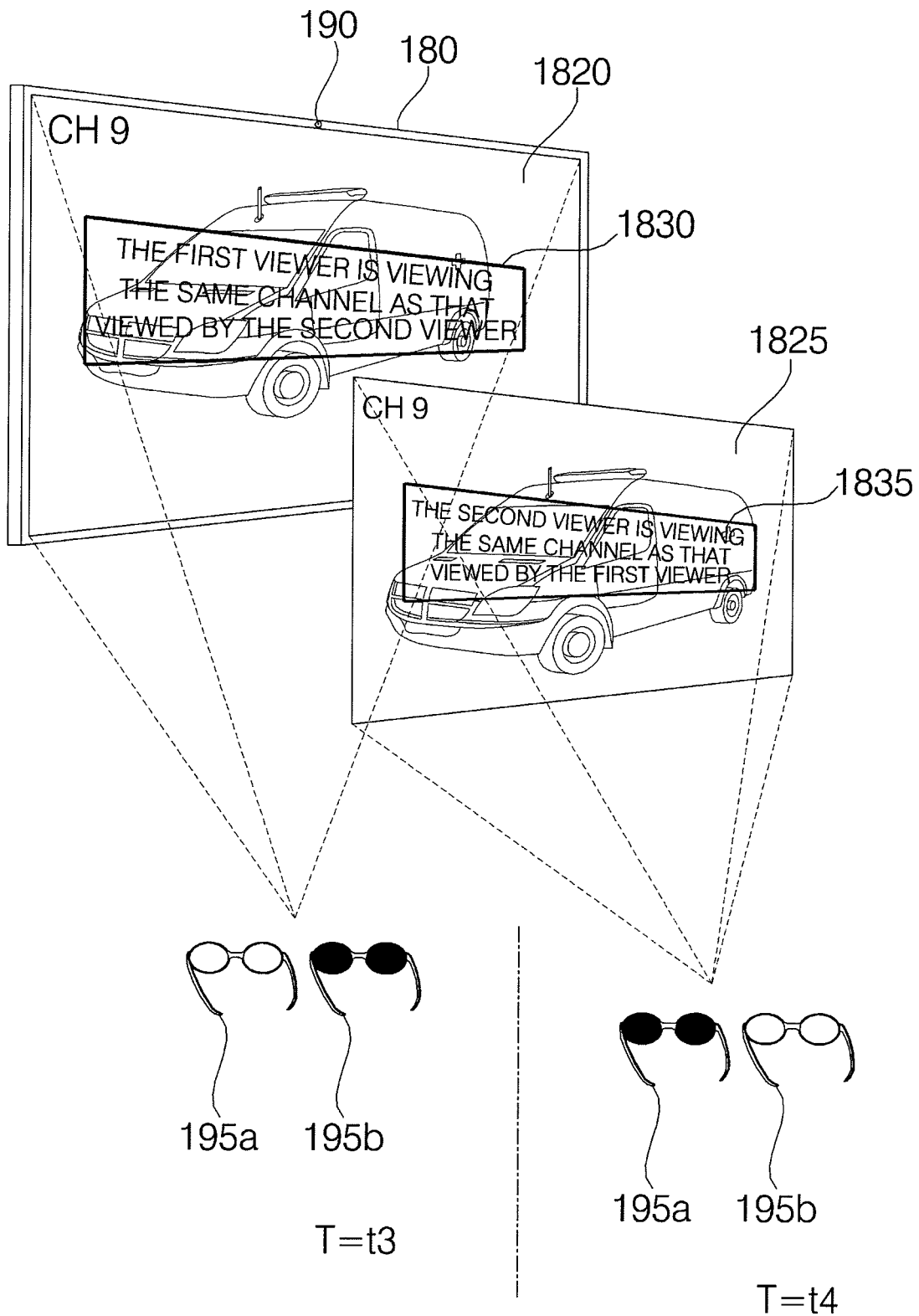
Figure 18C:
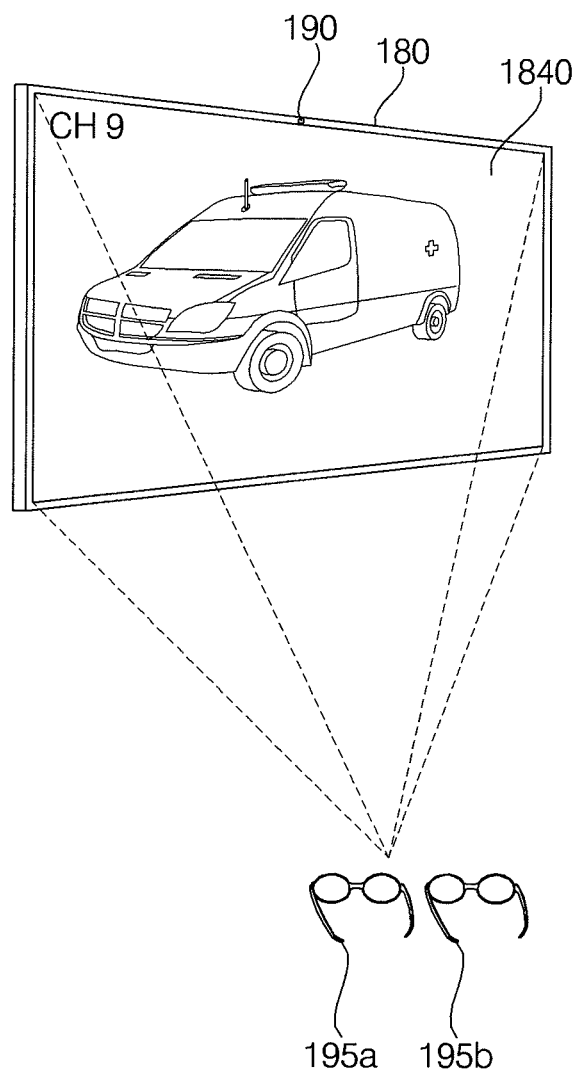

Since the first broadcast image 1820 and the first broadcast image 1825 are the same broadcast image of the same channel even though they are displayed at different times t3 and t4 as shown in FIG. 18B, the controller 170 may perform a control operation to provide a notification message indicating that a broadcast image of the same channel is displayed through channel change (i.e., a notification message indicating the overlapping selection).

In the example illustrated in FIG. 18B, an object 1830 indicating that the first viewer is viewing the same channel as that viewed by the second viewer is displayed on the first broadcast image 1820 and an object 1835 indicating that the second viewer is viewing the same channel as that viewed by the first viewer is displayed on the first broadcast image 1825. This allows the user of each viewing device to intuitively know that they are viewing the same channel as another user.

Figure 18D:
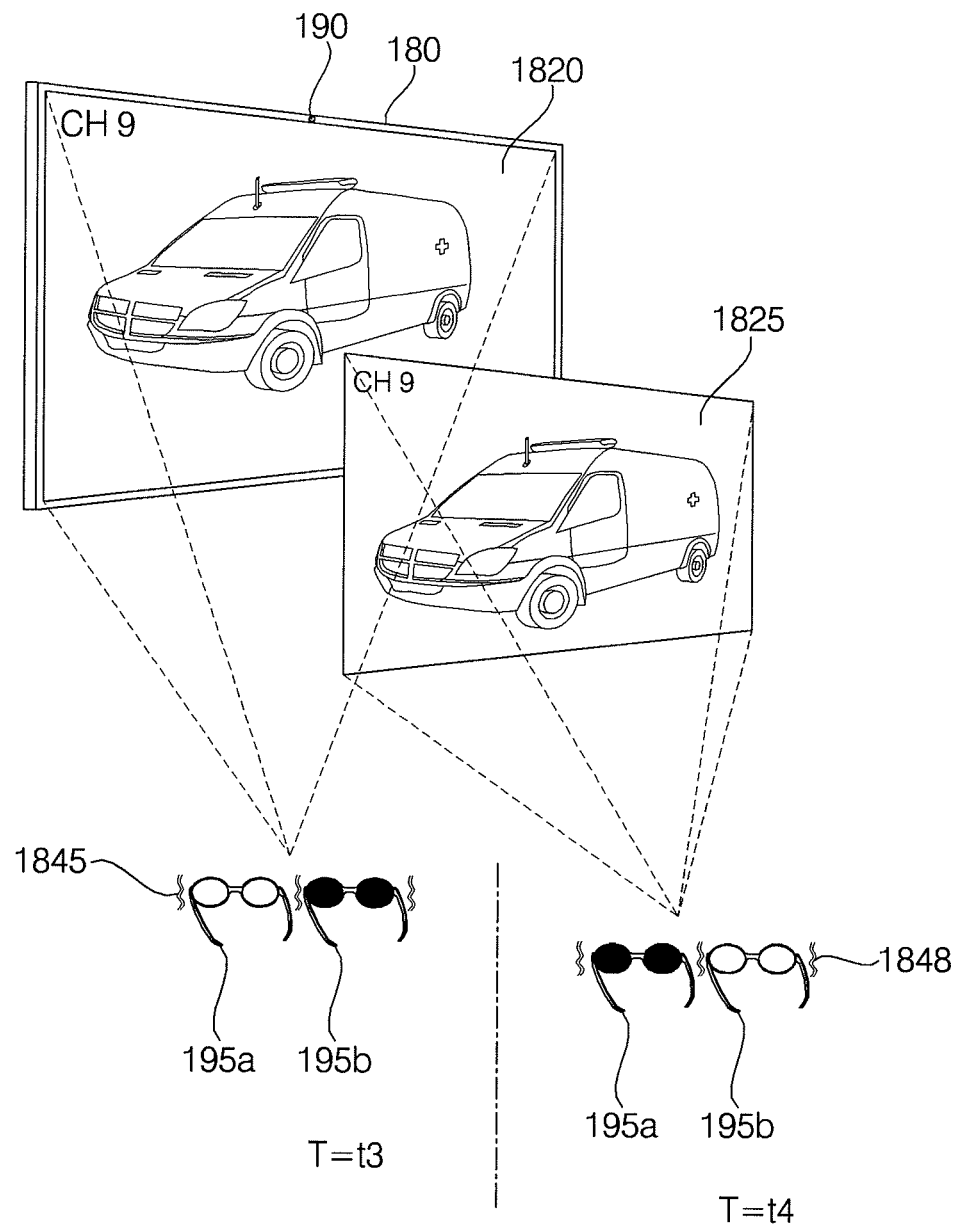
Figure 18E:
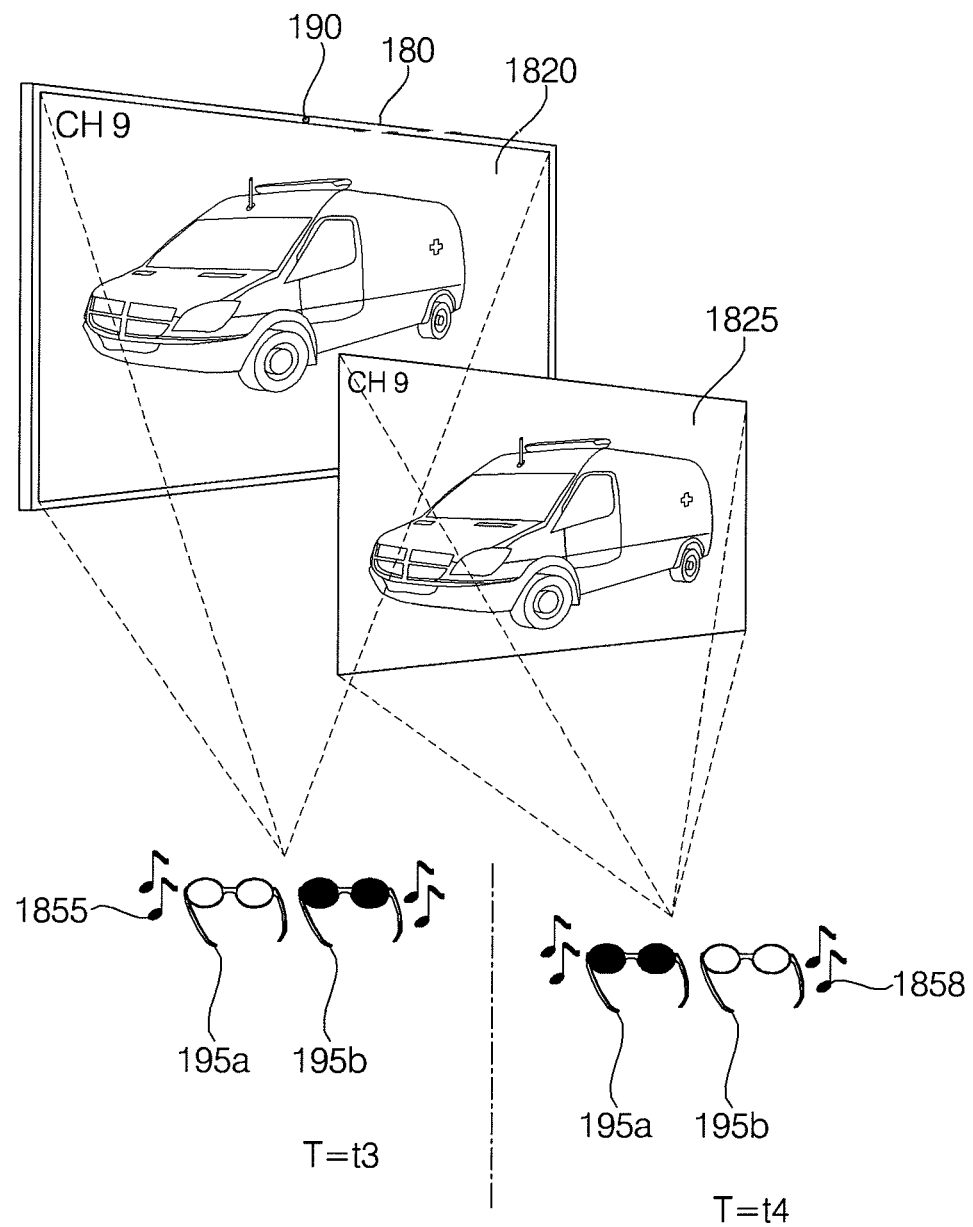

FIGS. 18D and 18E illustrate other examples of provision of an overlapping notification message. In the example of FIG. 18D, a message indicating that overlapping broadcast images 1820 and 1825 of the same channel (CH 9) are displayed is transmitted to viewing devices 195a and 195b to cause the viewing devices 195a and 195b to vibrate (in the example of FIG. 18D) or to cause the viewing devices 195a and 195b to output audio signals 1855 and 1858 (in the example of FIG. 18E).

In the case where the same broadcast image is displayed for all viewing devices, the controller 170 may perform a control operation to display the same broadcast image in synchronization with one of the viewing devices and may also perform a control operation to transmit the same synchronization signal to each viewing device.

In the example of FIG. 18B, the same broadcast images of the channel (CH 9) are displayed in synchronization respectively with the two viewing devices 195a and 195b at respective times T=t3 and T=t4. On the other hand, in the example of FIG. 18C, a broadcast image 1840 is commonly displayed in synchronization with the two viewing devices 195a and 195b at T=T5. That is, the same synchronization signal is transmitted to the two viewing devices 195a and 195b and the left-eye and right-eye glasses of both the viewing devices 195a and 195b are opened at the same time t5. This may reduce the vertical synchronization frequency Vsync of the broadcast image 1840 to half of the example of FIG. 18B.

The method for operating an image display device of FIG. 17 may be performed in association with the operation method of FIG. 11 and the operation method of FIG. 12. In one example, the overlapping notification message may be provided when the same channel is selected according to a channel selection signal of each viewing device while images corresponding respectively to the viewing devices are being displayed as in step S1135 of FIG. 11.

In another example, the overlapping notification message may be provided when the same channel is selected according to a channel selection signal of each viewing device while a third image is being displayed in synchronization with a second viewing device that is additionally used after step S1230 of FIG. 12.

FIG. 19 is a flow chart illustrating a method for operating an image display device according to an embodiment of the present invention and FIGS. 20A to 20F are drawings referenced to explain various examples of the method for operating an image display device shown in FIG. 19. As shown in FIG. 19, first, a multi-user mode is entered (S1910). The multi-user mode is a mode in which a plurality of users use a plurality of viewing devices. In the multi-user mode, subsequent steps are then performed for each viewing device so that images corresponding to the viewing devices are displayed at different times. Entry into the multi-user mode may be performed by operating the remote control device 200 or a local key. Other ways of entering into the multi-user mode is also possible.

FIG. 20A illustrates entry into the multi-user mode. For example, the multi-user mode is entered when a multi-mode button 203 is pressed on the remote control device 200. Accordingly, an object (or notice) 2010 indicating the multi-user mode may be displayed on the display 180.

Input images are then searched for (S1915). The found images are then displayed on the display (S1920). A specific image is selected during the search (S1925). In embodiments of the present invention, the object (or notice) 2010 indicating entry into the multi-user mode may be an input image. For example, broadcast image search may be performed through automatic channel number increase or decrease for channel setting in the multi-user mode. Alternatively, broadcast image search may be performed through manual channel number increase or decrease. External input images other than broadcast images may also be searched for. As the search proceeds, broadcast images of changing channels may be displayed on the display 180 and the user may select a desired broadcast image during the search through a remote control device or the like.

FIG. 20B illustrates an example in which a broadcast image 2010 of a channel (CH 9) is searched for and displayed on a region of the display 180. For example, the broadcast image 2010 of the channel (CH 9) may be searched for and displayed by operating the channel up button 206a on the remote control device 200. The broadcast image 2010 of the channel (CH 9) may then be selected by operating the OK button 208. Accordingly, an object 2025 indicating that the broadcast image of the channel (CH 9) has been selected for user 1 may be displayed on a different region of the display 180.

FIG. 20C illustrates an example in which a broadcast image 2030 of a channel (CH 10) is searched for and displayed on a region of the display 180. The broadcast image 2030 of the channel (CH 10) is searched for and displayed by operating the channel up button 206a on the remote control device 200. However, unlike the example of FIG. 20B, the OK button 208 is not operated such that the broadcast image 2030 of the channel (CH 10) is not selected. Accordingly, an object 2035 indicating that the broadcast image of the channel (CH 9) has been selected for user 1 may still be displayed on a different region of the display 180.

FIG. 20D illustrates an example in which a broadcast image 2040 of a channel (CH 11) is searched for and displayed on a region of the display 180. The broadcast image 2040 of the channel (CH 11) is searched for and displayed by operating the channel up button 206a on the remote control device 200. The broadcast image 2040 of the channel (CH 11) may then be selected by operating the OK button 208. Accordingly, an object indicating that the broadcast image 2040 of the channel (CH 11) has been selected for user 2 may be displayed on a different region of the display 180. The setting of the multi-user mode is then completed (S1930). The setting of the multi-user mode may be completed by operating the remote control device 200 or the local key.

FIG. 20E illustrates an example in which setting of the multi-user mode is completed. For example, the setting of the multi-user mode may be completed when the multi-mode button 203 on the remote control device 200 is pressed once more. Accordingly, an object 2050 indicating that the setting of the multi-user mode has been completed may be displayed on the display 180. Selected images are then displayed in synchronization respectively with the viewing devices (S1935). The controller 170 performs a control operation to display the images assigned to the viewing devices or users in synchronization respectively with the viewing devices or users.

Figure 20F:
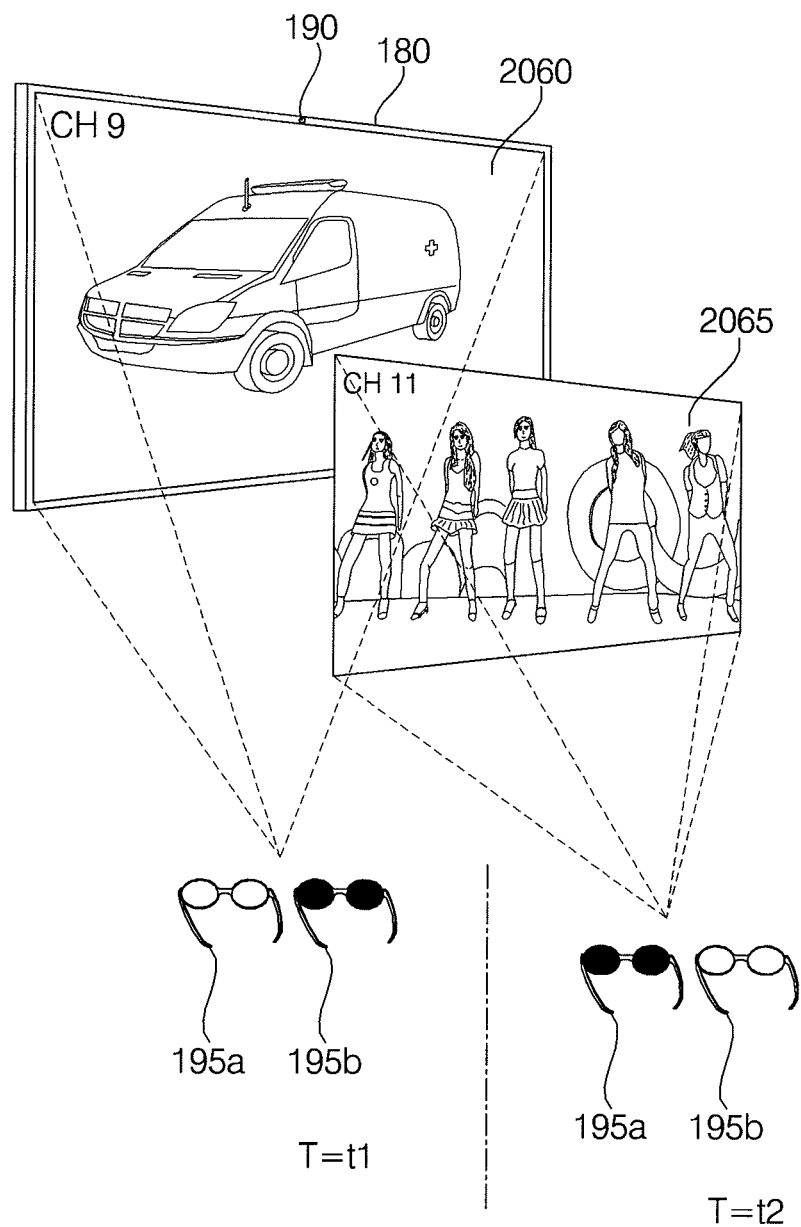

FIG. 20F illustrates an example in which a first broadcast image 2060 of a specific channel (CH 9) is displayed on the display 180 in synchronization with the first viewing device 195a and a second broadcast image 2065 of a different channel (CH 11) is displayed in synchronization with the second viewing device 195b according to the setting of the multi-user mode. In this instance, first broadcast images 2060 and 2065 are displayed at different times t1 and t2 and left-eye and right-eye glasses of the first viewing device 195a are opened at the time t1 and left-eye and right-eye glasses of the second viewing device 195b are opened at the time t2.

The method for operating an image display device of FIG. 19 may be performed in association with the operation method of FIG. 17. In one example, the overlapping notification message may be provided when the same channel is selected according to a different channel selection signal while different images are being displayed in synchronization with viewing devices as in step S1710 as shown in FIG. 20F according to the setting of the multi-user mode.

On the other hand, channel search of the viewing devices may also be performed in different search ranges as described above with reference to FIGS. 16A and 16C while different broadcast images are being displayed in synchronization respectively with the viewing devices as shown in FIG. 20F according to the setting of the multi-user mode.

Figure 21:
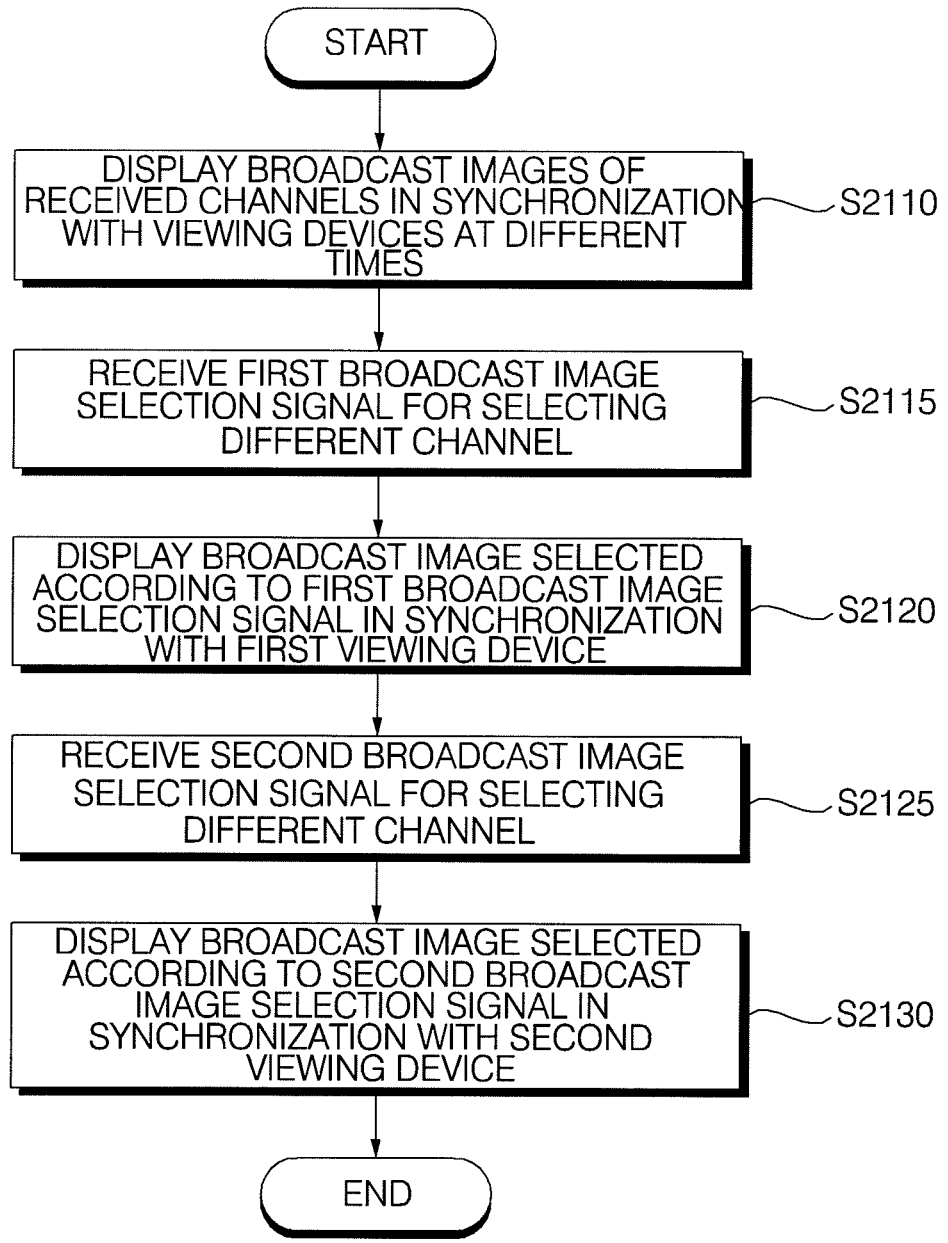
FIG. 21 is a flow chart illustrating a method for operating an image display device according to an embodiment of the present invention.
Figure 22B:
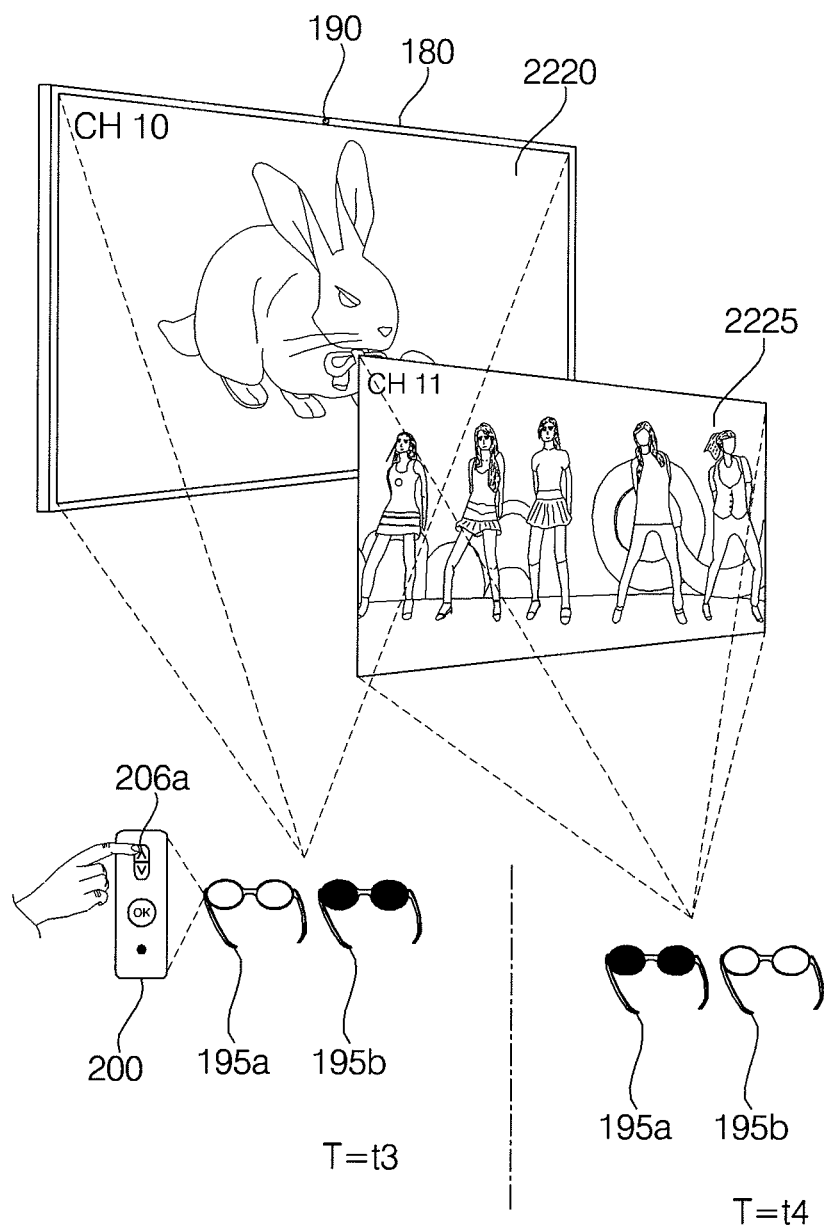
Figure 22C:
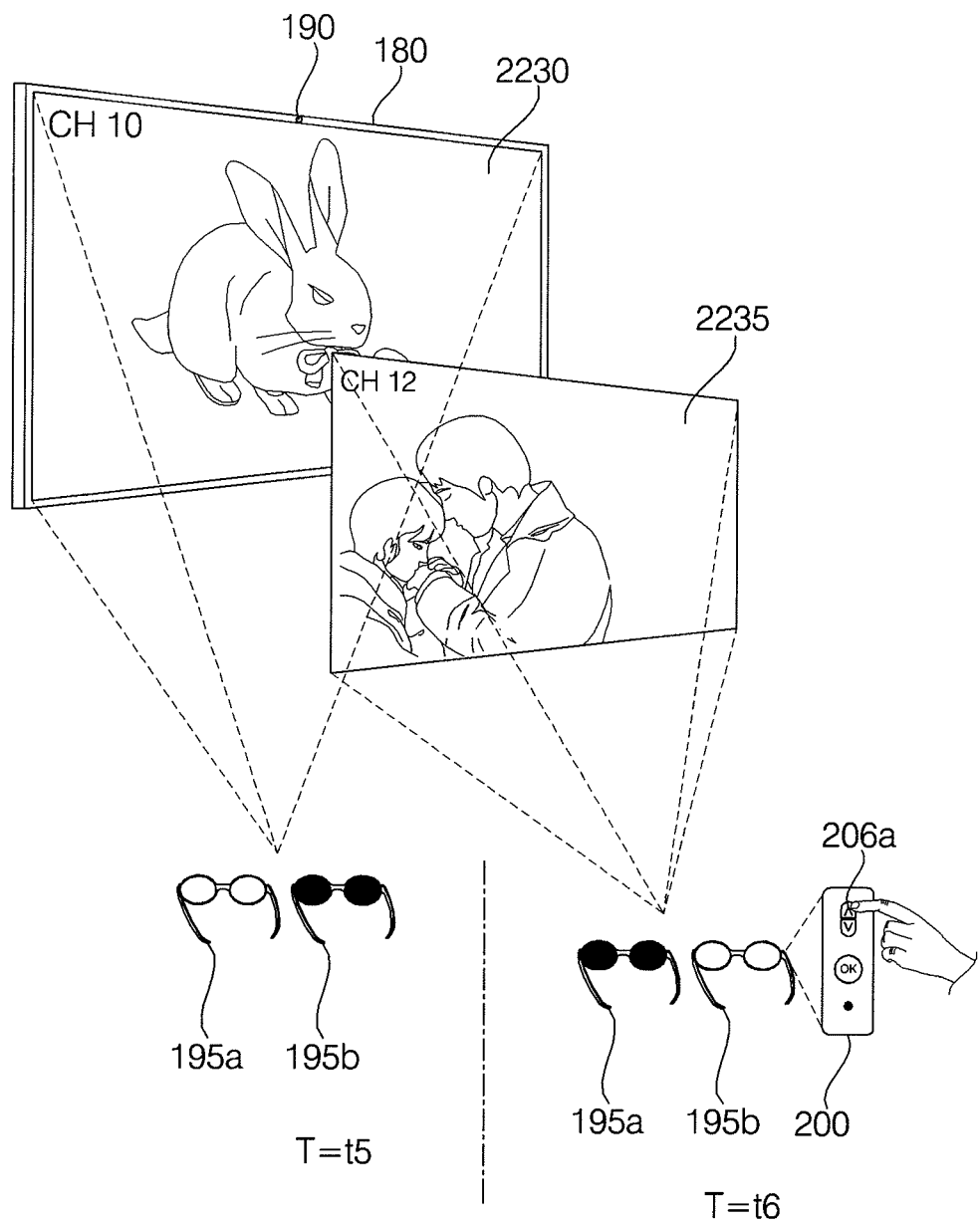

FIG. 21 is a flow chart illustrating a method for operating an image display device according to an embodiment of the present invention and FIGS. 22A to 22C are drawings referenced to explain various examples of the method for operating an image display device shown in FIG. 21. As shown in FIG. 21, broadcast images of received channels are displayed in synchronization with viewing devices at different times (S2110).

FIG. 22A illustrates an example in which a first broadcast image 2210 of a specific channel (CH 9) is displayed in synchronization with the first viewing device 195a and a second broadcast image 2215 of a different channel (CH 11) is displayed in synchronization with the second viewing device 195b. Then, a first broadcast image selection signal for selecting a different channel is received (S2115). A broadcast image selected according to the first broadcast image selection signal is then displayed in synchronization with the first viewing device 195a (S2120).

The broadcast image selection signal may be transmitted from a viewing device or a remote control device. For example, a different channel may be selected using the remote control device 200. In this instance, each user or each viewing device may be discriminated through the sensor unit 160 or the photographing unit 190 in order to discriminate channel selection by each user.

FIG. 22B illustrates an example in which a first broadcast image selection signal is transmitted from the remote control device 200. When a first user wearing or using the first viewing device 195a has pressed the channel up button 206a on the remote control device 200, the channel number may be increased so that a third broadcast image 2220 of a channel (CH 10) is displayed in synchronization with the first viewing device 195a. In this instance, a second broadcast image 2225 of a channel (CH 11) is continued to be displayed in synchronization with the second viewing device 195b. Additionally, the remote control device 200 is disposed closer to the first viewing device 195a than the second viewing device 195b.

A second broadcast image selection signal for selecting a different channel is then received (S2125). A broadcast image selected according to the second broadcast image selection signal is then displayed in synchronization with the second viewing device 195b (S2130).

FIG. 22C illustrates an example in which a second broadcast image selection signal is transmitted from the remote control device 200. When a second user wearing the second viewing device 195b has pressed the channel up button 206a on the remote control device 200, the channel number may be increased so that a fourth broadcast image 2235 of a channel (CH 12) is displayed in synchronization with the second viewing device 195b. In this instance, a third broadcast image 2230 of a channel (CH 10) is continued to be displayed in synchronization with the first viewing device 195a. Additionally, the remote control device 200 is disposed closer to the second viewing device 195b than the first viewing device 195a.

In FIGS. 22B and 22C, the remote control device 200 is usable to change a channel for either the first viewing device 195a or the second viewing device 195b based distances between the remote control device 200, and the first viewing device 195a and the second viewing device 195b. That is, the remote control device 200 may be arranged to change the channel for one of the viewing devices 195a and 195b that is disposed closer to the remote control device 200.

The method for operating an image display device of FIG. 21 may be performed in association with the operation method of FIG. 11, the operation method of FIG. 17, and the operation method of FIG. 19. On the other hand, in the method for operating an image display device of FIG. 21, channel search of the viewing devices may also be performed in different search ranges as described above with reference to FIGS. 16A and 16C.

Figure 23:
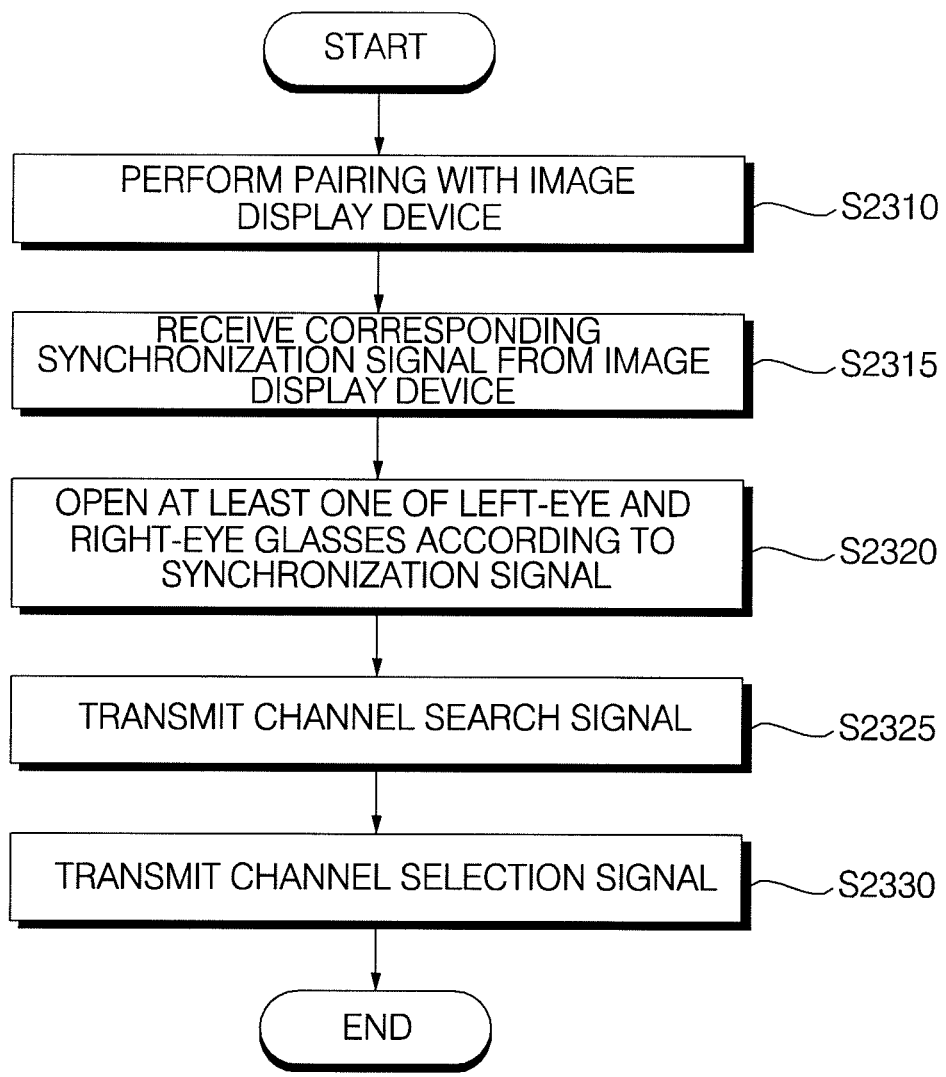
FIG. 23 is a flow chart illustrating a method for operating an image display device according to an embodiment of the present invention.

FIG. 23 is a flow chart illustrating a method for operating an image display device according to an embodiment of the present invention and FIGS. 24A to 24D are drawings referenced to explain various examples of the method for operating an image display device shown in FIG. 23. As shown in FIG. 23, first, a viewing device 195 performs pairing with the image display device 100 (S2310). The viewing device 195 then receives a corresponding synchronization signal from the image display device 100 (S2315).

When the viewing device 195 is worn or when the switch 918 on the viewing device 195 is turned on, the viewing device 195 performs pairing with the image display device 100. To perform pairing, the viewing device 195 may receive a pairing signal from the image display device 100 or may transmit a pairing signal or a response signal to the image display device 100.

After performing pairing, the viewing device 195 then receives a synchronization signal from the image display device 100. In this instance, when a plurality of viewing devices are present, each of the viewing devices may individually transmit or receive a pairing signal and a synchronization signal.

Figure 24A:
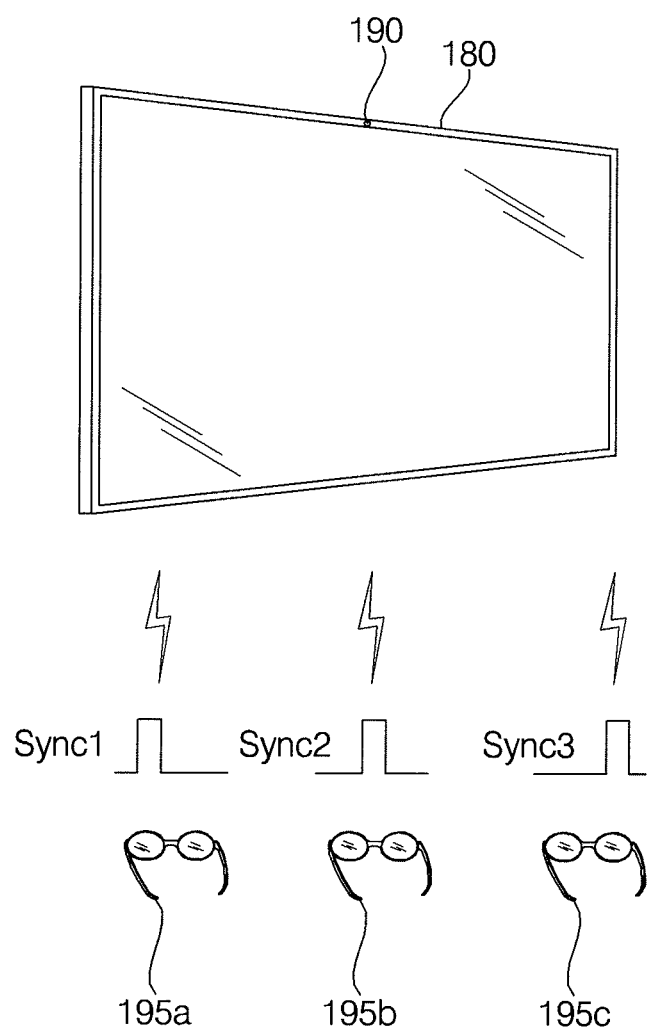
FIGS. 24A to 24D are drawings referenced to explain various examples of the method for operating an image display device shown in FIG. 23.

FIG. 24A illustrates an example in which different synchronization signals Sync1, Sync2, and Sync3 are transmitted from the image display device 100 to the first to third viewing devices 195a, 195b, and 195c, respectively. When each synchronization signal is an IR signal, for example, IR signals having data "0001", "0010", and "0011" may be simultaneously or sequentially transmitted to the first to third viewing devices 195a, 195b, and 195c.

At least one of the left-eye and right-eye glasses of each viewing device is opened according to the corresponding synchronization signal (S2320). In this instance, a broadcast image corresponding to each viewing device is displayed on the display 180 of the image display device 100.

Figure 24B:
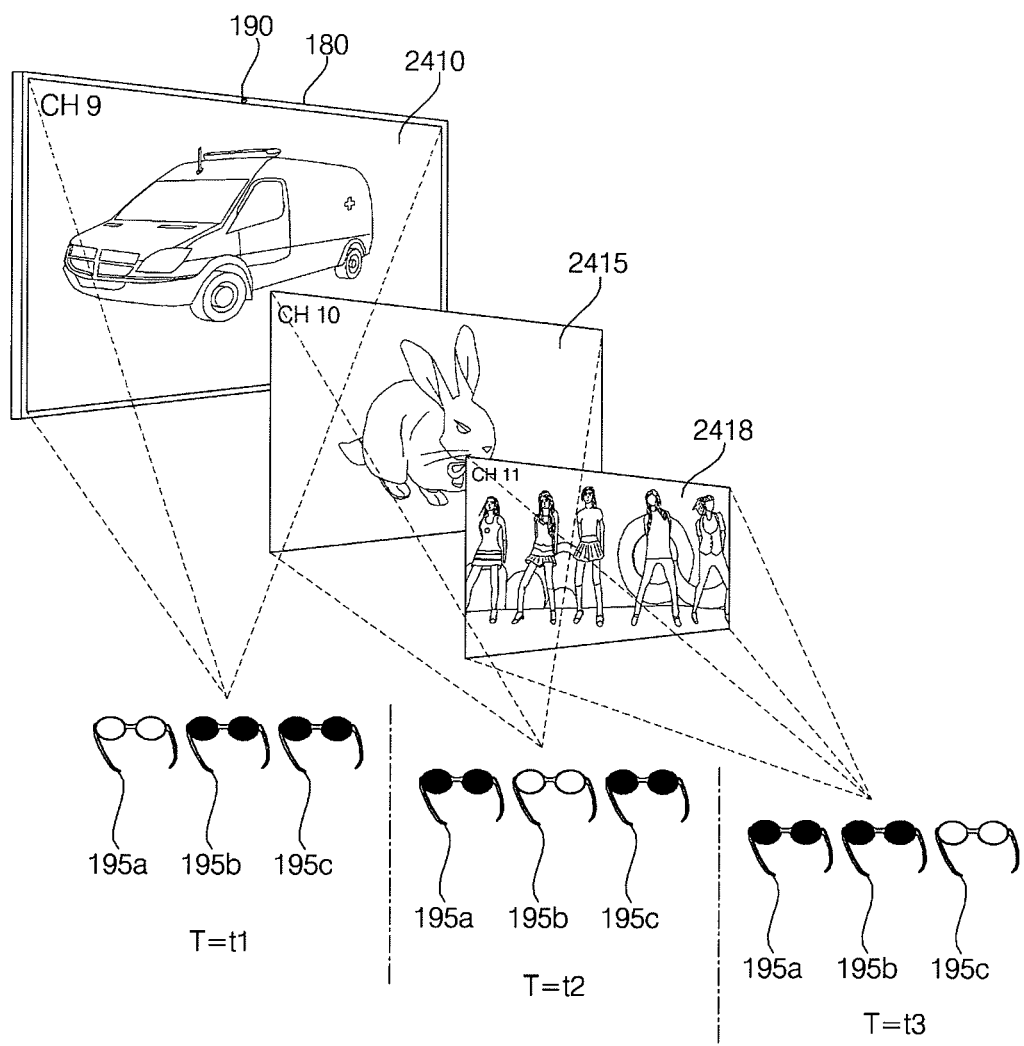

FIG. 24B illustrates an example in which first to third broadcast images 2410, 2415, and 2418 corresponding to the three viewing devices 195a, 195b, and 195c are displayed in synchronization with the three viewing devices 195a, 195b, and 195c, respectively. In this instance, the first to third broadcast images 2410, 2415, and 2418 are displayed at different times t1, t2, and t3, and thus the left-eye an right-eye glasses of the first viewing device 195a are opened at the time t1, the left-eye an right-eye glasses of the second viewing device 195b are opened at the time t2, and the left-eye an right-eye glasses of the third viewing device 195c are opened at the time t3.

Figure 24C:
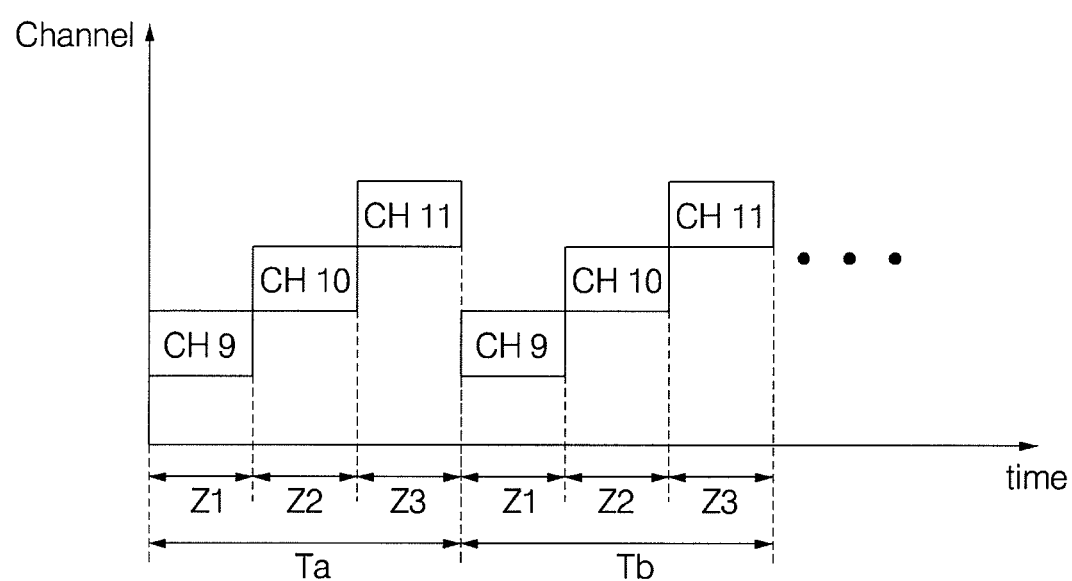

FIG. 24C illustrates how channels are allocated respectively to the viewing devices as time passes in the example of FIG. 24B. Corresponding channels (CHs 9, 10, 11) are displayed in synchronization with the three viewing devices 195a, 195b, and 195c, respectively, during display periods Z1, Z2, and Z3 in a Ta period and are repeatedly displayed in synchronization with the three viewing devices 195a, 195b, and 195c, respectively, during display periods Z1, Z2, and Z3 in a Tb period. A channel search signal is then transmitted (S2325). A channel selection signal is then transmitted (S2330). The channel search signal or the channel selection signal may be transmitted by the selection unit 970 in the viewing device 195.

Figure 24D:
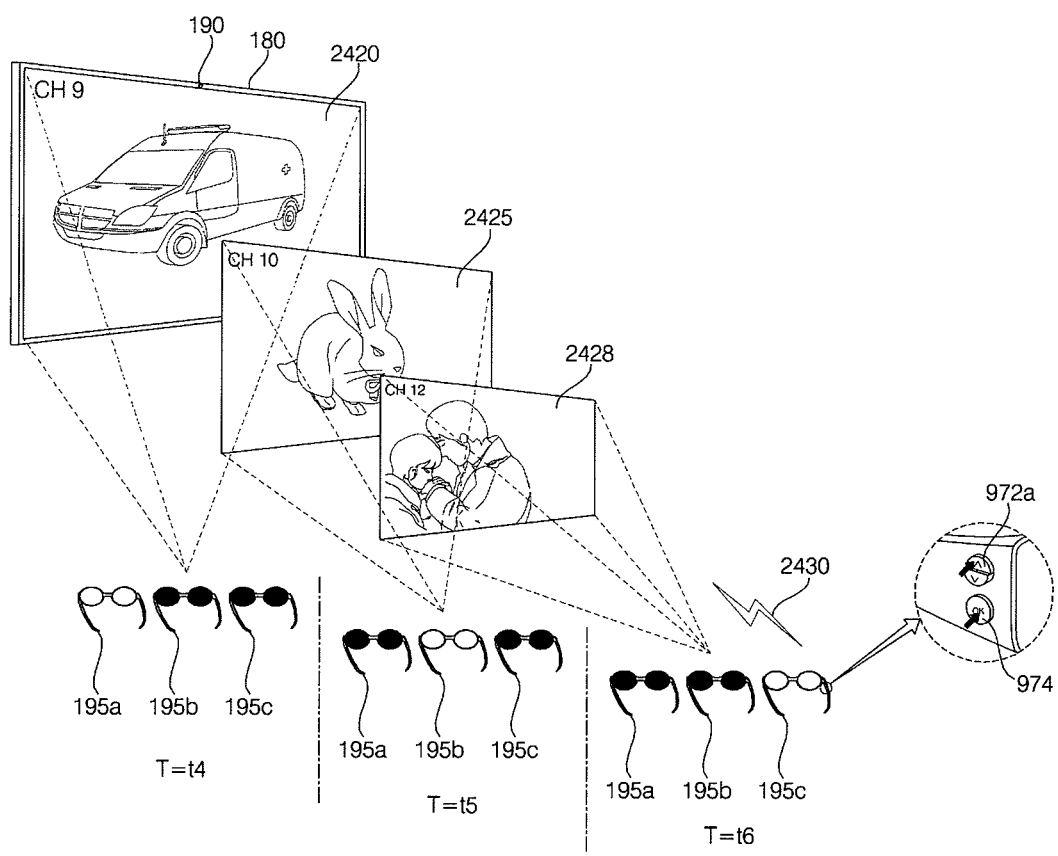

FIG. 24D illustrates an example in which a channel selection signal is generated by the third viewing device 195c. Specifically, the found channel number may be increased when a user wearing the third viewing device 195c has pressed the up button 972a included in the search buttons 972 of the third viewing device 195c. Then, the increased channel number (CH 12) may be selected when the user has pressed the selection button 974 (OK button). A corresponding channel search signal or a corresponding channel selection signal may be transmitted from the third viewing device 195c to the image display device 100.

In the example illustrated in FIG. 24D, a third broadcast image 2428 corresponding to the increased channel number is displayed in synchronization with the third viewing device 195c. In this instance, a first broadcast image 2420 of a channel (CH 9) is displayed in synchronization with the first viewing device 195a and a second broadcast image 2425 of a channel (CH 10) is displayed in synchronization with the second viewing device 195b.

A channel search signal or a channel selection signal may also be transmitted from the remote control device 200. When a plurality of users or a plurality of viewing devices are present, a pairing operation between the remote control device 200 and each viewing device 195 may be performed to identify a user who has generated the signal using the remote control device 200. For example, when the distance between the remote control device 200 and the viewing device 195 is less than a predetermined value or when the remote control device 200 is located between the viewing device 195 and the image display device 100, a pairing signal may be transmitted from the viewing device 195 or from the remote control device 200. After performing pairing, a channel search signal may be transmitted by operating the channel up button 206a on the remote control device 200 and a channel selection signal may be transmitted by operating the OK button 208 on the remote control device 200.

On the other hand, unlike the example of 24A, a common synchronization signal may be transmitted to the first to third viewing devices 195a, 195b, and 195c. For example, after performing pairing between the first to third viewing devices 195a, 195b, and 195c and the image display device 100, a common synchronization signal Sync may be transmitted to the first to third viewing devices 195a, 195b, and 195c. After receiving the common synchronization signal Sync, the first to third viewing devices 195a, 195b, and 195c may be sequentially opened. For example, after each of the first to third viewing devices 195a, 195b, and 195c receives the common synchronization signal Sync, the first viewing device 195a may be opened first, the second viewing device 195b may then be opened after a predetermined time has elapsed, and the third viewing device 195c may then be opened after a predetermined time has elapsed.

As is apparent from the above description, the image display device and the method for operating the same according to the present invention have a variety of advantages. For example, an image displayed on the display and an image that can be viewed using a viewing device are separately provided so that the user can view a different image using the viewing device. In addition, users can view different images using a plurality of viewing devices. In this instance, when the same image or a broadcast image of the same channel is selected, a notification message indicating the overlapping image selection can be displayed to allow the user to intuitively know the overlapping image selection.

Further, when a plurality of viewing devices are used, different channel search ranges may be applied to the viewing devices so that it is possible to provide each user wearing a viewing device with broadcast images of channels customized to the user. Furthermore, a selection unit for performing channel search or channel selection is provided on each viewing device so that the user can easily select a desired image, specifically, a desired broadcast image. Moreover, an audio output unit is provided on each viewing device so that it is possible to output a different audio signal through each viewing device.

The image display device and the method for operating the same according to the present invention are not limited in their applications to the configurations and methods of the embodiments described above and all or some of the embodiments may be selectively combined to implement various modifications.

The method for operating an image display device according to the present invention can be embodied as processor readable code on a processor readable medium provided in the mobile terminal. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the scope of the present invention.

What is claimed is:

1. A method for operating an image display device including a display, the method comprising:
   pairing a first viewing device with the image display device;
   displaying, on the display, a first image corresponding to a first channel during a first period in synchronization with the first viewing device so that the first image can be viewed with the use of the first viewing device;
   pairing a second viewing device with the image display device for a multi-user mode, the multi-user mode allowing the first and second viewing devices to respectively view different images on the same display at a same time;
   displaying, on the display, a second image corresponding to the first channel or a second channel during a second period subsequent to the first period in synchronization with the second viewing device so that the second image can be viewed with the use of the second viewing device but cannot be viewed with the use of the first viewing device;
   displaying, on the display, a predetermined third image not associated with any channel during a third period immediately subsequent to either the first or second period, so that the number of images being displayed on the display during the first through third periods is greater than the number of the viewing devices paired with the image display device during the same first through third periods;
   in the multi-user mode, setting a channel search range for the first viewing device and a channel search range for the second viewing device to be different from each other;
   determining whether the first image for the first viewing device is the same as the second image for the second viewing device; and
   providing a notification message indicating that the first and second images are the same in response to determining that the first image for the first viewing device is the same as the second image for the second viewing device.

2. The method according to claim 1, further comprising:
   changing the first channel to another channel; and
   displaying, on the display, a fourth image corresponding to the another channel during a fourth period subsequent to the second period in synchronization with the first viewing device, so that the fourth image can be viewed with the use of the first viewing device but cannot be viewed with the use of the second viewing device.

3. The method according to claim 2, wherein the first channel is changed to the another channel using one of the first viewing device and a remote controller associated with the image display device.

4. The method according to claim 1, wherein the second image includes at least one of a menu, an electronic program guide (EPG), a broadcasted image, and an external input image.

5. A method for operating an image display device including a display and an input unit associated with the image display device, the method comprising:
   starting, by the image display device, a setting of a multi-user mode based on a first input from the input unit, the multi-user mode allowing first and second different viewing devices associated with the image display device to respectively view different images on the same display at a same time by different users;
   searching for input images to be used in the multi-user mode;
   displaying the input images on the display;
   sequentially selecting first and second images among the input images during the search based on at least one user input, as the different images to be subsequently viewed respectively by the first and second viewing devices on the same display at the same time;
   during the setting of the multi-user mode, simultaneously displaying, on the display, channel information of the selected first image and user information associated with the selected first image, and channel information of the selected second image and different user information associated with the selected second image;
   determining whether the first image is the same as the second image;
   providing a notification message indicating that the first and second images are the same in response to determining that the first image is the same as the second image; and
   completing the setting of the multi-user mode based on a second input from the input unit,
   wherein in the multi-user mode, a channel search range for the first viewing device and a channel search range for the second viewing device are set to be different from each other.

6. The method according to claim 5, wherein each of the input images includes at least one of a menu, an electronic program guide (EPG), a broadcasted image, and an external input image.

7. The method according to claim 5, wherein the multi-user mode is entered when the multi-user mode is selected using a remote controller being the input unit, or when the first viewing device and the second viewing device are activated.

8. The method according to claim 5, wherein a vertical synchronization frequency of the first and second images that are displayed in synchronization with respective viewing devices changes as a number of the respective viewing devices change.

9. The method according to claim 5, further comprising:
   when an identical image is selected for both the first and second viewing devices, displaying the selected image in synchronization with the first and second viewing devices; and
   transmitting an identical synchronization signal to each of the first and second viewing devices.

10. The method according to claim 5, further comprising:
    receiving an image selection signal for selecting a different image for the first viewing device while the first image is being displayed in synchronization with the first viewing device;
    displaying the image selected by the image selection signal on the image display device in synchronization with the first viewing device; and
    providing a notification message indicating overlapping image selection in the form of a notification message transmitted to the first viewing device or an object displayed on the image display device, when the selected image is identical to an image displayed in synchronization with another viewing device.

11. An image display device comprising:
    a display arranged to display a first image and a second image;
    a wireless communication unit arranged to transmit or receive data to or from a first viewing device and a second viewing device; and
    a controller configured to control the wireless communication unit and to:

pair the first viewing device with the image display device,
display, on the display, the first image corresponding to a first channel during a first period in synchronization with the first viewing device so that the first image can be viewed with the use of the first viewing device,
pair the second viewing device with the image display device for a multi-user mode, the multi-user mode allowing the first and second viewing devices to respectively view different images on the same display at a same time,
display, on the display, the second image corresponding to the first channel or a second channel during a second period subsequent to the first period in synchronization with the second viewing device so that the second image can be viewed with the use of the second device but cannot be viewed with the use of the first viewing device,
display, on the display, a predetermined third image not associated with any channel
display, on the display, a predetermined third image not associated with any channel during a third period immediately subsequent to either the first or second period, so that the number of images being displayed on the display during the first through third periods is greater than the number of the viewing devices paired with the image display device during the same first through third periods,
in the multi-user mode, set a channel search range for the first viewing device and a channel search range for the second viewing device to be different from each other,
determine whether the first image for the first viewing device is the same as the second image for the second viewing device, and
provide a notification message indicating that the first and second images are the same in response to determining that the first image for the first viewing device is the same as the second image for the second viewing device.

12. The image display device according to claim 11, wherein the controller is further configured to:
perform changing the first channel to another channel based on a signal from one of a remote controller and at least one of the first and second viewing devices, and
perform displaying a fourth image corresponding to the another channel during a fourth period subsequent to the second period in synchronization with the first viewing device so that the fourth image can be viewed with the use of the first viewing device but cannot be viewed with the use of the second viewing device.

13. A viewing device comprising:
a frame including a left-eye glass and a right-eye glass;
a selection unit disposed on the frame and arranged to allow a channel search from a predetermined channel search range and a channel selection by a direct manipulation of the selection unit by a user, and to generate a channel selection signal corresponding to the channel selection, wherein the predetermined channel search range is set differently according to at least one of age, preference, gender, recently viewed channels, and program rating of a user of the viewing device;
a wireless communication unit arranged to transmit or receive data to or from an image display device; and
a controller configured to control the left-eye glass, the right-eye glass, the selection unit and the wireless communication unit, and arranged to:
transmit the channel selection signal to the image display device,
perform a control operation to pair the viewing device with the image display device using the wireless communication unit,
enable viewing of a first image corresponding to a first channel corresponding to the channel selection signal, during a first period in synchronization with the viewing device so that the first image can be viewed with the use of the viewing device,
not enable viewing of a second image corresponding to the first channel or a second channel during a second period subsequent to the first period in synchronization with the viewing device so that the second image cannot be viewed with the use of the viewing device,
determine whether the first image is the same as the second image, and
provide a notification message indicating that the first and second images are the same in response to determining that the first image is the same as the second image.

14. The viewing device according to claim 13, wherein the controller is further arranged to perform opening at least one of the left-eye and right-eye glasses according to a synchronization signal received from the image display device through the wireless communication unit.

15. The method according to claim 1, wherein the setting step sets the channel search range for the first viewing device and the channel search range for the second viewing device to be different from each other according to at least one of age, preference, gender, recently viewed channels, and program rating of a user of the corresponding viewing device.

16. The method according to claim 5, wherein the channel search range for the first viewing device and the channel search range for the second viewing device are set to be different from each other according to at least one of age, preference, gender, recently viewed channels, and program rating of a user of the corresponding viewing device.

17. The image display device according to claim 11, wherein the controller sets the channel search range for the first viewing device and the channel search range for the second viewing device to be different from each other according to at least one of age, preference, gender, recently viewed channels, and program rating of a user of the corresponding viewing device.

18. The method according to claim 1, further comprising:
when a single remote controller is used for both the first and second viewing devices, and an input is received from the single remote controller in the multi-user mode, applying the received input to one of the first and second viewing devices which is located closer to the remote controller.

19. The method according to claim 5, further comprising:
when a single remote controller is used for both the first and second viewing devices, and an input is received from the single remote controller in the multi-user mode, applying the received input to one of the first and second viewing devices which is located closer to the remote controller.

20. The image display device according to claim 11, wherein when a single remote controller is used for both the first and second viewing devices, and an input is received from the single remote controller in the multi-user mode, the controller is further configured to apply the received input to one of the first and second viewing devices which is located closer to the remote controller.

21. The method according to claim 1, wherein the displayed predetermined image not associated with any channel is a scrambled image.

22. The method according to claim 21, wherein the number of images being displayed on the display during the first through third periods is 1 more than the number of the viewing devices paired with the image display device during the same first through third periods.

23. The image display device according to claim 11, wherein the displayed predetermined image not associated with any channel is a scrambled image.

24. The image display device according to claim 23, wherein the number of images being displayed on the display during the first through third periods is 1 more than the number of the viewing devices paired with the image display device during the same first through third periods.

25. The viewing device according to claim 13, wherein the controller is further configured to:
   enable viewing of a predetermined third image not associated with any channel during a third period immediately subsequent to either the first or second period,
   wherein the predetermined third image is a scrambled image.

* * * * *